United States Patent [19]

Sugiura et al.

[11] Patent Number: 5,387,983
[45] Date of Patent: Feb. 7, 1995

[54] FACSIMILE APPARATUS COMPRISING CONVERTING MEANS FOR CONVERTING BINARY IMAGE DATA INTO MULTI-VALUE IMAGE DATA AND IMAGE PROCESSING APPARATUS JUDGING PSEUDO HALF-TONE IMAGE

[75] Inventors: Masamichi Sugiura, Toyokawa; Shigenobu Fukushima, Yokohama, both of Japan

[73] Assignee: Minolta Camera Kabushiki Kaisha, Osaka, Japan

[21] Appl. No.: 951,723

[22] Filed: Sep. 25, 1992

[30] Foreign Application Priority Data

Sep. 27, 1991 [JP] Japan .................................. 3-249029
Sep. 27, 1991 [JP] Japan .................................. 3-249042

[51] Int. Cl.$^6$ ............................................. H04N 1/40
[52] U.S. Cl. .................................. 358/434; 358/458; 382/9; 382/28; 382/50
[58] Field of Search .......................... 358/434–440, 358/448–452, 456, 458, 462, 465

[56] References Cited

U.S. PATENT DOCUMENTS

| | | | |
|---|---|---|---|
| 4,734,782 | 3/1988 | Maeshima | 358/280 |
| 4,924,509 | 5/1990 | Yokozimo | 382/50 |
| 4,975,786 | 12/1990 | Katatama et al. | 358/459 |
| 5,125,045 | 6/1992 | Murakami et al. | 382/50 |
| 5,128,748 | 7/1992 | Murakami et al. | 358/75 |
| 5,278,919 | 1/1994 | Sugiura et al. | 358/453 |

FOREIGN PATENT DOCUMENTS

| | | |
|---|---|---|
| 58-75372 | 5/1983 | Japan . |
| 62-107573 | 5/1987 | Japan . |
| 62-114377 | 5/1987 | Japan . |
| 62-114378 | 5/1987 | Japan . |
| 63-11832 | 3/1988 | Japan . |
| 2-165775 | 6/1990 | Japan . |
| 3-157060 | 7/1991 | Japan . |
| 2170373 | 7/1986 | United Kingdom . |

OTHER PUBLICATIONS

Publication entitled "Higher fine multi–value recovery of binary image by Neural Network" by Yoshinobu Mita, et al., Japan Hard Copy '90, NIP-24, pp. 233-236, 1990.

*Primary Examiner*—Vit W. Miska
*Attorney, Agent, or Firm*—Willian Brinks Hofer Gilson & Lione

[57] ABSTRACT

In a facsimile apparatus, a receiver receives image data transmitted from a transmission apparatus apart from the facsimile apparatus, and a converter converts binary image data representing an image density of each pixel in binary representation of black pixel or white pixel, into multi-value image data representing an image density of each pixel in multi-gradation stages representation including half-tone density. Further, the receiver receives a discrimination signal transmitted from the transmission apparatus. A judging section judges whether the received image data are either simple binary image data binarized using one threshold value or pseudo half-tone image data including half-tone information binarized using a plurality of threshold values, based on the received discrimination signal, and a controller controls the converter and a printer to convert image data judged as the pseudo half-tone image data into multi-value image data, and to print an image corresponding to the converted multi-value image data, and further controls the printer to print an image corresponding to image data judged as the simple binary image data without converting the simple image data into multi-value image data.

16 Claims, 48 Drawing Sheets

Fattening type ordered
dither image
(Screen angle = 0°)

Adjacency in Main scan direction

Fig. 24

Adjacency in Subscan direction

Fig. 36

|  j \ i | 2 | 3 | 4 | 5 | 6 | 7 | 8 | 9 | 10 | 11 | 12 |
|---|---|---|---|---|---|---|---|---|---|---|---|
| 2 | | | | | | | | | | | |
| 3 | | | | | | | | | | | |
| 4 | | | | | | | | | | | |
| 5 | | | | | | | | | | | |
| 6 | | | | | -1 | -1 | -1 | -1 | -1 | -1 | -1 |
| 7 | | | | | 2 | 2 | 2 | 2 | 2 | 2 | 2 |
| 8 | | | | | -1 | -1 | -1 | -1 | -1 | -1 | -1 |
| 9 | | | | | | | | | | | |
| 10 | | | | | | | | | | | |
| 11 | | | | | | | | | | | |

|  j \ i | 2 | 3 | 4 | 5 | 6 | 7 | 8 | 9 | 10 | 11 | 12 |
|---|---|---|---|---|---|---|---|---|---|---|---|
| 2 | | | | | | | | | | | |
| 3 | | | | | | | | | | | |
| 4 | | | | | -1 | 2 | -1 | | | | |
| 5 | | | | | -1 | 2 | -1 | | | | |
| 6 | | | | | -1 | 2 | -1 | | | | |
| 7 | | | | | -1 | 2 | -1 | | | | |
| 8 | | | | | -1 | 2 | -1 | | | | |
| 9 | | | | | -1 | 2 | -1 | | | | |
| 10 | | | | | -1 | 2 | -1 | | | | |
| 11 | | | | | | | | | | | |

| i \ j | 2 | 3 | 4 | 5 | 6 | 7 | 8 | 9 | 10 | 11 | 12 |
|---|---|---|---|---|---|---|---|---|---|---|---|
| 2 |   |   |   |   |   |   |   |   |   |   |   |
| 3 |   |   | -1 | -1 | -1 | -1 | -1 | -1 | -1 |   |   |
| 4 |   |   | -1 | -1 | -1 | -1 | -1 | -1 | -1 |   |   |
| 5 |   |   | -1 | -1 | -1 | -1 | -1 | -1 | -1 |   |   |
| 6 |   |   | 2 | 2 | 2 | 2 | 2 | 2 | 2 |   |   |
| 7 |   |   | 2 | 2 | 2 | 2 | 2 | 2 | 2 |   |   |
| 8 |   |   | 2 | 2 | 2 | 2 | 2 | 2 | 2 |   |   |
| 9 |   |   | -1 | -1 | -1 | -1 | -1 | -1 | -1 |   |   |
| 10 |   |   | -1 | -1 | -1 | -1 | -1 | -1 | -1 |   |   |
| 11 |   |   | -1 | -1 | -1 | -1 | -1 | -1 | -1 |   |   |

F21; rows 3–5: W37b; rows 6–8: W37a; rows 9–11: W37c

Fig. 41

| i \ j | 2 | 3 | 4 | 5 | 6 | 7 | 8 | 9 | 10 | 11 | 12 |
|---|---|---|---|---|---|---|---|---|---|---|---|
| 2 |   |   |   |   |   |   |   |   |   |   |   |
| 3 |   |   |   |   |   |   |   |   |   |   |   |
| 4 |   |   | -1 | -1 | -1 | 2 | 2 | 2 | -1 | -1 | -1 |
| 5 |   |   | -1 | -1 | -1 | 2 | 2 | 2 | -1 | -1 | -1 |
| 6 |   |   | -1 | -1 | -1 | 2 | 2 | 2 | -1 | -1 | -1 |
| 7 |   |   | -1 | -1 | -1 | 2 | 2 | 2 | -1 | -1 | -1 |
| 8 |   |   | -1 | -1 | -1 | 2 | 2 | 2 | -1 | -1 | -1 |
| 9 |   |   | -1 | -1 | -1 | 2 | 2 | 2 | -1 | -1 | -1 |
| 10 |   |   | -1 | -1 | -1 | 2 | 2 | 2 | -1 | -1 | -1 |
| 11 |   |   |   |   |   |   |   |   |   |   |   |

F22; columns 4–6: W73b; columns 7–9: W73a; columns 10–12: W73c

Fig. 42

|  j  i | 2 | 3 | 4 | 5 | 6 | 7 | 8 | 9 | 10 | 11 | 12 |
|---|---|---|---|---|---|---|---|---|---|---|---|
| 2 |  |  |  |  |  |  | -1 | -1 |  |  |  |
| 3 |  |  |  |  |  | -1 | -1 | -1 | 2 |  |  |
| 4 |  |  |  |  | -1 | -1 | -1 | 2 | 2 | 2 |  |
| 5 |  |  |  | -1 | -1 | -1 | 2 | 2 | 2 | -1 | -1 |
| 6 |  |  | -1 | -1 | -1 | 2 | 2 | 2 | -1 | -1 | -1 |
| 7 |  | -1 | -1 | -1 | 2 | 2 | 2 | -1 | -1 | -1 |  |
| 8 | -1 | -1 | -1 | 2 | 2 | 2 | -1 | -1 | -1 |  |  |
| 9 |  | -1 | 2 | 2 | 2 | -1 | -1 | -1 |  |  |  |
| 10 |  |  | 2 | 2 | -1 | -1 | -1 |  |  |  |  |
| 11 |  |  |  |  |  | -1 |  |  |  |  |  |

F23 points to top. WCb, WCa, WCc labels on right.

Fig. 43

|  j  i | 2 | 3 | 4 | 5 | 6 | 7 | 8 | 9 | 10 | 11 | 12 |
|---|---|---|---|---|---|---|---|---|---|---|---|
| 2 |  |  |  | -1 | -1 |  |  |  |  |  |  |
| 3 |  |  | 2 | -1 | -1 | -1 |  |  |  |  |  |
| 4 |  | 2 | 2 | 2 | -1 | -1 | -1 |  |  |  |  |
| 5 | -1 | -1 | 2 | 2 | 2 | -1 | -1 | -1 |  |  |  |
| 6 | -1 | -1 | -1 | 2 | 2 | 2 | -1 | -1 | -1 |  |  |
| 7 |  | -1 | -1 | -1 | 2 | 2 | 2 | -1 | -1 | -1 |  |
| 8 |  |  | -1 | -1 | -1 | 2 | 2 | 2 | -1 | -1 | -1 |
| 9 |  |  |  | -1 | -1 | -1 | 2 | 2 | 2 | -1 |  |
| 10 |  |  |  |  | -1 | -1 | -1 | 2 | 2 |  |  |
| 11 |  |  |  |  |  | -1 | -1 | -1 |  |  |  |
| 12 |  |  |  |  |  |  | -1 |  |  |  |  |

F24, WDc, WDa, WDb labels.

Fig. 44

| i\j | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| 0 | | | | | -1 | -1 | -1 | -1 | -1 | -1 | -1 | | | | |
| 1 | | | | | -1 | -1 | -1 | -1 | -1 | -1 | -1 | | | | |
| 2 | | | | | -1 | -1 | -1 | -1 | -1 | -1 | -1 | | | | |
| 3 | | | | | -1 | -1 | -1 | -1 | -1 | -1 | -1 | | | | |
| 4 | | | | | -1 | -1 | -1 | -1 | -1 | -1 | -1 | | | | |
| 5 | | | | | 2 | 2 | 2 | 2 | 2 | 2 | 2 | | | | |
| 6 | | | | | 2 | 2 | 2 | 2 | 2 | 2 | 2 | | | | |
| 7 | | | | | 2 | 2 | 2 | 2 | 2 | 2 | 2 | | | | |
| 8 | | | | | 2 | 2 | 2 | 2 | 2 | 2 | 2 | | | | |
| 9 | | | | | 2 | 2 | 2 | 2 | 2 | 2 | 2 | | | | |
| 10 | | | | | -1 | -1 | -1 | -1 | -1 | -1 | -1 | | | | |
| 11 | | | | | -1 | -1 | -1 | -1 | -1 | -1 | -1 | | | | |
| 12 | | | | | -1 | -1 | -1 | -1 | -1 | -1 | -1 | | | | |
| 13 | | | | | -1 | -1 | -1 | -1 | -1 | -1 | -1 | | | | |
| 14 | | | | | -1 | -1 | -1 | -1 | -1 | -1 | -1 | | | | |

F31 (column 9); W57b (rows 0–4); W57a (rows 5–9); W57c (rows 10–14)

Fig. 45

| i\j | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| 0 | | | | | | | | | | | | | | | |
| 1 | | | | | | | | | | | | | | | |
| 2 | | | W75b | | | | | W75a | | | | | W75c | | |
| 3 | | | | | | | | | | | | | | | |
| 4 | -1 | -1 | -1 | -1 | -1 | 2 | 2 | 2 | 2 | 2 | -1 | -1 | -1 | -1 | -1 |
| 5 | -1 | -1 | -1 | -1 | -1 | 2 | 2 | 2 | 2 | 2 | -1 | -1 | -1 | -1 | -1 |
| 6 | -1 | -1 | -1 | -1 | -1 | 2 | 2 | 2 | 2 | 2 | -1 | -1 | -1 | -1 | -1 |
| 7 | -1 | -1 | -1 | -1 | -1 | 2 | 2 | 2 | 2 | 2 | -1 | -1 | -1 | -1 | -1 |
| 8 | -1 | -1 | -1 | -1 | -1 | 2 | 2 | 2 | 2 | 2 | -1 | -1 | -1 | -1 | -1 |
| 9 | -1 | -1 | -1 | -1 | -1 | 2 | 2 | 2 | 2 | 2 | -1 | -1 | -1 | -1 | -1 |
| 10 | -1 | -1 | -1 | -1 | -1 | 2 | 2 | 2 | 2 | 2 | -1 | -1 | -1 | -1 | -1 |
| 11 | | | | | | | | | | | | | | | |
| 12 | | | | | | | | | | | | | | | |
| 13 | | | | | | | | | | | | | | | |
| 14 | | | | | | | | | | | | | | | |

|   i \ j | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| 0 |   |   |   |   |   |   |   |   |   |   |    |    |    |    |    |
| 1 |   |   |   |   |   |   | -1 | -1 |   |   |    |    |    |    |    |
| 2 |   |   |   |   |   | -1 | -1 | -1 | -1 |   |    |    |    |    |    |
| 3 |   |   |   |   | -1 | -1 | -1 | -1 | -1 | 2 |    |    |    |    |    |
| 4 |   |   |   | -1 | -1 | -1 | -1 | -1 | 2 | 2 | 2  |    |    |    |    |
| 5 |   |   | -1 | -1 | -1 | -1 | -1 | 2 | 2 | 2 | 2  | 2  |    |    |    |
| 6 |   | -1 | -1 | -1 | -1 | -1 | 2 | 2 | 2 | 2 | 2  | -1 | -1 |    |    |
| 7 | -1 | -1 | -1 | -1 | -1 | 2 | 2 | 2 | 2 | 2 | -1 | -1 | -1 | -1 |    |
| 8 |   | -1 | -1 | -1 | 2 | 2 | 2 | 2 | 2 | -1 | -1 | -1 | -1 | -1 |    |
| 9 |   |   | -1 | 2 | 2 | 2 | 2 | 2 | -1 | -1 | -1 | -1 | -1 |    |    |
| 10 |   |   |   | 2 | 2 | 2 | 2 | -1 | -1 | -1 | -1 | -1 |    |    |    |
| 11 |   |   |   |   | 2 | 2 | -1 | -1 | -1 | -1 | -1 |    |    |    |    |
| 12 |   |   |   |   |   | -1 | -1 | -1 | -1 | -1 |    |    |    |    |    |
| 13 |   |   |   |   |   |   | -1 | -1 | -1 |   |    |    |    |    |    |
| 14 |   |   |   |   |   |   |   | -1 |   |   |    |    |    |    |    |

F33, WEb, WEa, WEc

|i\j|0|1|2|3|4|5|6|7|8|9|10|11|12|13|14|
|---|---|---|---|---|---|---|---|---|---|---|---|---|---|---|---|
|0|||||||||||||||
|1|||||||||||||||
|2|||||||||||||||
|3||||1|1|1|1|1|1|1||||||
|4||||1|1|1|1|1|1|1||||||
|5||||1|1|1|1|1|1|1||||||
|6||||1|1|1|1|1|1|1||||||
|7|||||||||||||||
|8||||-1|-1|-1|-1|-1|-1|-1||||||
|9||||-1|-1|-1|-1|-1|-1|-1||||||
|10||||-1|-1|-1|-1|-1|-1|-1||||||
|11||||-1|-1|-1|-1|-1|-1|-1||||||
|12|||||||||||||||
|13|||||||||||||||
|14|||||||||||||||

W47a (rows 3–6), W47b (rows 8–11)

Fig. 49

|i\j|0|1|2|3|4|5|6|7|8|9|10|11|12|13|14|
|---|---|---|---|---|---|---|---|---|---|---|---|---|---|---|---|
|0| | | | | | | | | | | | | | | |
|1| | | | | | | | | | | | | | | |
|2| | | | | | | | | | | | | | | |
|3| | | | | | | | | | | | | | | |
|4| | | |1|1|1|1| |-1|-1|-1|-1| | | |
|5| | | |1|1|1|1| |-1|-1|-1|-1| | | |
|6| | | |1|1|1|1| |-1|-1|-1|-1| | | |
|7| | | |1|1|1|1| |-1|-1|-1|-1| | | |
|8| | | |1|1|1|1| |-1|-1|-1|-1| | | |
|9| | | |1|1|1|1| |-1|-1|-1|-1| | | |
|10| | | |1|1|1|1| |-1|-1|-1|-1| | | |
|11| | | | | | | | | | | | | | | |
|12| | | | | | | | | | | | | | | |
|13| | | | | | | | | | | | | | | |
|14| | | | | | | | | | | | | | | |

F42, W74a (columns 3–6), W74b (columns 8–11)

Fig. 52

| i\j | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| 0 | | | | | | | | | | | | | | | |
| 1 | | | | | 1 | 1 | 1 | 1 | 1 | 1 | 1 | | | | |
| 2 | | | | | 1 | 1 | 1 | 1 | 1 | 1 | 1 | | | | |
| 3 | | | | | 1 | 1 | 1 | 1 | 1 | 1 | 1 | | | | |
| 4 | | | | | 1 | 1 | 1 | 1 | 1 | 1 | 1 | | | | |
| 5 | | | | | 1 | 1 | 1 | 1 | 1 | 1 | 1 | | | | |
| 6 | | | | | 1 | 1 | 1 | 1 | 1 | 1 | 1 | | | | |
| 7 | | | | | | | | | | | | | | | |
| 8 | | | | | -1 | -1 | -1 | -1 | -1 | -1 | -1 | | | | |
| 9 | | | | | -1 | -1 | -1 | -1 | -1 | -1 | -1 | | | | |
| 10 | | | | | -1 | -1 | -1 | -1 | -1 | -1 | -1 | | | | |
| 11 | | | | | -1 | -1 | -1 | -1 | -1 | -1 | -1 | | | | |
| 12 | | | | | -1 | -1 | -1 | -1 | -1 | -1 | -1 | | | | |
| 13 | | | | | -1 | -1 | -1 | -1 | -1 | -1 | -1 | | | | |
| 14 | | | | | | | | | | | | | | | |

F51 points to column 8. Rows 1-6 columns 4-10 form W67a. Rows 8-13 columns 4-10 form W67b.

| i\j | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| 0 | | | | | | | | | | | | | | | |
| 1 | | | | | | | | | | | | | | | |
| 2 | | | W76a | | | | | | | W76b | | | | | |
| 3 | | | | | | | | | | | | | | | |
| 4 | | 1 | 1 | 1 | 1 | 1 | 1 | | -1 | -1 | -1 | -1 | -1 | -1 | |
| 5 | | 1 | 1 | 1 | 1 | 1 | 1 | | -1 | -1 | -1 | -1 | -1 | -1 | |
| 6 | | 1 | 1 | 1 | 1 | 1 | 1 | | -1 | -1 | -1 | -1 | -1 | -1 | |
| 7 | | 1 | 1 | 1 | 1 | 1 | 1 | | -1 | -1 | -1 | -1 | -1 | -1 | |
| 8 | | 1 | 1 | 1 | 1 | 1 | 1 | | -1 | -1 | -1 | -1 | -1 | -1 | |
| 9 | | 1 | 1 | 1 | 1 | 1 | 1 | | -1 | -1 | -1 | -1 | -1 | -1 | |
| 10 | | 1 | 1 | 1 | 1 | 1 | 1 | | -1 | -1 | -1 | -1 | -1 | -1 | |
| 11 | | | | | | | | | | | | | | | |
| 12 | | | | | | | | | | | | | | | |
| 13 | | | | | | | | | | | | | | | |
| 14 | | | | | | | | | | | | | | | |

Fig. 55

| i\j | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| 0 | | | | | | | | | | | | | | | |
| 1 | | | | | | | | 1 | | | | | | | |
| 2 | | | | | | | 1 | 1 | 1 | | | | | | |
| 3 | | | | | | 1 | 1 | 1 | 1 | 1 | | | | | |
| 4 | | | | | 1 | 1 | 1 | 1 | 1 | 1 | 1 | | | | |
| 5 | | | -1 | -1 | | 1 | 1 | 1 | 1 | 1 | 1 | | | | |
| 6 | | -1 | -1 | -1 | -1 | | 1 | 1 | 1 | 1 | 1 | | | | |
| 7 | -1 | -1 | -1 | -1 | -1 | -1 | | 1 | 1 | 1 | 1 | 1 | | | |
| 8 | | -1 | -1 | -1 | -1 | -1 | -1 | | 1 | 1 | 1 | 1 | 1 | | |
| 9 | | -1 | -1 | -1 | -1 | -1 | -1 | | 1 | 1 | 1 | | | | |
| 10 | | | -1 | -1 | -1 | -1 | -1 | -1 | | 1 | | | | | |
| 11 | | | | -1 | -1 | -1 | -1 | -1 | -1 | | | | | | |
| 12 | | | | | -1 | -1 | -1 | -1 | | | | | | | |
| 13 | | | | | | | -1 | -1 | | | | | | | |
| 14 | | | | | | | | | | | | | | | |

F54, WIa, WIb

FACSIMILE APPARATUS COMPRISING CONVERTING MEANS FOR CONVERTING BINARY IMAGE DATA INTO MULTI-VALUE IMAGE DATA AND IMAGE PROCESSING APPARATUS JUDGING PSEUDO HALF-TONE IMAGE

BACKGROUND OF THE INVENTION

1. Field of the Invention

The present invention relates to a facsimile apparatus, and more particularly, to a facsimile apparatus comprising an image recovery circuit for recovering image data of multi-gradation stages including an image density of half-tone (referred to as a multi-value image data hereinafter) from pseudo half-tone binary image data. Further, the present invention relates to an image processing apparatus, and more particularly, to an image processing apparatus comprising a judgment circuit for judging whether inputted binary image data are either binary image data of pseudo half-tone image or binary image data of non-half-tone image, and further comprising an image recovery circuit for recovering multi-value image data from inputted binary image data of pseudo half-tone image.

2. Description of the Related Art

In a conventional facsimile apparatus, in order to transmit an image signal through a public telephone line, a transmitter converts a half-tone image such as a photograph image or the like into binary image data of pseudo half-tone image by binarizing them using a dither method or the like, and then, transmits the converted image data to a receiver of the other party. On the other hand, the receiver recovers multi-value image data from the received binary image data of pseudo half-tone.

Further, recently, there has been put into practice a color laser printer for recording an image of multi-value image data at a high speed and with a high resolution, however, there have been widely used binary printers for recording binary image data, generally. In order to store multi-value image data in a storage unit, it is necessary to provide the storage unit having a relatively large capacity.

In order to solve the above problem, the following method is suggested. In this method, the multi-value image data are converted into binary image data, and then, the converted binary image data are stored in the storage unit. Furthermore, upon processing the binary image data or recording the binary image data, after reading out the above binary image data from the storage unit, multi-value image data are recovered from the read binary image data.

The method and apparatus of this type are disclosed in the Japanese patent laid-open publications Nos. 62-114378 and 62-107573.

The image processing method disclosed in the former publication (referred to as a third conventional method hereinafter) includes the following steps, in order to make a multi-value printer give full scope to its unit performance by printing out an image using the multi-value printer even in response to binary image data, or in order to improve the quality of recovered character image:

(a) recovering a half-tone image from the inputted binary image data; and
(b) performing predetermined processes such as a magnification and reduction process, an image emphasis process or the like for the recovered half-tone image. In the third conventional method, in order to recover multi-value image data from binary image data, a window in a square shape having a predetermined size is provided close to a specified pixel to be recovered or to be processed, and then, a smoothing process is performed for the inputted image data within the provided window.

Further, the image processing apparatus disclosed in the latter publication (referred to as a fourth conventional apparatus hereinafter) comprises the following means, in order to prevent the quality of image from deteriorating in the case of using a binarizing circuit having a simple structure using a dither method or the like, and also in order to constitute the image processing apparatus with simple circuits:

(a) dividing means for dividing binarized image information into predetermined blocks;
(b) judging means for judging the image tone by each block; and
(c) converting means for converting the binarized image information within the block into multi-value image data according to the judgment result thereof. In the fourth conventional apparatus, upon transmitting image data and storing them, there are used binary image data so as to display and edit them more efficiently. Further, upon reproducing the image, there is used a multi-value representation close to an analogue image. Concretely, the judgment means is constituted by an image judgment table ROM for judging the image tone using a pattern matching method within each block corresponding to a size of a dither matrix, and the converting means is constituted by a conversion ROM.

However, in the third conventional method, when setting a larger window, a blurring or shaded-off portion may be reproduced in the reproduced image. On the other hand, when setting a smaller window, a so-called Moiré may be caused, resulting in deterioration of the reproductivity of the image.

Further, in the fourth conventional apparatus, since the image tone is judged by each block corresponding to the size of the dither matrix, the image tone can not be judged when the dither matrix of the binarizing circuit is not known, and also the image tone can not be judged when the image data to be judged are binarized using the other pseudo half-tone binarizing method.

For example, in the case where a document image to be transmitted from a facsimile apparatus of a transmission side is a character image, when another facsimile apparatus of a receiving side recovers multi-value image data from received binary image data using the third conventional method and the fourth conventional apparatus, an image recorded in another facsimile apparatus of the receiving side may be different from the original document image at the transmission side, and then, the reproductivity of the image is lowered, resulting in deterioration in the recorded image.

Further, generally speaking, in binary image data binarized using the pseudo half-tone binarizing method, there are mixedly both spatial frequency components of a texture of a pseudo half-tone and spatial frequency components of an original image itself, wherein the frequency of the former components is higher than the frequency of the latter components. However, when the resolution upon reading an image becomes lower, a difference between bands of both the spatial frequency components becomes smaller, and finally the difference therebetween becomes substantially zero. In this case, when recovering multi-value image data from such binary image data, a texture component is also recovered together with the components of the original image, and then, the reproductivity of the image is lowered, resulting in deterioration in the recorded image.

In the case of recovering multi-value image data such as image data of a photograph image from binary image data binarized using the pseudo half-tone binarizing method in the above-mentioned third conventional method and fourth conventional apparatus, there are used spatial filters each having a predetermined size as described above. In this case, generally speaking, the size of the spatial filter is determined taking into consideration not only the spatial frequency band of the texture of the pseudo half-tone image to be removed but also the spatial frequency band of the original image itself to be stored or to be emphasized. However, in the case of recovering multi-value image data using a spatial filter having a fixedly predetermined size, when the resolution of the binary image data is changed, the spatial frequency band of the latter original image moves, and then, the original image data can not be recovered, resulting in lowering the reproductivity of the recovered image.

As described above, in binary image data binarized using the pseudo half-tone binarizing method, there are mixedly both the spatial frequency components of the texture of the pseudo half-tone image and the spatial frequency components of the original image itself. Generally, the spatial frequency of the former is higher than the spatial frequency of the latter, however, in particular, the spatial frequency band of the binary image data binarized using a Fattening type ordered dither method of the pseudo half-tone binarizing method is lower than that of the former.

Therefore, in the case where there is almost no difference between the spatial frequency bands of both ones, an image area judgment circuit for only judging whether inputted image data are binary image data binarized using the pseudo half-tone binarizing method or binary image data of non-half-tone image may misjudge of the image area judgment. If the apparatus of the third conventional method and the conventional fourth apparatus recover multi-value image data from binary image data based on the results of the misjudged image area judgment, it can not recover the original image, resulting in lowering the reproductivity of the image.

Further, in a conventional facsimile apparatus, in order to transmit an image signal through a public telephone line, a transmitter converts image data of non-half-tone image such as characters into binary image data of non-half-tone image by binarizing them using a predetermined threshold value and then transmits the converted binary image data to a receiver of the other party, and also the transmitter converts multi-value image data of half-tone-image into binary image data of pseudo half-tone image by binarizing them using a dither method and then transmits the converted binary image data to the receiver of the other party. It is to be noted that the multi-value image data means image data of multi-gradation stages in the specification. On the other hand, the receiver of the other party performs different processes depending on the kind of the image of the received image data such as non-half-tone image, pseudo half-tone image or the like. Namely, it is necessary for the receiver to perform the following processes:

(a) a process for extracting each kind of binary image data;
(b) a process for switching over the method for converting the pixel density thereof; and
(c) a process for switching over the decoding method such as the method for compressing image data or the like.

Therefore, it is necessary to automatically judge whether or not the received image data are binary image data of non-half-tone image or binary image data of pseudo half-tone image, and there is disclosed in the Japanese Patent examined publication No. 63-11832, a method for judging the kind of the received image data and generating an image area signal having the judgment result (referred to as a fifth conventional method hereinafter). The fifth conventional method is provided for judging whether or not respective pixels of an image signal having both of a dot photograph area and a document area of characters are included in the dot photograph area or the document area, and for generating an image area signal for representing the judged image area. The fifth conventional method includes the following steps:

(a) setting a mask for surrounding a plurality of pixels including a specified pixel;
(b) taking out a pixel pattern formed based on values of a plurality of pixels within the mask;
(c) generating an image area signal corresponding to the above-mentioned pixel pattern according to a table of image area signals on the pixel patterns previously stored in a storage unit dividing all the pixel patterns which may be caused into the dot photograph area and the document area; and
(d) outputting the generated image area signal as the image area signal corresponding to the specified pixel. Concretely, the respective pixel patterns are previously stored in a table ROM by dividing the pixel pattern into the dot photograph area and the document area, and when an image signal to be processed is inputted to an address terminal of the table ROM, resulting in the image area signal in the data terminal of the table ROM.

Further, there is suggested in Yoshinobu MITA et al, "Higher fine multi-value recovery of binary image by Neural Network", Japan Hard copy, '90, NIP-24, pp233 through 236, 1990, an apparatus for automatically judging whether or not inputted binary image data are binary image data of non-half-tone image or binary image data of pseudo half-tone image (referred to as a sixth conventional apparatus hereinafter). In the sixth conventional apparatus, by using a back propagation method for Neural Network, there is performed not only a process for converting inputted binary image data into multi-value image data using a Neural Network but also a process for dividing inputted binary image data into predetermined kinds of image area and for converting them into multi-value image data depending on the divided image area using the Neural Network. The Neural Network of the sixth conventional apparatus has a three-layer structure comprising an input layer, an intermediate layer and an output layer. In the input layer, there are provided a number of units corresponding to a number of pixels included in a window provided close to a specified pixel, and there is provided in the output layer one unit for outputting multi-value image data.

However, in the fifth conventional method, since there is provided the pixel pattern table ROM for judging image areas, as the area to be judged for area judgment increases, the manufacturing cost thereof increases. Further, in the sixth conventional apparatus, the composition of the apparatus is complicated, and the processing speed is extremely low.

SUMMARY OF THE INVENTION

An object of the present invention is therefore to provide a facsimile apparatus capable of prohibiting from recovering multi-value image data from received binary image data after another facsimile apparatus of a transmitting side binarizes image data using a non-half-tone binarizing method with a predetermined threshold value, thereby improving reproductivity of the received image as compared with that of the conventional apparatus and preventing the recorded image from deteriorating.

Another object of the present invention is to provide a facsimile apparatus capable of prohibiting from recovering multi-value image data from received binary image data after another facsimile apparatus of a transmitting side reads and converts a document image into image data with a relatively low resolution, and then binarizes image data using a pseudo half-tone binarizing method, thereby improving reproductivity of the received image as compared with that of the conventional apparatus and preventing the recorded image from deteriorating.

A further object of the present invention is to provide an image communication system capable of improving reproductivity of the received image as compared with that of the conventional apparatus and preventing the recorded image from deteriorating.

A still further object of the present invention is to provide an image processing apparatus having a structure simpler than that of the conventional apparatus, capable of more accurately judging in a higher speed whether inputted binary image data are either binary image data binarized using a pseudo half-tone binarizing method with a plurality of threshold values or binary image data binarized using a non-half-tone binarizing method with one predetermined threshold value, even though the resolution of the above-mentioned binary image data changes.

A still more further object of the present invention is to provide an image processing apparatus capable of improving reproductivity of recorded image as compared with that of the conventional apparatus and preventing the recorded image from deteriorating, even though a resolution of inputted binary image data changes, in the case of recovering multi-value image data from binary image data including binary image data binarized using a pseudo-half-tone binarizing method with a plurality of threshold values and binary image data binarized using a non-half-tone binarizing method with one predetermined threshold value.

In order to achieve the aforementioned objective, according to one aspect of the present invention, there is provided a facsimile apparatus comprising:
image data receiving means for receiving image data transmitted from a transmission apparatus apart from said facsimile apparatus;
converting means for converting binary image data representing an image density of each pixel in binary representation of black pixel or white pixel, into multi-value image data representing an image density of each pixel in multi-gradation stages representation including half-tone density;
printing means for printing an image corresponding to image data on a paper;
discrimination signal receiving means for receiving a discrimination signal transmitted from said transmission apparatus;
judging means for judging whether said image data received by said image data receiving means are either simple binary image data binarized using one threshold value or pseudo half-tone image data including half-tone information binarized using a plurality of threshold values, based on said discrimination signal received by said discrimination signal receiving means; and
controlling means for controlling said converting means and said printing means to convert image data judged as said pseudo half-tone image data by said judging means into multi-value image data, and print an image corresponding to said converted multi-value image data, and for controlling said printing means to print an image corresponding to image data judged as said simple binary image data by said judging means without converting said simple image data into multi-value image data.

According to another aspect of the present invention, there is provided an image communication system including a transmission apparatus and a receiving apparatus, said transmission apparatus comprising:
image reading means for optically reading a density of a document image by respective fine pixels and outputting image data corresponding to said read document image;
simple binarizing means for binarizing image data outputted from said image reading means using one threshold value and outputting simple binary image data;
pseudo half-tone binarizing means for binarizing image data outputted from said image reading means using a plurality of threshold values and outputting pseudo half-tone image data including half-tone information;
selecting means for selecting one of said simple binary image data outputted from said simple binarizing means and said pseudo half-tone image data outputted from said pseudo half-tone binarizing means and outputting said selected image data; and
transmitting means for transmitting said image data selected by said selecting means and transmitting a predetermined discrimination signal corresponding to said image data selected by said selecting means,
said receiving means comprising:
receiving means for receiving said image data and said predetermined discrimination signal transmitted from said transmitting means of said transmission apparatus;
judging means for judging whether said image data received by said receiving means are either said simple binary image data or said pseudo half-tone image data based on said predetermined discrimination signal received by said receiving means;
converting means for converting said image data received by said receiving means into multi-value image data representing an image density of each pixel in multi-gradation stages representation including half-tone density when said judging means judges that said image data received by said receiving means are said pseudo half-tone image data; and printing means for printing an image corresponding to said multi-value image data converted by said converting means on a paper when said judging means judges that said image data received by said receiving means are said pseudo half-tone image data, and for printing an image corresponding to said image data received by said receiving means on a paper when said judging means judges that said image data received by said receiving means are said simple binary image data.

According to a further aspect of the present invention, there is provided a facsimile apparatus comprising:

receiving means for receiving binary image data and a recovery control signal transmitted from a further facsimile apparatus of the other party;

first recovery means for performing a first recovery process for recovering multi-value image data from said binary image data binarized using a first pseudo half-tone binarizing method;

second recovery means for performing a second recovery process for recovering multi-value image data from said binary image data binarized using a second pseudo half-tone binarizing method different from said first pseudo half-tone binarizing method; and controlling means for controlling said first and second recovery means to selectively perform one of said first and second recovery processes for said binary image data received by said receiving means, based on said recovery control signal received by said receiving means.

According to a still further aspect of the present invention, there is provided an image processing apparatus comprising:

counting means for counting a number of adjacent points, in each of which the same kinds of two pixels are adjacent to each other, within a block area composed of a plurality of pixels having a specified pixel to be processed, based on inputted binary image data including first binary image data binarized using a pseudo half-tone binarizing method with a plurality of predetermined binarizing threshold values and second binary image data binarized using a non-half-tone binarizing method with a predetermined binarizing threshold value;

judging means for judging whether said inputted binary image data are either first or second binary image data by comparing said the number of adjacent points counted by said counting means with a predetermined judgment threshold value, and outputting a judgment result thereof; and controlling means for altering said predetermined judgment threshold value based on a resolution of said inputted binary image data.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIG. 24 is a front view showing adjacency in the subscan direction in respective pixels within a 7×7 window;

FIG. 36 is a front view showing an edge amount detection spatial filter F11 for calculating an edge emphasis amount, which Is used in the edge emphasis amount calculation section shown in FIG. 16;

FIG. 37 is a front view showing an edge amount detection spatial filter F12 for calculating an edge emphasis amount, which is used in the edge emphasis amount calculation section shown in FIG. 16;

Figures 38, 39:
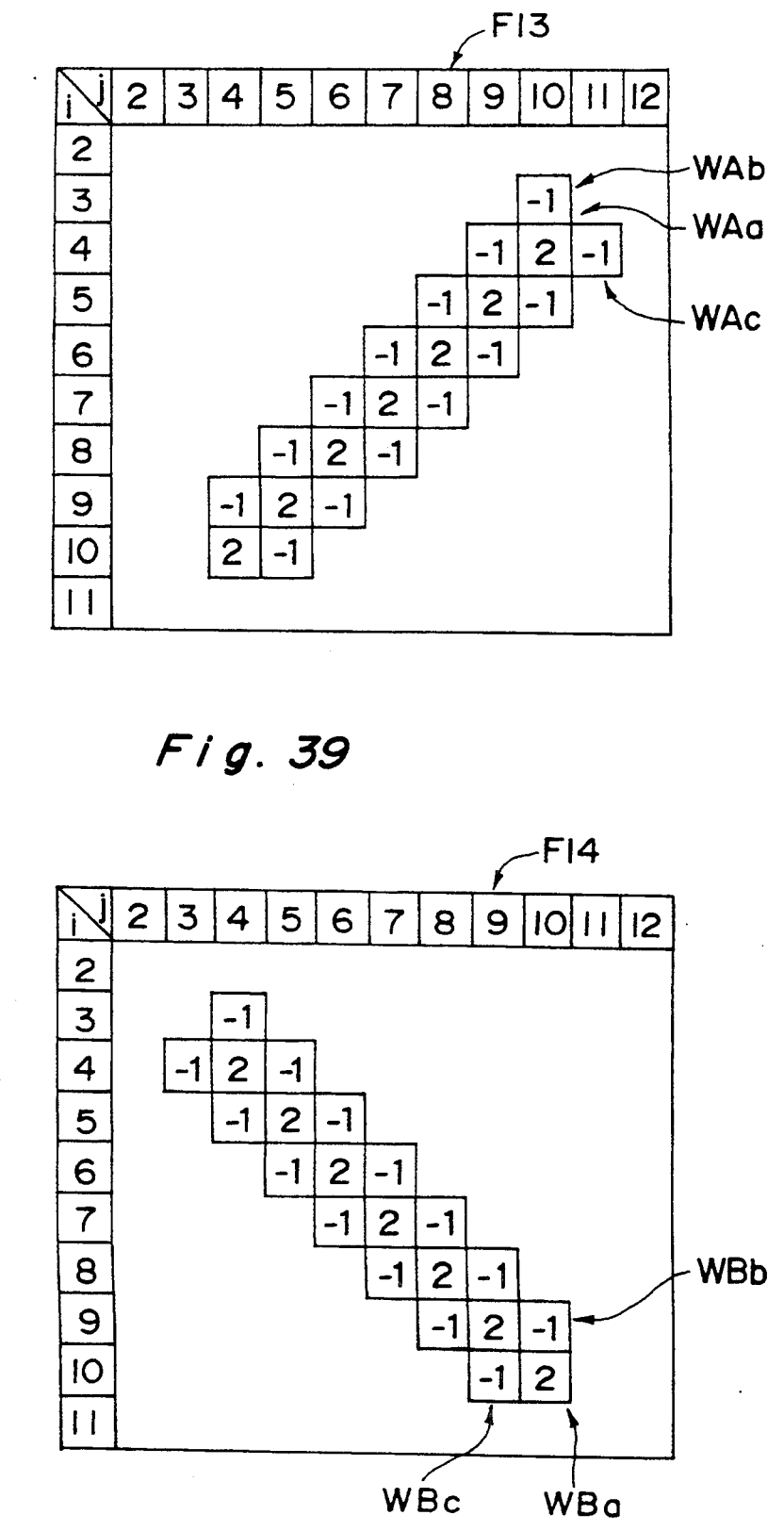

FIG. 38 is a front view showing an edge amount detection spatial filter F13 for calculating an edge emphasis amount, which is used in the edge emphasis amount calculation section shown in FIG. 16;

FIG. 39 is a front view showing an edge amount detection spatial filter F14 for calculating an edge emphasis amount, which is used in the edge emphasis amount calculation section shown in FIG. 16;

FIG. 40 is a front view showing an edge amount detection spatial filter F21 for calculating an edge emphasis amount, which is used in the edge emphasis amount calculation section shown in FIG. 16;

FIG. 41 is a front view showing an edge amount detection spatial filter F22 for calculating an edge emphasis amount, which is used in the edge emphasis amount calculation section shown in FIG. 16;

FIG. 42 is a front view showing an edge amount detection spatial filter F23 for calculating an edge emphasis amount, which is used in the edge emphasis amount calculation section shown in FIG. 16;

FIG. 43 is a front view showing an edge amount detection spatial filter F24 for calculating an edge emphasis amount, which is used in the edge emphasis amount calculation section shown in FIG. 16;

FIG. 44 is a front view showing an edge amount detection spatial filter F31 for calculating an edge emphasis amount, which is used in the edge emphasis amount calculation section shown in FIG. 16;

FIG. 45 is a front view showing an edge amount detection spatial filter F32 for calculating an edge emphasis amount, which is used in the edge emphasis amount calculation section shown in FIG. 16;

FIG. 46 is a front view showing an edge amount detection spatial filter F33 for calculating an edge emphasis amount, which is used in the edge emphasis amount calculation section shown in FIG. 16;

Figure 47:
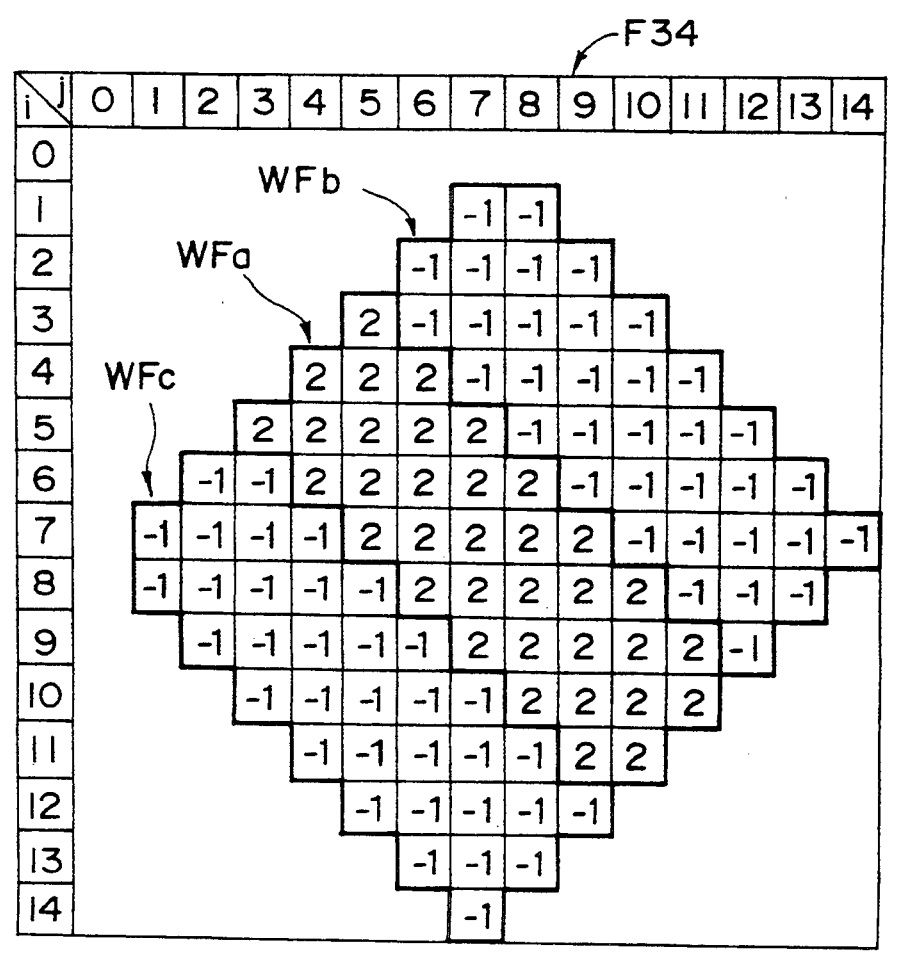

FIG. 47 is a front view showing an edge amount detection spatial filter F34 for calculating an edge emphasis amount, which is used in the edge emphasis amount calculation section shown in FIG. 16;

FIG. 48 is a front view showing an edge amount detection spatial filter F41 for calculating an edge judgment amount, which is used in the edge judgment amount calculation section shown in FIG. 17;

FIG. 49 is a front view showing an edge amount detection spatial filter F42 for calculating an edge judgment amount, which is used in the edge judgment amount calculation section shown in FIG. 17;

FIG. 52 is a front view showing an edge amount detection spatial filter F51 for calculating an edge judgment amount, which is used in the edge judgment amount calculation section shown in FIG. 17;

FIG. 53 is a front view showing an edge amount detection spatial filter F52 for calculating an edge judgment amount, which is used in the edge judgment amount calculation section shown in FIG. 17;

FIG. 55 is a front view showing an edge amount detection spatial filter F54 for calculating an edge judgment amount, which is used in the edge judgment amount calculation section shown in FIG. 17.

DETAILED DESCRIPTION OF THE PREFERRED EMBODIMENTS

Figure 3:
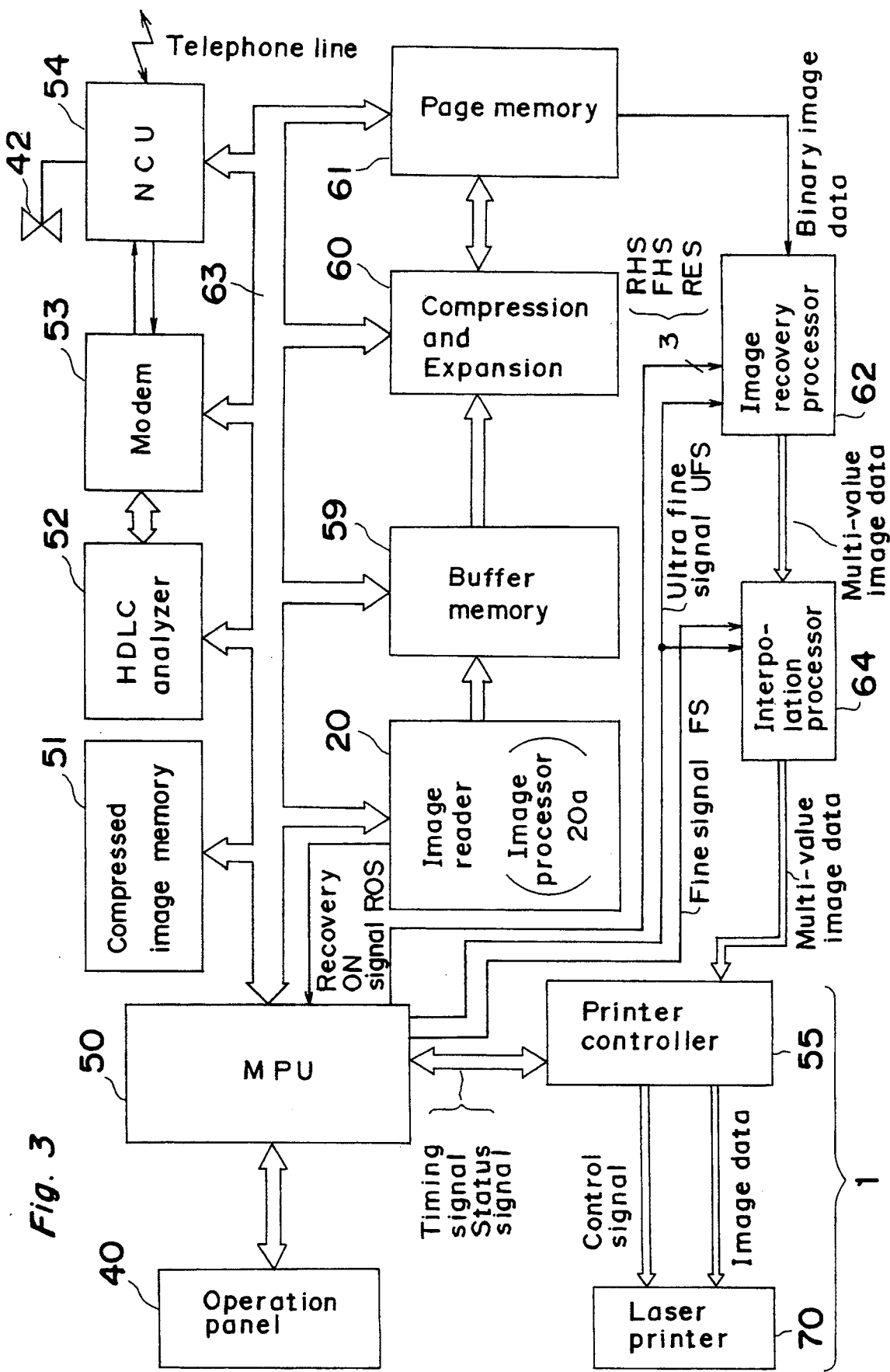
FIG. 3 is a schematic block diagram showing a signal processing section shown in FIG. 1.

Preferred embodiments according to the present invention will be described below with reference to the attached drawings. A facsimile apparatus of a preferred embodiment according to the present invention will be described below with reference to the attached drawings. As is shown in FIG. 3, the facsimile apparatus of the preferred embodiment according to the present invention is characterized in that it is equipped with an image recovery processor 62, which recovers multi-value image data from received binary image data.

In the following description of the present preferred embodiment, a half-tone image and a half-tone area mean a pseudo half-tone image obtained by binarizing multi-value image data of a half-tone image such as a photograph or the like using a pseudo half-tone binarizing method with a plurality of threshold values such as a dither method or the like, and an area of the half-tone image, respectively. On the other hand, a non-half-tone image and a non-half-tone area mean a non-half-tone image such as a character image or the like, and an area of the non-half-tone image, respectively. Between the half-tone image and the non-half-tone image, there exist intermediate images such as an image binarized from a character image by a pseudo half-tone binarizing method and an artificially created image such as a character font. These intermediate images are dealt with as non-half-tone images in the present preferred embodiment. Moreover, an image obtained by binarizing a photographic image using a predetermined threshold value is left out of consideration by the present preferred embodiment since most of its original image data is lost in the binarizing process.

Methods of binarizing image data are in general classified as follows. One is a simple binarizing method, which binarizes an image using one predetermined threshold value, and the others are pseudo half-tone binarizing methods, each of which binarizes an image using a pseudo half-tone binarizing method with a plurality of threshold values. Pseudo half-tone binarizing methods are classified into a random dither method, which is also called an error diffusion method and is referred to as a first half-tone binarizing method or a binarizing method of a first half-tone mode hereinafter, and the ordered dither methods. Further, ordered dither methods are classified into a Bayer (dot decentralization) type ordered dither method and a Fattening (dot centralization) type ordered dither method, the latter method being referred to as a second half-tone binarizing method or a binarizing method of a second half-tone mode.

Furthermore, binary images binarized with pseudo half-tones using a random dither method and an ordered dither method will be called random type half-tone images and ordered dither type half-tone images, respectively, and in particular, binary images binarized with pseudo half-tones using a Fattening type ordered dither method will be called Fattening type half-tone images. On the other hand, since the random dither method is basically the Bayer type ordered dither method, pseudo half-tone images other than Fattening type half-tone images will be called Bayer type half-tone images. The present preferred embodiment improves accuracy in classifying image areas by invalidating or canceling "judgments on ordered dither type half-tones" for random type half-tone images and invalidating or canceling "judgments on Bayer type half-tones" for Fattening type half-tone images.

The facsimile apparatus of the preferred embodiment according to the present invention will be described in an order of the following items.

Figure 7:
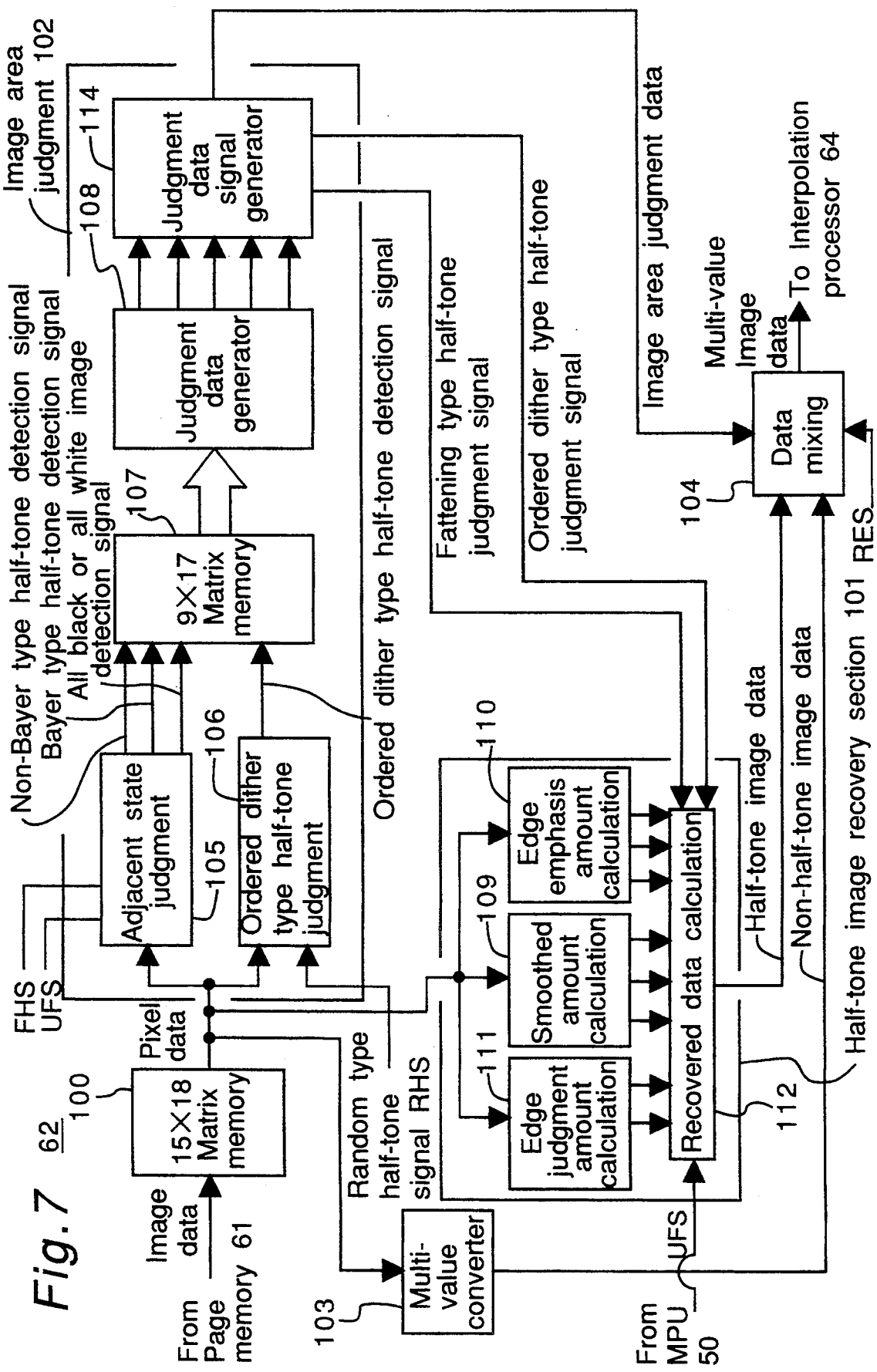
FIG. 7 is a schematic block diagram showing an image recovery processor shown in FIG. 3.

(1) Features of Present preferred embodiment
(2) Structure and Operation of Facsimile apparatus
(3) Image recovery processor
(4) 15×18 matrix memory
(5) Image area judgment section
  (5-1) Structure and Operation of Each section
  (5-2) Adjacent state judgment section
  (5-3) Ordered dither type half-tone judgment section
  (5-4) 9×17 matrix memory
  (5-5) Judgment data generator
  (5-6) Judgment data signal generator
(6) Half-tone image recovery section
  (6-1) Structure and Operation of Each section
  (6-2) Smoothed amount calculation section
  (6-3) Edge emphasis amount calculation section
  (6-4) Edge judgment amount calculation section
  (6-5) Recovered data calculation section (1) Features of Present preferred embodiment The facsimile apparatus of the present preferred embodiment is characterized in that, as shown in FIG. 7, it has:

(a) a half-tone image recovery section 101 that calculates edge emphasis amounts, smoothed amounts and edge judgment amounts based on received binary image data possibly including those binarized using a pseudo half-tone binarizing method and those binarized using a non-half-tone binarizing method using a predetermined threshold value, and that recovers multi-value half-tone data from the received binary image data, based on a Fattening type half-tone judgment signal and an ordered dither type half-tone judgment signal outputted from a judgment data signal generator 114 described in detail later, which respectively indicate such judgment results that images of the inputted binary image data are a Fattening type half-tone image and an ordered dither type half-tone image, an ultra fine signal UFS outputted from a micro processor unit (referred to as an MPU hereinafter) 50 described later, and the three kinds of amounts mentioned above;

(b) an image area judgment section 102 that, based on received binary image data and a Fattening type half-tone signal FHS, the ultra fine signal UFS and a random type half-tone signal RHS outputted from the MPU 50, generates a Fattening type half-tone judgment signal and an ordered dither type half-tone judgment signal, which respectively indicate that images of predetermined areas each area having in the center thereof a pixel under consideration (referred to as a specified pixel hereinafter) are a Fattening type half-tone image and an ordered dither type-tone image, and that outputs image area judgment data that describes to what degree the image area is a non-half-tone area;

(c) a binary to multi-value converter 103 that converts binary image data which was binarized by a non-half-tone binarizing method using a predetermined threshold value, into multi-value non-half-tone image data showing black pixel or white pixel; and (d) a data mixing section 104 that generates multi-value image data by mixing, according to a mixing rate described by the above-mentioned image area judgment data, the multi-value half-tone image data outputted from the half-tone image recovery section 101 and the multi-value non-half-tone image data outputted from the binary to multi-value converter 103, and that outputs the mixed result to a printer controller 55 through an interpolation processor 64 if a recovery execution signal RES outputted from the MPU 50 is at a high level, further the data mixing section 104 outputting the multi-value non-half-tone image data outputted from the binary to multi-value converter 103 to the printer controller 55 through the interpolation processor 64 as they are if the recovery execution signal RES is at a low level.

The above half-tone image recovery section 101 comprises:

(a) a smoothed amount calculation section 109 that calculates and outputs, based on pixel data of received binary image data, the first, second and third smoothed amounts for recovering half-tone image data;

(b) an edge emphasis amount calculation section 110 that calculates and outputs, based on pixel data of received binary image data, the first, second and third edge emphasis amounts for performing an edge emphasis process;

(c) an edge judgment amount calculation section 111 that calculates and outputs, based on pixel data of received binary image data, the first and second edge judgment amounts for detecting an edge area; and (d) a recovered data calculation section 112 that recovers and outputs multi-value half-tone image data based on the data outputted from the sections 109, 110 and 111, the Fattening type half-tone judgment signal and the ordered dither type-tone judgment signal outputted from the judgment data generator 114.

The image area judgment section 102 comprises:

(a) an adjacent state judgment section 105 that calculates a number of adjacencies (referred to as an adjacency number hereinafter) representing an adjacent state in four directions of main scan and subscan directions for the same kind of smaller pixels or minor pixels such that their number is smaller in a predetermined area located within a 7×7 window having the specified pixel in the center thereof, calculates a number of black pixels located within the 7×7 window, and generates and outputs, based on these calculated data, a non-Bayer type half-tone detection signal representing that the image of the predetermined area having the specified pixel in the center thereof is a non-Bayer type half-tone image, a Bayer type half-tone detection signal representing that the image of the predetermined area is a Bayer type half-tone image, and an all-black or all-white image detection signal representing that the image of the predetermined area is an all-black or all-white image;

(b) an ordered dither type half-tone judgment section 106 that finds out whether or not the image of a predetermined area having the specified pixel in the center thereof is an ordered dither type half-tone image and outputs an ordered dither type half-tone detection signal representing the result thereof;

(c) a 9×17 matrix memory 107 that simultaneously outputs, for every pixel located within the 9×17 window having the specified pixel in the center thereof, respective detection signals composed of 4 bits for each pixel and outputted in serial from the adjacent state judgment section 105 and the ordered dither type half-tone judgment section 106;

(d) a judgment data generator 108 that generates and outputs four judgement data by adding up respective all the detection signals located within the 9×17 window outputted from the matrix memory 107; and (e) a judgment data signal generator 114 that, based on the four judgment data outputted from the judgment data generator 108, generates and outputs a Fattening type half-tone judgment signal representing whether or not the image of the area located within the predetermined 9×17 window is a Fattening type half-tone image, generates and outputs an ordered dither type half-tone judgment signal representing whether or not the same image is an ordered dither type half-tone image, and outputs the image area judgment data which describes to what degree the above area is a non-half-tone area.

In the above-mentioned adjacent state judgment section 105, the present preferred embodiment particularly uses, as a threshold value for the adjacency number in the four direction of the main scan and subscan directions, either one of a first threshold value for a ultra fine mode and a second threshold value for a fine mode, depending on a preset resolution upon reading a document image.

(2) Structure and Operation of Facsimile apparatus

Figure 1:
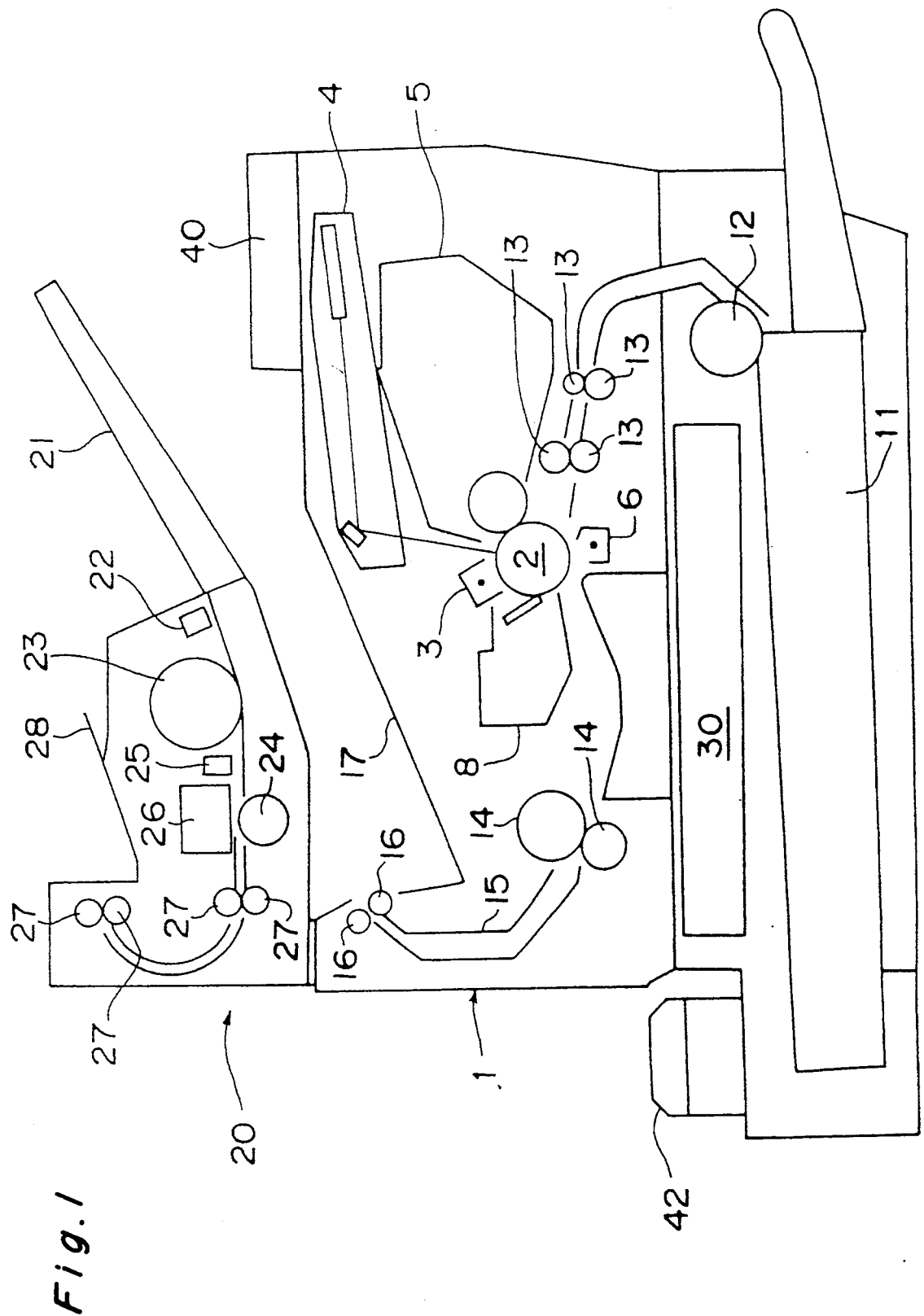
FIG. 1 is a longitudinal cross sectional view showing a mechanical section of a facsimile apparatus of a preferred embodiment according to the present invention.

FIG. 1 shows a longitudinal section of the mechanical part of the facsimile apparatus of the present preferred embodiment, and FIG. 3 shows the signal processing section of the facsimile apparatus.

Referring to FIG. 1, the facsimile apparatus of the present preferred embodiment is mainly divided into a printer section 1 and an image reader 20 installed thereon. An operation panel 40 is installed on the printer section 1, and a telephone set 42 is installed alongside of the printer section 1.

With reference to FIG. 1, the printer section 1 is an electrophotographic laser printer having a configuration similar to that of the conventional laser printer. A structure and an operation thereof will be briefly described below.

First of all, a photoconductive layer on a rotated photoconductive drum 2 is uniformly electrified by a corona charger 3. Next, a beam of laser light is projected onto the photoconductive drum 2, according to image data by an optical system 4, so as to form an electrostatic latent image on the photoconductive drum 2. Then, the electrostatic latent image is developed with toner by a developing unit 5 so as to form a toner image thereon. On the other hand, a number of sheets of cut papers are in a paper feeding cassette 11. After they are picked up one by one by a pick-up roller 12, they are sent to a transfer section of the photoconductive drum 2 by a paper feeding roller 13. The toner image formed on the photo photoconductive drum 2 is then transferred onto a sheet of cut paper by a transfer charger 6, and the transferred toner image is fixed thereon by a fixing unit 14. The sheet for which the fixing process has been completed is discharged into a discharged paper tray 17 through a discharged paper passage 15 by paper discharging rollers 16. The toner remaining on the photoconductive drum 2 is collected by a toner cleaner 8, and then, one printing process is thus completed.

Next, a structure and an operation of the image reader 20 will be described below. A transmission document is read in a manner similar to that of the conventional facsimile machine as follows. A document set on a document tray 21 is detected by a document sensor 22, and the document is sent to a predetermined position of a paper sensor 25 piece by piece by a roller 23. Then, an image of the document (referred to as a document image hereinafter) is read by a contact type linear image sensor 26 in synchronous with rotation of a roller 24 by a motor (not shown). Next, the document image is converted into digital image data, and then, the converted digital image data are outputted to a buffer memory 59 shown in FIG. 2, being converted to compressed image data by a compression and expansion section 60 described later. Then, the compressed image data are stored in a compressed image memory 51. After its document image being read, each piece of the document is discharged into a discharged document tray 28 by a paper discharging roller 27.

Figure 2:
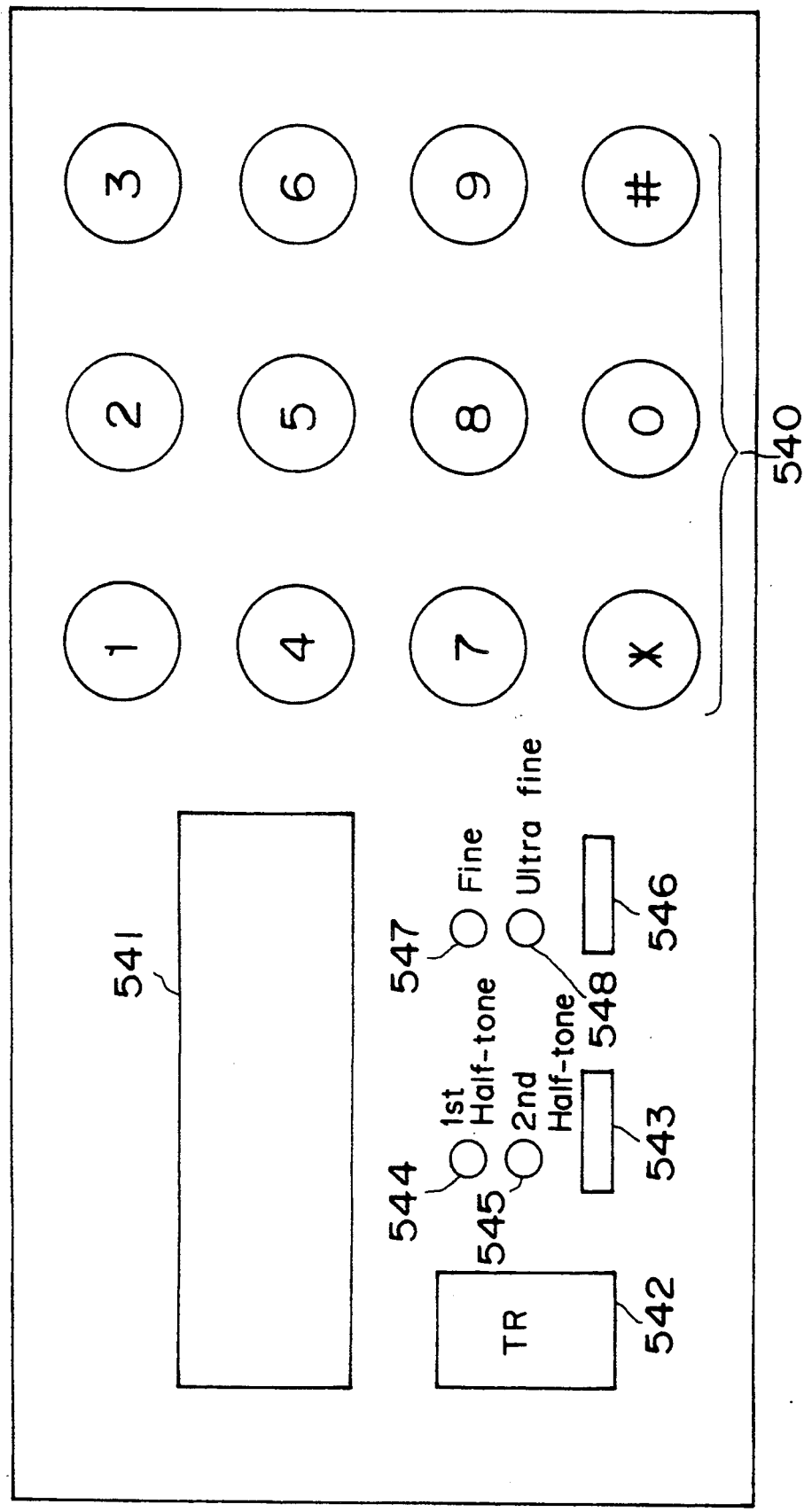
FIG. 2 is a front view of an operation panel shown in FIG. 1.

FIG. 2 shows the operation panel 40 of the facsimile apparatus.

Referring to FIG. 2, the operation panel 40 comprises a set of ten keys 540 for telephone comprised of numeric keys 0 through 9, an asterisk key * and a sharp key #, a liquid crystal display panel 541, console keys 542, 543 and 546, and LED indicators 544, 545, 547 and 548. The liquid crystal display panel 541 displays a current status of ongoing operations and messages to the operator. The key 542 is a transmission key for instructing the facsimile apparatus to start transmission.

The key 543 is a key for setting a half-tone mode upon transmission, and when the key 543 is pressed, the mode setting 543 is advanced to the next setting in a cyclic order of a first half-tone mode, a second half-tone mode and a simple binarizing mode. These settings are indicated by the LED indicators 544 and 545. That is, if the first half-tone mode is set, then only the indicator 544 is turned on. Further, if the second half-tone mode is set, then only the indicator 545 is turned on. Furthermore, if the simple binarizing mode is set, then both indicators 544 and 545 are turned off.

The key 546 is a key for setting a resolution upon reading images. When the key 546 is pressed, the resolution setting is advanced to the next setting in a cyclic order of the fine mode, the ultra fine mode and the standard mode. These settings are indicated by the LED indicators 547 and 548. That is, if the fine mode is set, then only the indicator 547 is turned on. Further, if the ultra fine mode is set, then only the indicator 548 is turned on. Furthermore, if the standard mode is set, then both indicators 547 and 548 are turned off. In the present preferred embodiment, resolutions of the standard mode are 8 dots/mm in the main scan direction and 3.85 dots/mm in the subscan direction, resolutions of the fine mode are 8 dots/mm in the main scan direction and 7.7 dots/mm in the subscan direction, and resolutions of the ultra fine mode are 16 dots/mm in the main scan direction and 15.4 dots/mm in the subscan direction.

As shown in FIG. 3, the facsimile apparatus comprises:

(a) a micro processing unit (referred to as MPU hereinafter) 50 that executes overall control;
(b) an HDLC analyzer 52, a modulator and demodulator (referred to as a MODEM hereinafter) 53, and a network control unit (referred to as an NCU hereinafter) 54, each of which executes a signal process and a communication process;
(c) a compressed image memory 51, a buffer memory 59 and a page memory 61, each of which temporarily stores image data;
(d) a compression and expansion section 60, an image recovery section 62 and an interpolation processor 64, each of which processes image signals;
(e) the above described image reader 20;
(f) the above described operation panel 40 directly connected to the MPU 50; and
(g) the above described printer section 1 comprised of the printer controller 55 directly connected to the MPU 50 and the laser printer 70 controlled by the printer controller 55.

Further, the above components 20, 51, 52, 53, 54, 59, 60 and 61 are connected to the MPU 50 through a bus 63.

When receiving facsimile signals from another facsimile apparatus of the other party, the MPU 50 generates, as described in detail later with reference to FIGS. 4 and 5, based on data signals received in phase B specified by the CCITT's Recommendation T. 30 and a recovery ON signal ROS outputted from the image processor 20a of the image reader 20, (a) the random type half-tone signal RHS, (b) the Fattening type half-tone signal FHS, (c) the recovery execution signal RES, (d) the ultra fine signal UFS and (e) a fine signal FS, outputs the former four control signals to the image recovery section 62, and outputs the latter two control signals to an interpolation processor 64.

The image recovery section 62 executes an image recovery process for binary image data outputted from the page memory 61, as described in detail later, based on the random type half-tone signal RHS, the Fattening type half-tone signal FHS, the recovery execution signal RES, and the ultra fine signal UFS outputted from the MPU 50, thereby recovering multi-value image data from the inputted binary image data, and outputs the recovered multi-value image data to the interpolation processor 64 constructed in a manner similar to that known to those skilled in the art. Then, the interpolation processor 64 executes an interpolation process for the inputted data based on the ultra fine signal UFS and the fine signal FS outputted from the MPU 50 and representing resolutions upon recording an image, and outputs the interpolated image data to the printer controller 55.

In the present preferred embodiment, the laser printer 70 has the resolution of the ultra fine. If the ultra fine signal UFS and the fine signal FS are both at the low level and then the resolution is in the standard mode, the interpolation processor 64 executes not only a twice interpolation process in the main scan direction for interpolating inputted image data so as to obtain image data having data amount in the main scan direction twice as large as the original image data but also a 4-time interpolation process in the subscan direction for interpolating inputted image data so as to obtain image data having data amount in the subscan direction four times as large as the original image data. On the other hand, if the ultra fine signal UFS is at the low level, the fine signal FS is at the high level, and the resolution is in the fine mode, the interpolation processor 64 executes not only a twice interpolation process in the main scan direction but also a twice interpolation process in the subscan direction. Further, if the ultra fine signal UFS is at the high level, the fine signal FS is at the low level, and then the resolution is in the ultra fine mode, the interpolation processor 64 does not execute any interpolation process, and outputs the inputted multi-value image data to the printer controller 55 as they are.

First of all, a transmission operation of the facsimile apparatus of the present preferred embodiment will be described below.

After all the above-described image reading operation by the image reader 20 has been completed, the NCU 54 calls up a further facsimile apparatus of the other party and executes a line connection process according to a line connection procedure specified by the CCITT's Recommendations (phase A of Recommendation T. 30). After the line connection process is completed, the MPU 50 determines the resolution, the compression method and the like according to the capabilities of the facsimile apparatuses on both ends of the communication line, and the NCU 54, the MODEM 53 and the HDLC analyzer 52 execute an exchange of information by a unique mode permitted between the apparatuses manufactured by the same manufacturer, the phase adjustment, the training process and so on (phase B of T. 30). The information about the resolution transmitted from the facsimile apparatus of the transmitter to the further facsimile apparatus of the receiver is set by the console key 54b, and in the communication with the further facsimile apparatus manufactured by a different manufacturer, such information as whether the resolution is in the fine mode or the standard mode is transmitted.

In the present preferred embodiment, the following information is transmitted from the facsimile apparatus of the transmitter to the facsimile apparatus of the receiver only in the unique mode using the nonstandard setting signal (NSS) in the phase B communication specified by the CCITT's recommendations:

(a) information on whether the resolution is in either the ultra fine mode, the fine mode, or the standard mode;
(b) information on whether the binarizing method is of the first half-tone mode, the second half-tone mode or the simple binarizing mode; and
(c) information of the recovery ON signal ROS that indicates whether the transmitted image data are image data to be recovered.

Next, after the compressed image data stored in the compressed image memory 51 are expanded by the compression and expansion section 60 and the expanded image data are temporarily stored in the page memory 61, the expanded image data are recompressed according to the capability of the facsimile apparatus of the other party, and then, the recompressed image data are stored in the compressed image memory 51. Then the image data stored in the compressed image memory 51 are subjected to predetermined HDLC frame process by the HDLC analyzer 52, and a carrier signal is modulated by the MODEM 53 according to the processed image data, thereby generating a facsimile signal. Then the facsimile signal is transmitted to the further facsimile apparatus of the other party through the NCU 54 and the telephone line (phase C of T. 30). After the transmission of the facsimile signal has been confirmed to be completed (phase D of T. 30), the line disconnection process is executed according to a predetermined procedure (phase E of T. 30), and the transmission operation is completed.

Next, a receiving operation of the facsimile apparatus will be described below.

When an incoming call from a facsimile apparatus of another party arrives through the telephone line, an incoming call signal is detected by the MPU 50 through the NCU 54 and the MODEM 53, and then, the line connection process is executed according to the predetermined facsimile line connection procedure (phase A of T. 30). After the line connection process, the resolution and the method of compression and the like are determined according to the capabilities of the facsimile apparatuses on both ends of the line by the MPU 50, and further the exchange of information performed in the unique mode permitted between the apparatuses manufactured by the same manufacturer, the phase adjustment, the training process and the like are executed by the NCU 54, the MODEM 53 and the HDLC analyzer 52 (phase B of T. 30). If the facsimile apparatus of the other party is manufactured by a different manufacturer, information on whether the resolution is in the fine mode or the standard mode is transmitted from the transmitting party, received and inputted to the MPU 50 of the facsimile apparatus of the receiving party. On the other hand, in the unique mode, the above-mentioned pieces of information (a), (b) and (c) transmitted by means of the non-standard setting signal (NSS) are received and inputted to the MPU 50 in a similar manner.

Next, a compressed image signal transmitted from the facsimile apparatus of the other party is inputted into the MODEM 53 through the NCU 54 and then are demodulated by the MODEM 53. Then, the demodulated compressed image data are subjected to a predetermined HDLC inverse process for extracting only compressed image data out of HDLC frames by the HDLC analyzer 52, and the processed compressed image data are stored in the compressed image memory 51 (phase C of T. 30). After the compressed image signal of all the pages have been received and the completion of receiving the image data has been confirmed (phase D of T. 30), a line disconnection with the facsimile apparatus of the other party is executed according to a predetermined procedure (phase E of T. 30). The image data stored in the compressed image memory 51 are expanded and developed into actual image data, page by page, by the compression and expansion section 60, and then, the developed image data are stored in the page memory 61. Here, the MPU 50 monitors the amount of data stored in the compressed image memory 51 by one page and checks whether or not the amount of data of each page exceeds a predetermined data amount M. The result of the check is used for facsimile communication with a facsimile apparatus manufactured by a different manufacturer to determine whether or not the transmitted image data are half-tone image data binarized in a half-tone mode. Since the receiving facsimile apparatus can not determine whether or not the binarizing method of the transmitting facsimile apparatus is of a half-tone mode in facsimile communication with a facsimile apparatus of a different manufacturer because of lack of information to be exchanged in the unique mode, the present preferred embodiment checks the amount of image data by one page, and then judges that the binarizing method is of a half-tone mode if the amount exceeds the predetermined data amount M.

In addition, the present invention allows other preferred embodiments to vary the above predetermined amount M of image data depending on compression methods of image data or to eliminate fill bits from received image data.

The developed image data stored in the page memory 61 are inputted to the image recovery section 62, and then, are converted into binary image data of high density in a process described in detail later. Thereafter, the converted binary image data are processed by the interpolation processor 64, and the processed binary image data are outputted to the printer controller 55. In synchronous with transfer of these data to the printer controller 55, a recording start signal is outputted from the MPU 50 to the printer controller 55, which transfers control signals and the image data into the laser printer 70 and makes it print out an image of the image data.

The MPU 50 executes a predetermined process based on the operator's instructions inputted through the operation panel 40, and outputs instruction information to the operator and the status information of the facsimile apparatus to the operation panel 40 to be displayed thereon.

Figure 4:
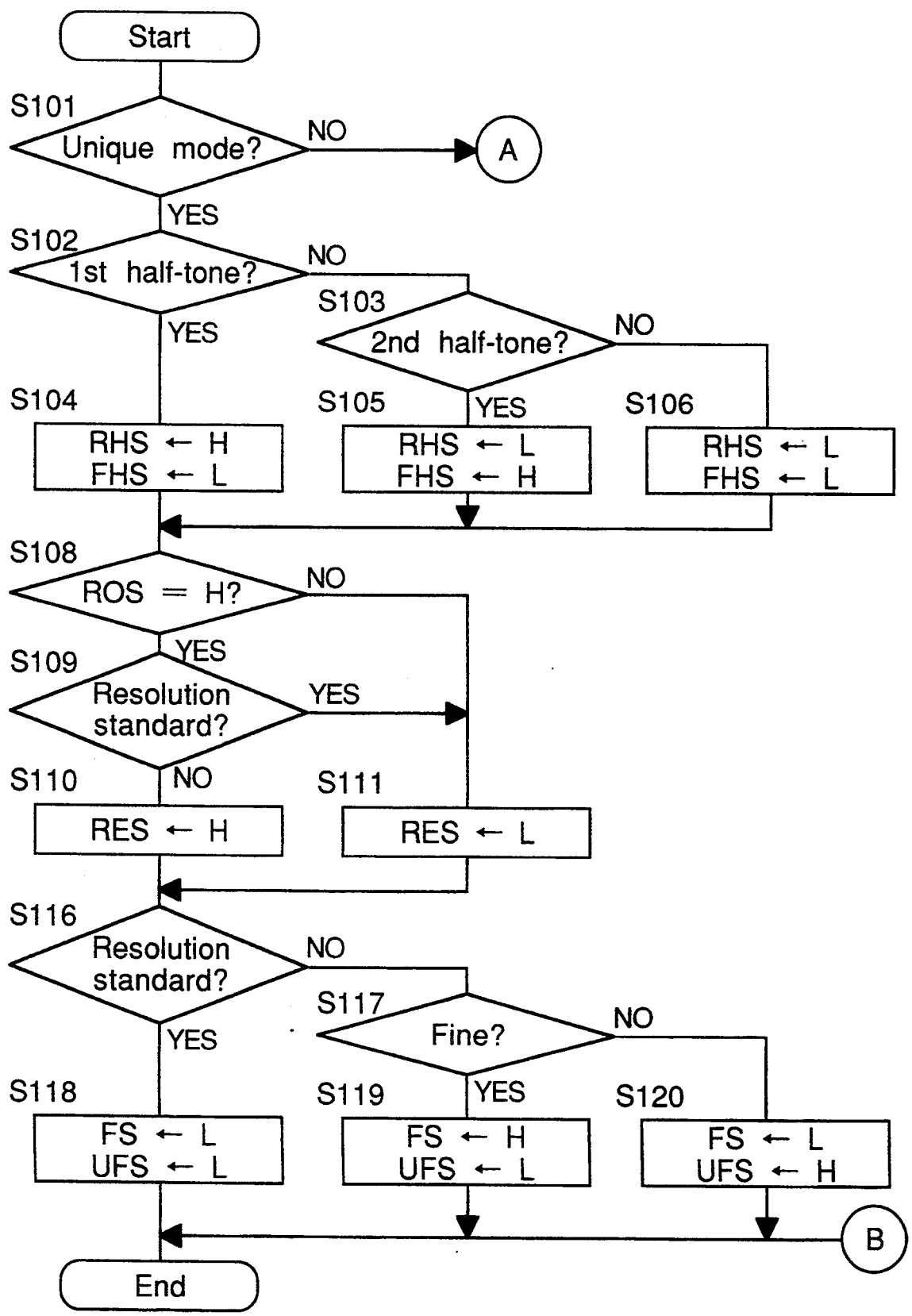
FIGS. 4 and 5 are flow charts of a control signal setting process executed by an MPU of the signal processing section of the facsimile apparatus shown in FIG. 3.
Figure 5:
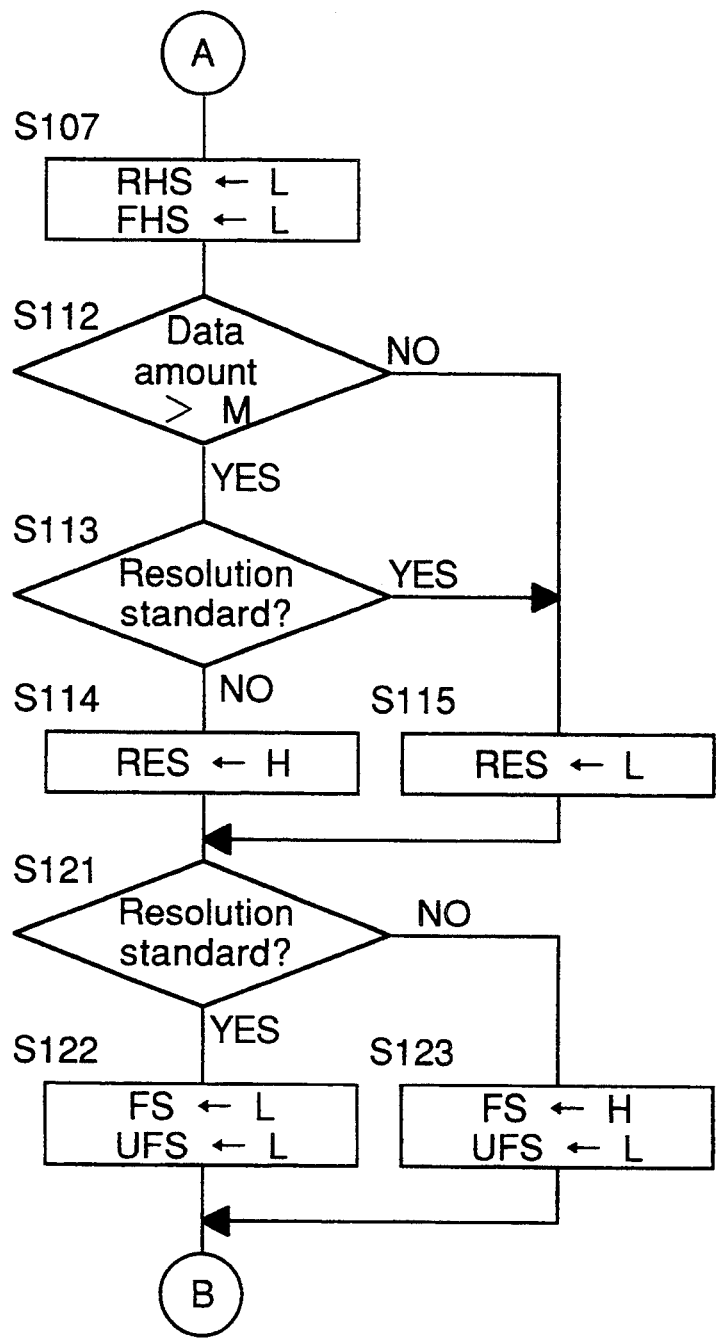

FIGS. 4 and 5 are flow charts showing a flow control of a control signal setting process executed by the MPU 50 in the receiving operation of facsimile communication. The MPU 50 executes the following control signal setting process based on the information on the apparatus emulation of the unique mode, the resolution, the binarizing method, and the recovery ON signal ROS which it receives in phase B of the receiving operation.

Referring to FIG. 4, step S101 checks whether or not the apparatus emulation mode is the above-mentioned unique mode permitted between the facsimile apparatuses manufactured by the same manufacturers. If it is the unique mode (YES at step S101), step S102 checks whether or not the binarizing method is of the first half-tone mode, and further, step S103 checks whether or not the binarizing method is of the second half-tone mode. On the other hand, if the apparatus emulation mode is not the unique mode (NO at step S101), then the program flow proceeds with step S107 shown in FIG. 5.

If the binarizing method is of the first half-tone mode (YES at step S102), then step S104 sets the random type half-tone signal RHS at the high level and also sets the Fattening type half-tone signal FHS at the low level, and then, the program flow proceeds to step S108. If the binarizing method is of the second half-tone mode (YES at step S103), then step S105 sets the random type half-tone signal RHS at the low level and also sets the Fattening type half-tone signal FHS at the high level, and then, the program flow proceeds to step S108. If the binarizing method is of neither the first nor the second half-tone mode (NO at both steps S102 and S103), then step S106 sets both the random type half-tone signal RHS and the Fattening type half-tone signal FHS at the low level, the program flow proceeds to step S108.

Next, step S108 checks whether or not the recovery ON signal ROS is at the high level, and further step S109 checks whether or not the resolution is in the standard mode. If the recovery ON signal ROS is at the high level (YES at step S108) and the resolution is not in the standard mode (NO at step S109), then step S110 sets the recovery execution signal RES at the high level, and then, the program flow proceeds to step S116. On the other hand, if the recovery ON signal ROS is at the low level (NO at step S108), or the resolution is in the standard mode (YES at step S109), then step S111 sets the recovery execution signal RES at the low level, and then, the program flow proceeds to step S116.

Step S116 checks whether or not the resolution is in the standard mode, and further step S117 checks whether or not the resolution is in the fine mode. If the resolution is in the standard mode (YES at step S116), then step S118 sets both the fine signal FS and the ultra fine signal UFS at the low level, and then, the present setting process has been completed. Further, if the resolution is in the fine mode (YES at step S117), then step S119 sets the fine signal FS at the high level and sets the ultra fine signal UFS at the low level, and then, the present setting process has been completed. Furthermore, if the resolution is in neither the standard nor the fine mode (NO at both steps S116 and S117), then step S120 sets the fine signal FS at the low level and sets the ultra fine signal UFS at the high level, and the present setting process has been completed.

On the other hand, if the apparatus emulation mode is not the unique mode, namely, it is the facsimile communication with a facsimile apparatus manufactured by a further manufacturer different from that of the present facsimile apparatus, the program flow proceeds from step S101 to step S107 of FIG. 5, then step S107 sets both the random type half-tone signal RHS and the Fattening type half-tone signal FHS at the low level, and then the program flow proceeds to step S112. Then step S112 checks whether or not the amount of the received image data per page exceeds the predetermined threshold value M, and further step S113 checks whether or not the resolution is in the standard mode. If the amount of the image data per page exceeds the threshold value M (YES at step S112) and the resolution is not in the standard mode (NO at step S113), then step S114 sets the recovery execution signal RES at the high level, and the program flow proceeds to step S121. On the other hand, if either the amount of the image data per page does not exceed the threshold value M (NO at step S112) or the resolution is in the standard mode (YES at step S113), then step S115 sets the recovery execution signal RES at the low level, and then, the program flow proceeds to step S121.

Step S121 checks whether or not the resolution is in the standard mode. If the resolution is in the standard mode (YES at step S121), then step S122 sets both the fine signal FS and the ultra fine signal UFS at the low level, and then, the present setting process has been completed. On the other hand, if the resolution is not in the standard mode (NO at step S121), then step S123 sets the fine signal FS at the high level and sets the ultra fine signal UFS at the low level, and then, the present setting process has been completed.

In the above-mentioned control signal setting process, the reason why the recovery execution signal RES is set at the low level when the resolution is in the standard mode is that, when the resolution is too low in the image recovery process, the spatial frequency of the texture of the pseudo half-tone becomes closer to the spatial frequency of the original image itself, resulting in not obtaining sufficiently satisfied recovery results. Besides, since the image recovery process is executed in only the fine mode or the ultra fine mode, the MPU 50 transfers only the ultra fine signal UFS to the image recovery processor 62.

Figure 6:
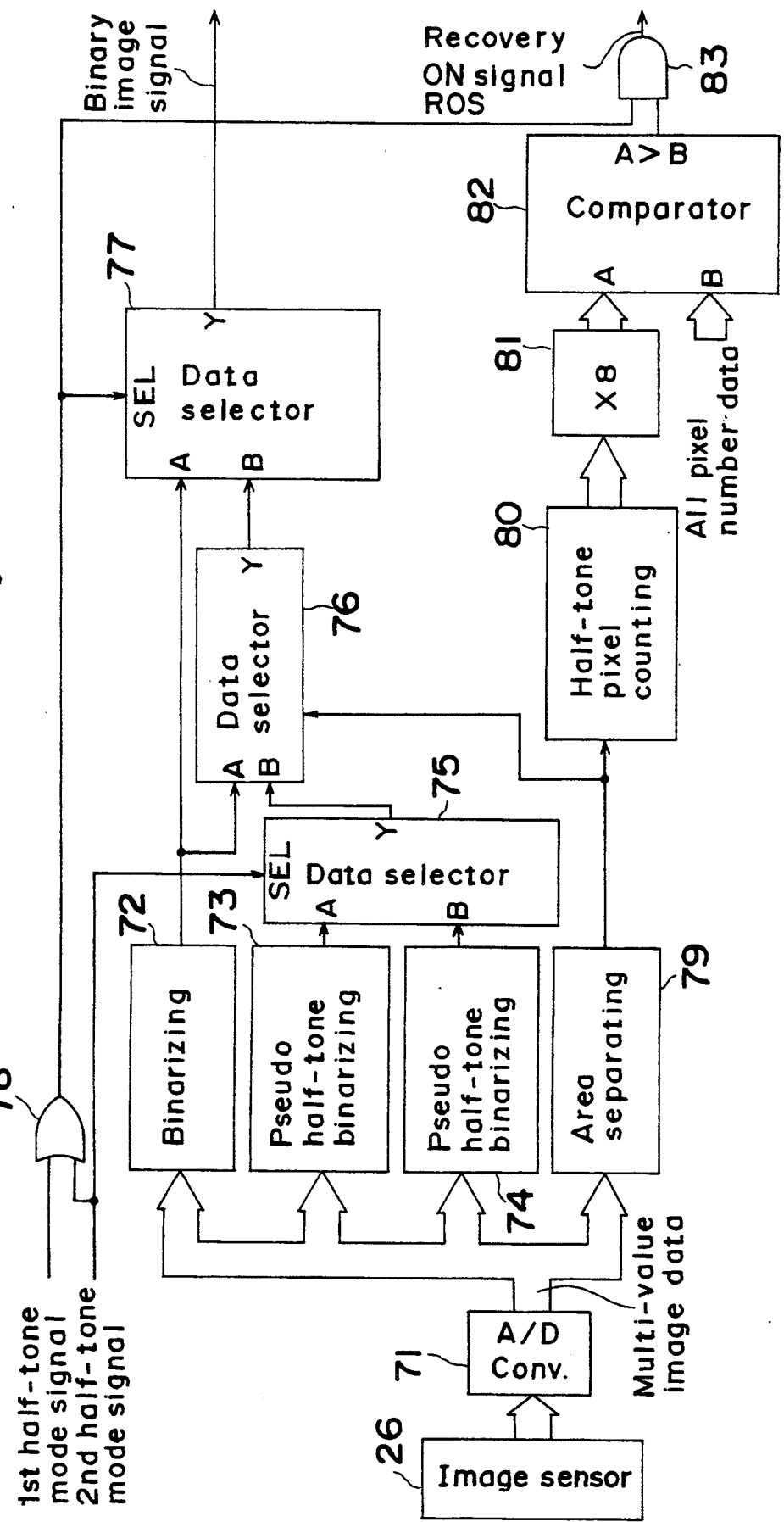
FIG. 6 is a schematic block diagram showing an image processor of the signal processing section of the facsimile apparatus shown in FIG. 3.

FIG. 6 shows the image processor 20a in the image reader 20 shown in FIG. 3.

Referring to FIG. 6, if the half-tone mode is set to the first half-tone mode using the key 543 of the operation panel 40, the MPU 50 outputs a first half-tone signal of the high level to a first terminal of an OR gate 78 Of the image processor 20a. Further, if the half-tone mode is set to the second half-tone mode using the key 543 of the operation panel 40, then the MPU 50 outputs a second half-tone signal of the high level to a second terminal of the OR gate 78 and a selection signal input terminal SEL of a data selector 75. The output signal from the OR gate 78 is inputted to not only a selection signal input terminal SEL of a data selector 77 but also a first input terminal of an AND gate 83.

The analog image signal outputted from the image sensor 26 is converted to a multi-value digital image signal by an analogue-to-digital converter 71, and then, the converted multi-value digital image signal is inputted to a simple binarizing section 72, pseudo half-tone binarizing sections 73 and 74, and an area separating section 79. The simple binarizing section 72 executes an simple binarizing process for the inputted multi-value digital image signal, namely, binarizes them using the simple binarizing method with one predetermined threshold value, and outputs the obtained binary image data to respective input terminals A of a data selector 76 and the data selector 77.

Further, the pseudo half-tone binarizing section 73 executes the pseudo half-tone binarizing process for the inputted multi-value image data using an error diffusion type pseudo half-tone binarizing method, or a random type dither pseudo half-tone binarizing method, and outputs the obtained binary image data to an input terminal A of the data selector 75. Furthermore, the pseudo half-tone binarizing section 74 executes the pseudo-half-tone binarizing process for the inputted multi-value image signal using a Fattening type ordered dither method, and outputs the obtained binary image data to an input terminal B of the data selector 75.

If the selection signal of the low level is inputted to the data selector 75, the data selector 75 outputs the binary image data inputted to its input terminal A, to an input terminal B of the data selector 76. On the other hand, if the selection signal of the high level is inputted to the data selector 75, the data selector 75 outputs the binary image data inputted to its input terminal B, to an input terminal B of the data selector 76.

The area separating section 79 judges whether an image located within a predetermined area having a specified pixel in the center thereof is a photographic image or a character image every pixel based on an inputted multi-value digital image signal. If the area separating section 79 judges that the image of the predetermined area including the specified pixel is a photographic image, it outputs a judgment signal of the high level to a selection signal input terminal SEL of the data selector 76 and a half-tone pixel counting section 80. On the other hand, if the area separating section 79 judges that the image of the predetermined area including the specified pixel is a character image, it outputs the judgment signal of the low level to the input terminal SEL of the data selector 76 and the half-tone pixel counting section 80.

Further, if the judgment signal is at the low level in the case of the character image area, the data selector 76 selects the binary image data binarized by the simple binarizing section 72 and outputs the selected binary image data to an input terminal B of the data selector 77. On the other hand, if the judgment signal is at the high level, the data selector 76 selects the binary image data binarized by one of the pseudo half-tone binarizing sections 73 and 74, and outputs the selected binary image data to the input terminal B of the data selector 77. Furthermore, if the selection signal of the low level is inputted to the data selector 77, the data selector 77 selects the binary image data binarized by the simple binarizing section 72, and outputs the selected binary image data to the buffer memory 59. On the other hand, if the selection signal of the high level is inputted to the data selector 77, the data selector 77 selects and outputs the binary image data outputted from the data selector 76, to the buffer memory 59.

The half-tone pixel counting section 80 counts the inputted judgment signal of the high level by page, and outputs data of the count value to an input terminal A of a comparator 82 through a multiplier 81 having a multiplier value of eight. The comparator 82 compares the value of the data inputted to its input terminal A with a predetermined number of pixels located on the whole page inputted to its input terminal B, and then, outputs a high level signal to a second input terminal of the AND gate 83 only if A>B. Finally, the AND gate 83 outputs the recovery ON signal ROS of either the high level or the low level.

In the image processor 20a constructed as described above, the recovery ON signal ROS of the high level is outputted to the MPU 50, only when the first half-tone mode or the second half-tone mode is set using the key 543 of the operation panel 40 and the half-tone area exceeds ⅛ of the one page. The reason why the recovery ON signal is thus generated is that, even if the binarization is made in a half-tone mode, it is preferable not to execute the image recovery process when the half-tone area is sufficiently small or smaller than a predetermined size thereof.

(3) Image recovery processor

Referring to FIG. 7, the image recovery processor 62 is equipped with the half-tone image recovery section 101 that recovers multi-value half-tone data from received binary image data. This recovery process for half-tone images has the following advantageous effects.

Half-tone image data such as a photograph image data is in general represented by multi-value image data with a plurality of bits per pixel. However, in transmitting image data as in facsimile communications and in storing image data in a memory such as filing, conversion of the multi-value image data to binary image data with pseudo half-tones can greatly reduce the amount of data to be transmitted or stored.

The recovery process is also useful for storing or displaying half-tone image data binarized by a pseudo half-tone binarizing method in a form of binary image with pixel densities different from each other. That is, performing magnification or reduction after converting into multi-value image data instead of simple magnification or reduction can prevents a Moire caused due to a periodicity of the original pseudo half-tone binary image data. In this case, the recovered multi-value image data are binarized using a pseudo half-tone binarizing method, and then, the binarized image data are outputted to a CRT display or a printer. Then, if the output system can process the inputted data with a relatively high density, then the performance of the output system can be fully utilized. Further, the recovery process is also useful for outputting recovered multi-value image data to a multi-value output system such as a multi-value display or printer for displaying or recording an image of the multi-value image data in multi-value gradation stages.

FIG. 7 shows the image recovery processor 62 shown in FIG. 3.

Figure 8:
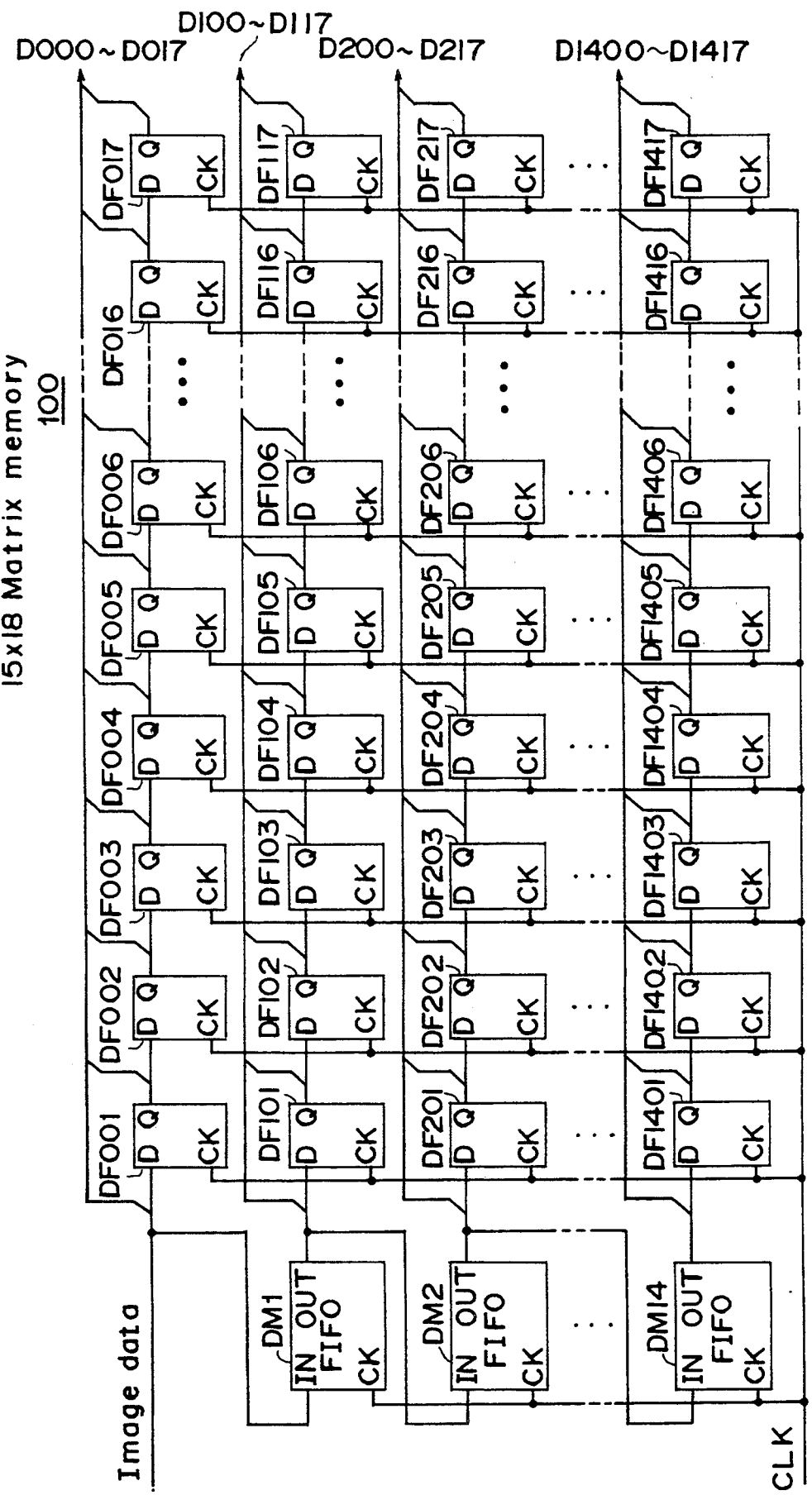
FIG. 8 is a schematic block diagram showing a 15×18 matrix memory shown in FIG. 7.

Referring to FIG. 7, binary image data outputted in serial from the page memory 61 are inputted to a 15×18 matrix memory 100. As shown in FIG. 8, the 15×18 matrix memory generates pixel data D000 through D1417 located at respective positions of the matrix located within a 15×18 window, and then, outputs them to the smoothed amount calculation section 109, the edge emphasis amount calculation section 110 and the edge judgment calculation section 111 of the half-tone image recovery section 101, the adjacent state judgment section 105 and the ordered dither type half-tone judgment section 106 of the image area judgment section 102, and the binary to multi-value converter 103.

The half-tone image recovery section 101 comprises the smoothed amount calculation section 109, the edge emphasis amount calculation section 110, the edge judgment amount calculation section 111 and the recovered data calculation section 112. The smoothed amount calculation section 109 calculates and outputs the first, second and third smoothed amount data for recovering half-tone image data based on the pixel data of the received binary image data. The edge emphasis amount calculation section 110 calculates and outputs the first, second and third edge emphasis amount data for executing the edge emphasis process based on the pixel data of the received binary image data. The edge judgment amount calculation section 111 calculates and outputs the first and second edge judgment amount data for detecting an edge area based on pixel data of received binary image data. The recovered data calculation section 112 recovers and outputs multi-value half-tone image data based on the data outputted from the sections 109, 110 and 111, the Fattening type half-tone judgment signal and the ordered dither type half-tone judgment signal outputted from the judgment data signal generator 114, and the ultra fine signal UFS outputted from the MPU 50.

The image area judgment section 102 comprises the adjacent state judgment section 105, the ordered dither type half-tone judgment section 106, the 9×17 matrix memory 107, the judgment data generator 108 and the judgment data signal generator 114. The adjacent state judgment section 105 calculates the adjacency number representing the adjacent state in the four directions of the main scan and subscan directions for the same kind of minor pixels located within a predetermined 7×7 window having the specified pixel in the center thereof, calculates a total number of black pixels in a predetermined 7×7 window having the specified pixel in the center thereof, and further based on these calculated data, the ultra fine signal UFS and the Fattening type half-tone signal FHS outputted from the MPU 50, it generates and outputs, the non-Bayer type half-tone detection signal representing that the image of the predetermined area having the specified pixel in the center thereof is a non-Bayer type half-tone image, the Bayer type half-tone detection signal representing that the image of the predetermined area is a Bayer type half-tone image, and the all-black or all-white image detection signal representing that the image of the area is an all-black or all-white image. On the other hand, the ordered dither type half-tone judgment section 106 finds out whether or not the image of a predetermined area having the specified pixel in the center thereof is an ordered dither type half-tone image, and then, generates and outputs the ordered dither type half-tone detection signal that indicates the result thereof. The 9×17 matrix memory 107 simultaneously outputs, for every pixel located within the 9×17 window having the specified pixel in the center thereof, the detection signals which consist of 4 bits and are outputted in serial for each pixel from the adjacent state judgment section 105 and the ordered dither type half-tone judgment section 106.

The judgment data generator 108 generates and outputs four judgement data by adding up respective detection signals for all the pixels located within the 9×17 window outputted from the matrix memory 107. Finally, the judgment data signal generator 114 generates and outputs, based on the judgment data outputted from the judgment data generator 108, the Fattening type half-tone judgment signal representing whether or not the image of the area located within the predetermined 9×17 window is a Fattening type half-tone image, and further generates and outputs the ordered dither type half-tone judgment signal representing whether or not the same image is an ordered dither type-tone image. Further, the judgment data signal generator 114 generates and outputs the image area judgment data which describes to what degree the above area is a non-half-tone area. The image area judgment data takes a value ranging from zero to one so that, if the image of the predetermined area is completely a half-tone image, then the value of the image area judgment data is 0, and if the image of the area is completely a non-half-tone image, then the value thereof is 1.

The binary to multi-value converter 103 converts, based on pixel data outputted from the matrix memory 100, binary image data which were binarized by a non-half-tone binarizing method using a predetermined threshold value, into multi-value non-half-tone image data showing black pixel or white pixel, and then, outputs the same to the data mixing section 104.

Figure 19:
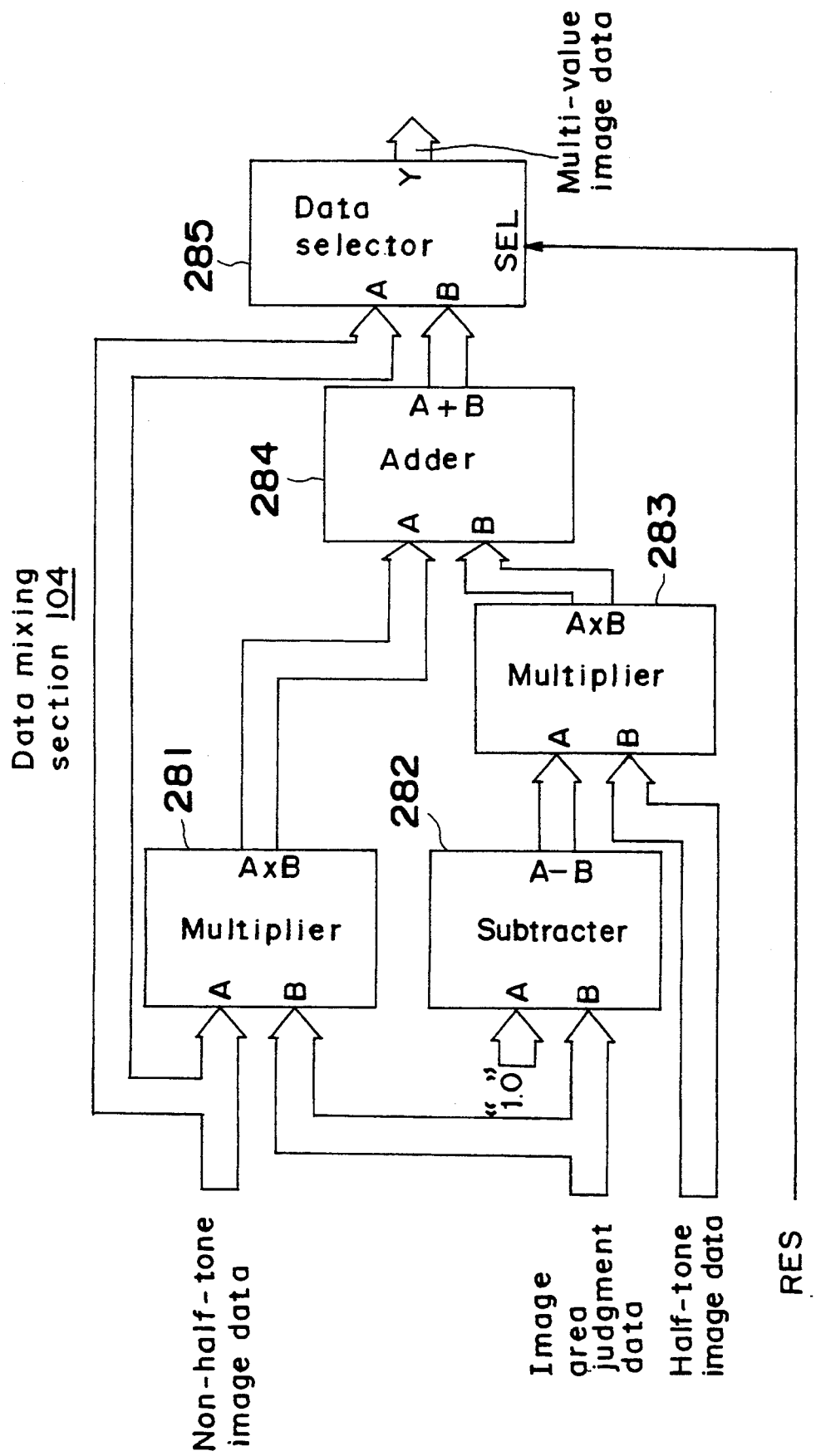
FIG. 19 is a schematic block diagram showing a data mixing section shown in FIG. 7.

The data mixing section 104 comprises a multiplier 281, a subtracter 282, a multiplier 283, an adder 284 and a data selector 285 as shown in FIG. 19. If the recovery execution signal RES is at the high level, the data mixing section 104 generates multi-value image data by calculating the following formula (1), based on multi-value half-tone image data outputted from the half-tone image recovery section 101, the multi-value non-half-tone image data outputted from the binary to multi-value converter 103 and the above image area judgment data, i.e., by mixing the two image data in a proportion ratio represented by the image area judgment data:

Multi-value image data = (1)

(Half-tone image data) × {1 − (Image area judgment data)} +

(Non-half-tone image data) × (Image area judgment data).

(1).

If the recovery execution signal RES is at the high level, then the data mixing section 104 selects the mixed image data in the data selector 285, and then, outputs the selected image data to the printer controller 55 through the interpolation processor 64. On the other hand, if the recovery execution signal RES is at the low level, then the data mixing section 104 selects the multi-value non-half-tone image data outputted from the binary to multi-value converter 103 and outputs the selected multi-value non-half-tone image data to the printer controller 55 through the interpolation processor 64.

As described above, the present preferred embodiment recovers multi-value image data by mixing the half-tone image data and the non-half-tone image data according to the proportion ratio represented by the image area judgment data, which describes a degree of non-half-tone of the image data, in order to prevent incorrect discrimination of the image area.

(4) 15×18 matrix memory

FIG. 8 shows the 15×18 matrix memory 100 shown in FIG. 7.

Referring to FIG. 8, the 15×18 matrix memory 100 comprises:

(a) 14 FIFO memories DM1 through DM14, each of which delays inputted image data by one horizontal scanning interval of one scanning time in the main scan direction, based on a clock CLK having the same period as that of the transfer clock of binary image data inputted from the page memory 61 or a period of one dot of the image data; and (b) 15×17 delay type flip-flops DF001 through DF017, DF101 through DF117, DF201 through DF217, ..., DF1401 through DF1417, each of which delays and outputs image data in synchronous with the above clock CLK by one period of the clock CLK.

In the 15×18 matrix memory 100, the flip-flops DF001 to DF017 are connected in serial, the FIFO memories DM1 to DM14 are connected in serial, and the FIFO memory DMi and the flip-flops DFi01 through DFi17 are connected in serial for every i=1, 2, 3, ..., 14.

Binary image data outputted from the page memory 61 in serial in an order of the first pixel to the last pixel of the image of each page are inputted to the FIFO memory DM1 as well as inputted to the flip-flop DF001, and then, they are outputted directly. The image data outputted from the FIFO memory DM1 are inputted to the FIFO memory DM2 as well as inputted to the flip-flop DF101, and then, they are outputted directly. Similarly, the image data outputted from the FIFO memories DM2 through DM13 connected in serial are inputted to the FIFO memories DM3 through DM14 connected in serial, respectively, as well as inputted to the flip-flops DF201 through DF1301 respectively, and then, they are outputted directly. The image data outputted from the FIFO memory DM14 are inputted to the flip-flop DF1401, and then, they are outputted directly. The image data outputted from the flip-flop DFi01 are inputted to the flip-flop DFi02, and then, they are outputted directly for every i=0, 1, 2, ..., 14. Similarly, the image data outputted from the flip-flops DFi02 through DFi16 are inputted to the flip-flops DFi03 through DFi17 respectively, and then, they are outputted directly for every i=0, 1, 2, ..., 14.

In the 15×18 matrix memory 100 configured as described above, when the pixel data of one dot first inputted thereto are outputted from the flip-flop DF1417, the pixel data inputted at the same time to the matrix memory 100 are outputted as pixel data D000, and the pixel data D001 through D017 on the main scan line n=0 located within the 15×18 window are outputted from respective flip-flops DF001 through DF017. Similarly, at the same time, the pixel data Di00 and Di01 through Di17 on the main scan line n=i located within the 15×18 window are outputted from the respective FIFO memories DMi and respective flip-flops DFi01 through DFi17 for i=1, 2, 3, ... 14.

(5) Image area judgment section (5-1) Structure and Operation of Each section

FIGS. 9 through 14 shows the image area judgment section 102, which comprises the adjacent state judgment section 105, the ordered dither type half-tone judgment section 106, the 9×17 matrix memory 107, the judgment data generator 108, and the judgment data signal generator 114. The features of the operation of the image area judgment section 102 are as follows.

Figure 20:
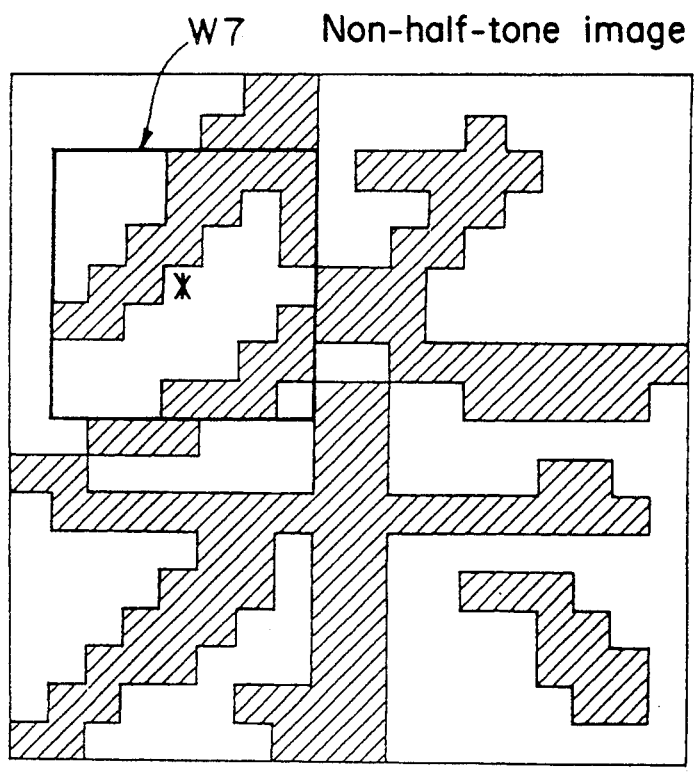
FIG. 20 is a front view showing one example of a non-half-tone image obtained when image data of character image are binarized using a predetermined threshold value.
Figure 21:
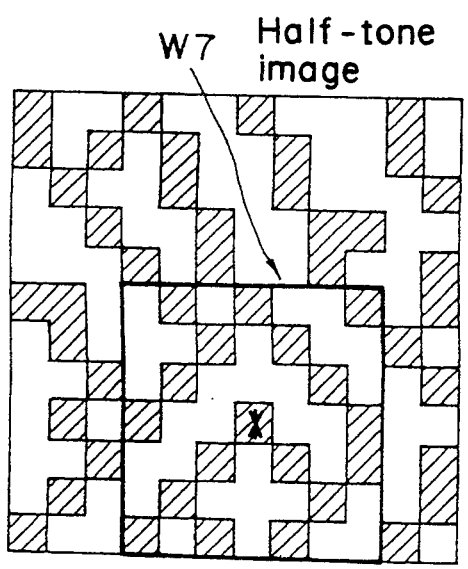
FIG. 21 is a front view showing one example of an image obtained when binarizing image data of a uniform density chart using a pseudo half-tone method of an error diffusion method.
Figure 22:
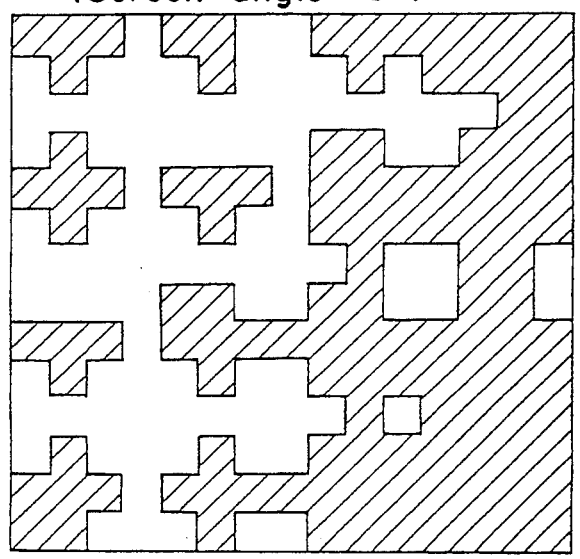
FIG. 22 is a front view showing an example of an ordered dither type half-tone image obtained by reading a photograph and binarizing it by a Fattening type ordered dither method with a screen angle of 0 degree.

FIG. 20 shows an example of non-half-tone image obtained by reading a character image and binarizing the same using a predetermined threshold value. FIG. 21 shows an example of a binarized pseudo half-tone image obtained by reading a chart of uniform darkness and binarizing the same using the error diffusion method. FIG. 22 shows an example of an ordered dither type half-tone image obtained by reading a photograph and binarizing the same using a Fattening type ordered dither method with a screen angle of zero degree.

The adjacent state judgment section 105 executes a process for judging whether or not the image of inputted image data is a Bayer type half-tone image. On the other hand, the ordered dither type half-tone judgment section 106 executes a process for judging whether or not the image of inputted image data is an ordered dither type half-tone image.

The adjacent state judgment section 105 discriminates a half-tone image such as that shown in FIG. 21 from a non-half-tone image such as that shown in FIG. 22. Since the number of black pixels located within the window W7 of FIG. 20 and that located within the window W7 of FIG. 21 are almost the same (20 and 18 respectively), their image densities are almost the same as each other. A great difference between these images is an adjacent state of minor pixels in the main scan and subscan directions, wherein minor pixels mean either black pixels or white pixels such that their number is smaller. For example, in both FIG. 20 and FIG. 21, minor pixels are black pixels.

Figure 23:
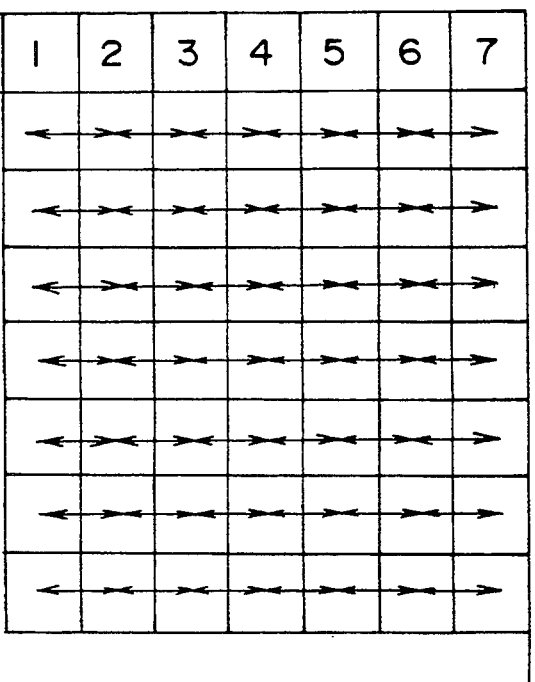
FIG. 23 is a front view showing adjacency in the main scan direction in respective pixels within a 7×7 window.
Figure 24:
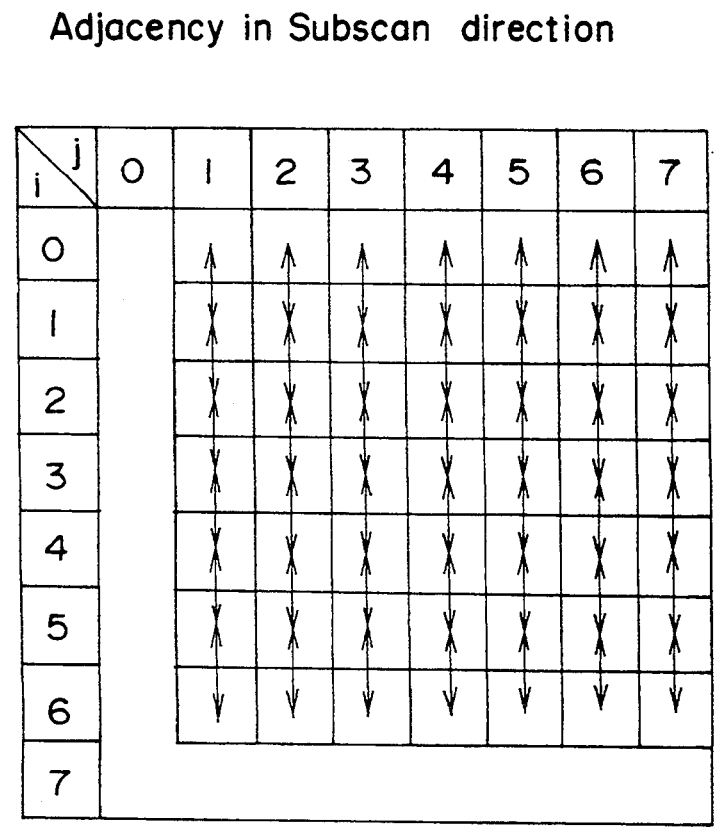

A total number of adjacent points each adjacent point located on a boundary line between a pair of minor pixels adjacent to each other in one of the four directions of the main scan and subscan directions located within the 7×7 window having the specified pixel in the center thereof is called an adjacency number hereinafter. In the present preferred embodiment, there is counted an adjacency number in the main scan direction as shown in FIG. 23, and also there is counted an adjacency number in the subscan direction as shown in FIG. 24. It is to be noted that the specified pixel is denoted by an asterisk * in Figs.

Figure 25:
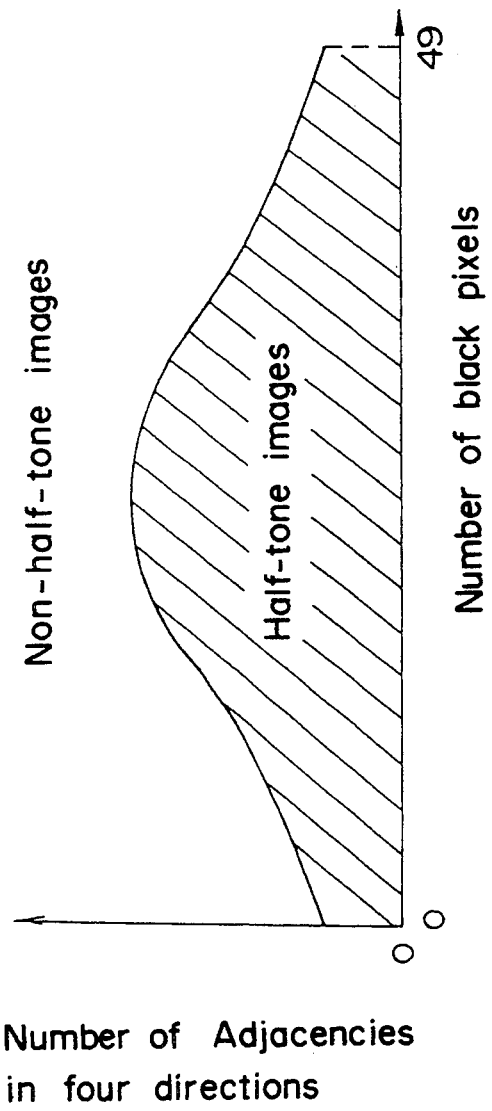
FIG. 25 is a graph of a number of adjacencies in four directions of the main scan and subscan directions on a number of black pixels, which is provided for showing not only respective areas of a half-tone image area and a non-half-tone image area but also a threshold value of a number of adjacencies in the four directions.
Figure 26:
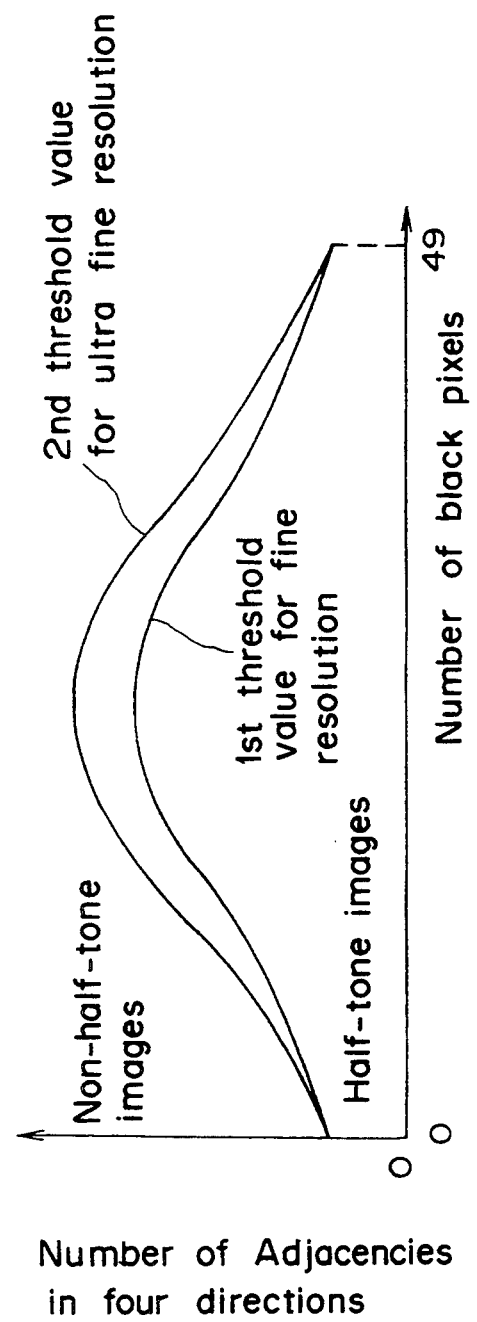
FIG. 26 is a graph of a number of adjacencies in four directions of the main scan and subscan directions on a number of black pixels, which is provided for showing not only respective areas of a half-tone image area and a non-half-tone image area but also threshold values of numbers of adjacencies in the four directions for a fine mode and a ultra fine mode.

Generally speaking, in a graph of the adjacency number in the four directions of the main scan and subscan directions depending on the black pixels of the minor pixels located within a 7×7 window having the specified pixel in the center thereof, the half-tone image area which is the Bayer type half-tone image is separated from the non-half-tone image area which is the non-Bayer type half-tone image, as shown in FIG. 25. As is apparent from FIG. 25, when the number of black pixels is equal to that of white pixels in the predetermined window W7, the adjacency number in the four directions of the main scan and subscan directions representing a threshold value on a boundary line between respective image areas increases. In an area on the graph where the adjacency number in the four directions is larger than the above-mentioned threshold value of the boundary line, there are non-half-tone images. On the other hand, in another area on the graph where the adjacency number in the four directions is smaller than the above-mentioned threshold value of the boundary line, there are half-tone images.

The threshold value of the above-mentioned adjacency number becomes larger, as resolution upon reading images becomes higher, for the following reasons.

(a) An edge whose density steeply changes existing in an image belonging to the Bayer type half-tone image area may be misjudged as a non-Bayer type half-tone image. However, if an edge whose density steeply changes obtained when reading an image in the fine mode is read in the ultra fine mode, there is obtained an edge whose density gradually changes. Therefore, as the edge image is read with a higher resolution, the gradient of the slope of the edge decreases. If there are a plurality of edges in an image, the number of edges whose density steeply changes decreases as the image is read with a higher resolution.

(b) An image of a fine line easily becomes an image of a broken line by the image reading process, and the broken line is judged as the Bayer type half-tone image. However, when an image of a fine line is read with a higher resolution, there may be obtained a straight line having a sufficiently large width. If there are a plurality of broken lines, the number of such broken lines decreases as the image is read with a higher resolution.

Therefore, in the present preferred embodiment, as the above-mentioned threshold value of the adjacency number in the four directions, there are prepared a first threshold value for the fine mode and a second threshold value for the ultra fine mode. Data of the former threshold value are stored in a table ROM 123 shown in FIG. 9, and data of the latter threshold value are stored in a table ROM 124 shown in FIG. 9. Then the comparator 127 judges whether an image located within a 7×7 window having the specified pixel in the center thereof is either a Bayer type half-tone image or a non-Bayer type half-tone image by comparing the adjacency number in the four directions of the main scan and subscan directions with a threshold value outputted from the table ROM 123 or 124 or comparing the same with zero only when the Fattening type half-tone signal is at the high level.

Next, a judgement method used in the ordered dither type half-tone judgment section 106 that discriminates an ordered dither type half-tone image will be described below.

Figure 27:
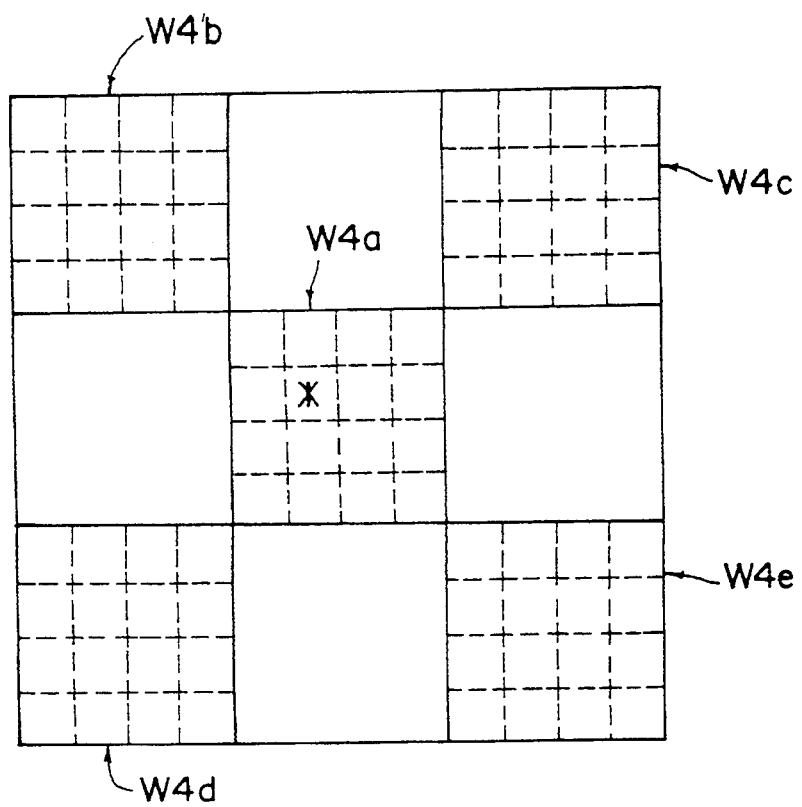
FIG. 27 is a front view of five windows W4a through W4e for pattern matching which is provided for explaining a method of pattern matching of calculating a half-tone index for a Fattening type half-tone image.

Generally speaking, an ordered dither type half-tone image can be discriminated from the others based on a periodicity of the image, and the present preferred embodiment employs a method of pattern matching using five windows W4a through W4e shown in FIG. 27.

The ordered dither type half-tone judgment section 106 checks pattern matching between the 4×4 window W4a having the specified pixel * in the center thereof and each of the four 4×4 windows W4b through W4e located in diagonal directions perpendicular to each other by counting the number of pixels, pixel data of which located in the same positions do not coincide with each other, resulting in obtaining a half-tone judgment value for the Fattening type half-tone image. In this case, the above-mentioned diagonal directions are the four directions making angles of 45 degrees with both the main scan direction and the subscan direction. The above four windows are provided in order to be applied to two kinds of Fattening type half-tone images, one with the screen angle of 0 degree and the other with the screen angle of 45 degrees.

Figure 28:
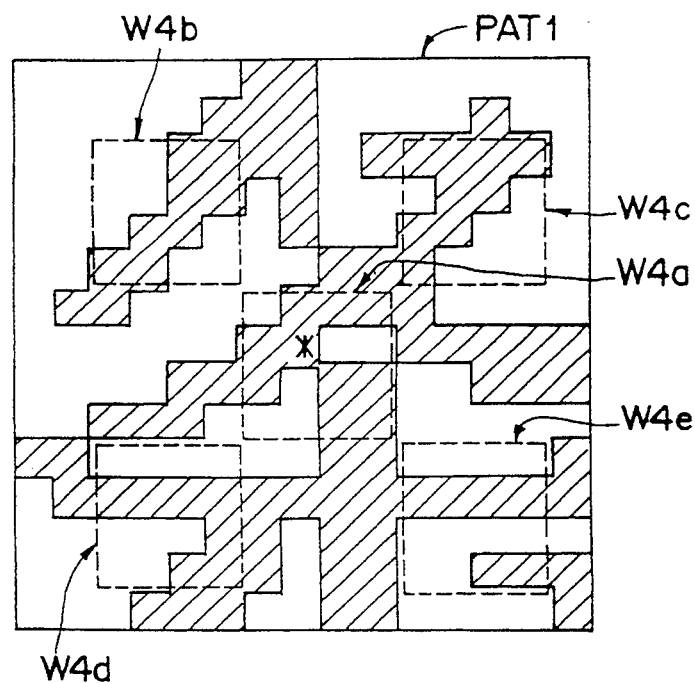
FIG. 28 is a front view of a first image pattern PAT1 which is used for showing a calculation example obtained using the method of pattern matching using the five windows W4a through W4e shown in FIG. 27.
Figure 29:
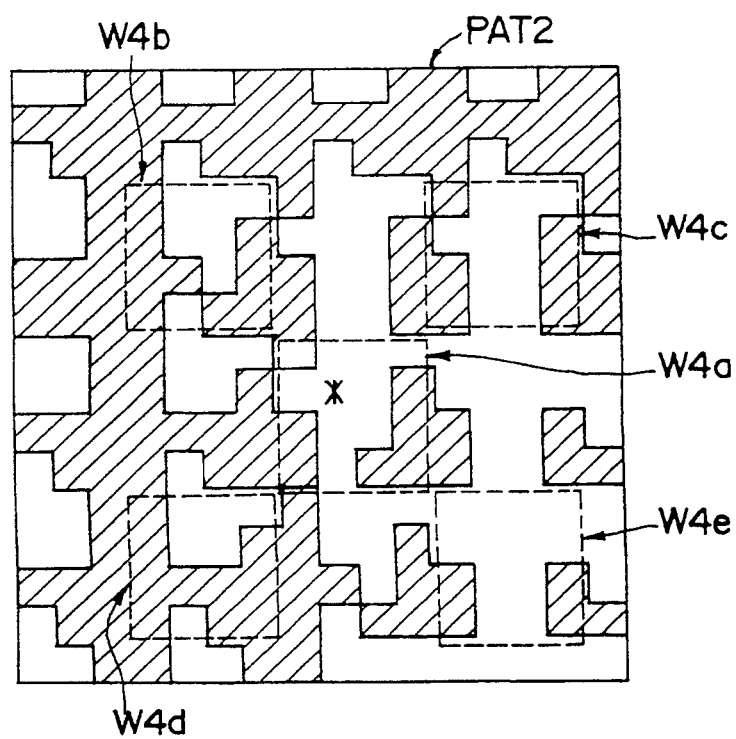
FIG. 29 is a front view of a second image pattern PAT2 which is used for showing a calculation example obtained using the method of pattern matching using the five windows W4a through W4e shown in FIG. 27.
Figure 30:
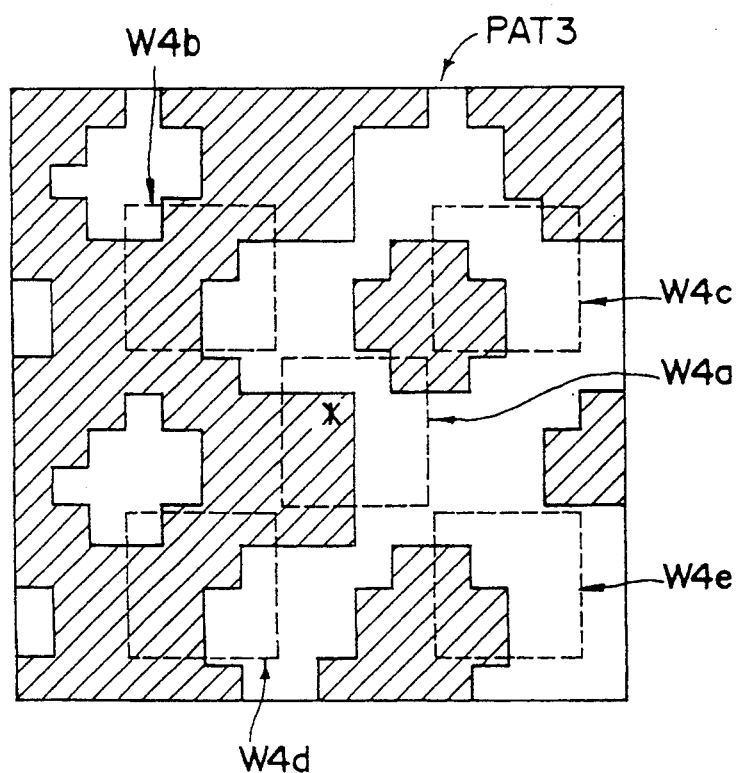
FIG. 30 is a front view of a third image pattern PAT3 which is used for showing a calculation example obtained using the method of pattern matching using the five windows W4a through W4e shown in FIG. 27.

Table 1 shows counted results of numbers of non-matching pixels using the above-mentioned pattern matching method, with respect to an image pattern PAT 1 shown in FIG. 28, an image pattern PAT 2 shown in FIG. 29 and an image pattern PAT3 shown in FIG. 30. The image pattern PAT1 is a non-half-tone image, the image pattern PAT2 is an ordered dither type half-tone image binarized by the Fattening type ordered dither method with a screen angle of 0 degree and a period of four pixels, and the image pattern PAT3 is an ordered dither type half-tone image binarized by the Fattening type ordered dither method with a screen angle of 45 degrees and a period of four pixels.

As is apparent from Table 1, the counted total number of non-matching pixels of the non-half-tone image pattern PAT1 is larger than those of the other image patterns PAT2 and PAT3. Therefore, ordered dither type half-tone images shown in FIGS. 29 and 30 can be detected.

(5-2) Adjacent state judgment section

Figure 9:
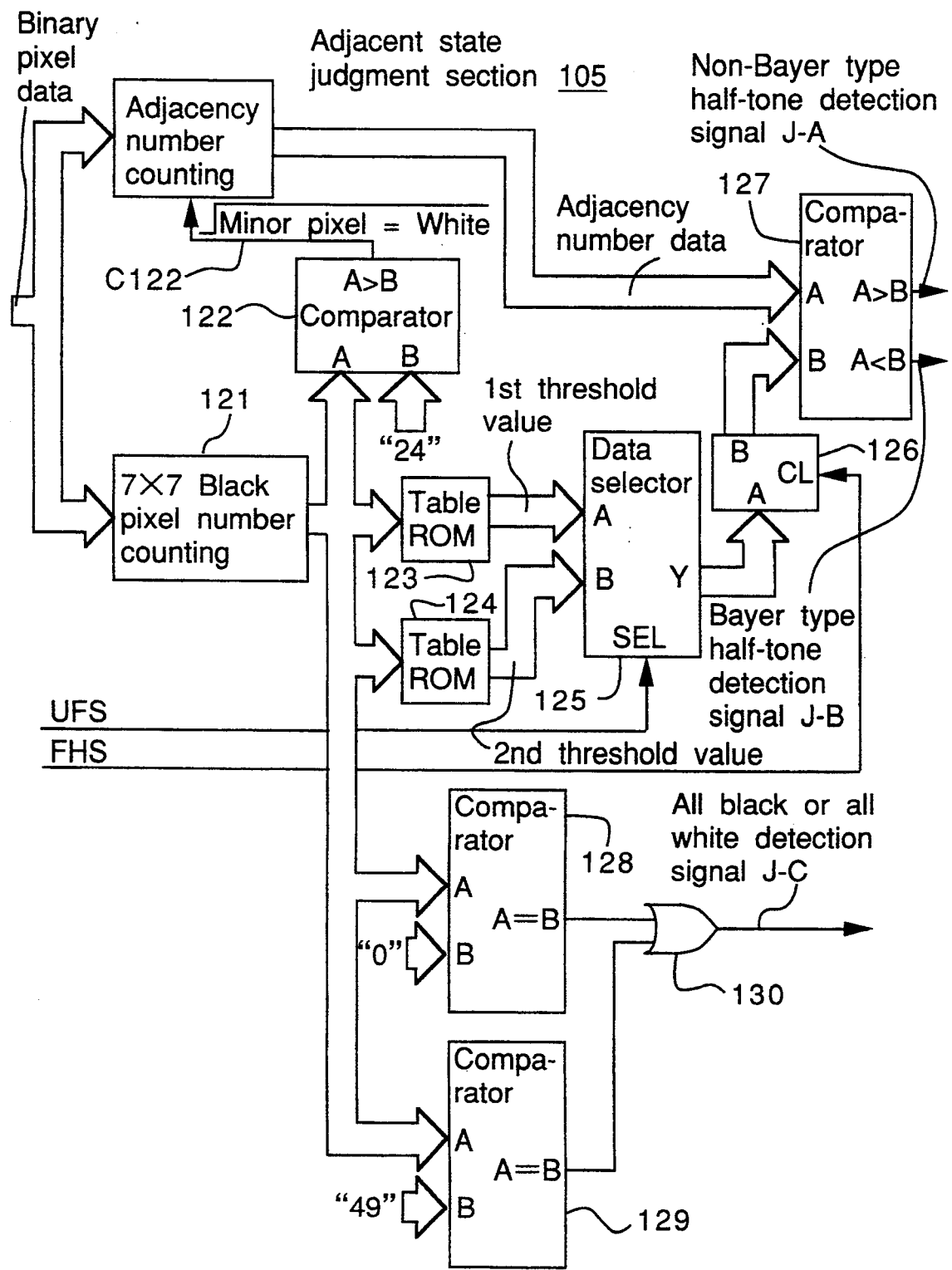
FIG. 9 is a schematic block diagram showing an adjacent state judgment section shown in FIG. 7.

FIG. 9 shows the adjacent state judgment section 105. The present preferred embodiment obtains an adjacency number by counting a number of adjacent points each adjacent point on the boundary line between a pair of the two same kind of minor pixels among the adjacent points shown by bidirectional arrows in FIGS. 23 and 24. An adjacency number counting circuit 120 shown in FIG. 10 is provided for counting a number of adjacent points along each one scanning line in the main scan direction or the subscan direction.

Referring to FIG. 9, a 7×7 black pixel number counting circuit 121 counts a number of black pixels located within a 7×7 window having the specified pixel in the center thereof, and then, generates and outputs the counted value data to an input terminal A of an comparator 122, respective address terminals of table ROMs 123 and 124, and respective input terminals A of comparators 128 and 129. In response to the counted value data, the table ROM 123 outputs the corresponding first threshold value for the fine mode to an input terminal A of a data selector 125, while the table ROM 124 outputs the corresponding second threshold value for the ultra fine mode to an input terminal B of the data selector 125. If the ultra fine signal UFS inputted as a selection signal to the data selector 125 is at the low level, the data selector 125 selects data of the first threshold value, and then, outputs the selected data to an input terminal B of a comparator 127 through a clear circuit 126. On the other hand, if the ultra fine signal UFS is at the high level, the data selector 125 outputs data of the second threshold value to the input terminal B of the comparator 127.

On the other hand, the comparator 122 finds out which of black pixels and white pixels are minor pixels by comparing the total number of black pixels with a constant of 24. If the minor pixels are white pixels, the comparator 122 generates and outputs a judgment signal C122 of the high level to the adjacency number counting circuit 120. On the other hand, if the minor pixels are black pixels, the comparator 122 generates and outputs the judgment signal C122 of the low level to the adjacency number counting circuit 120.

Figure 10:
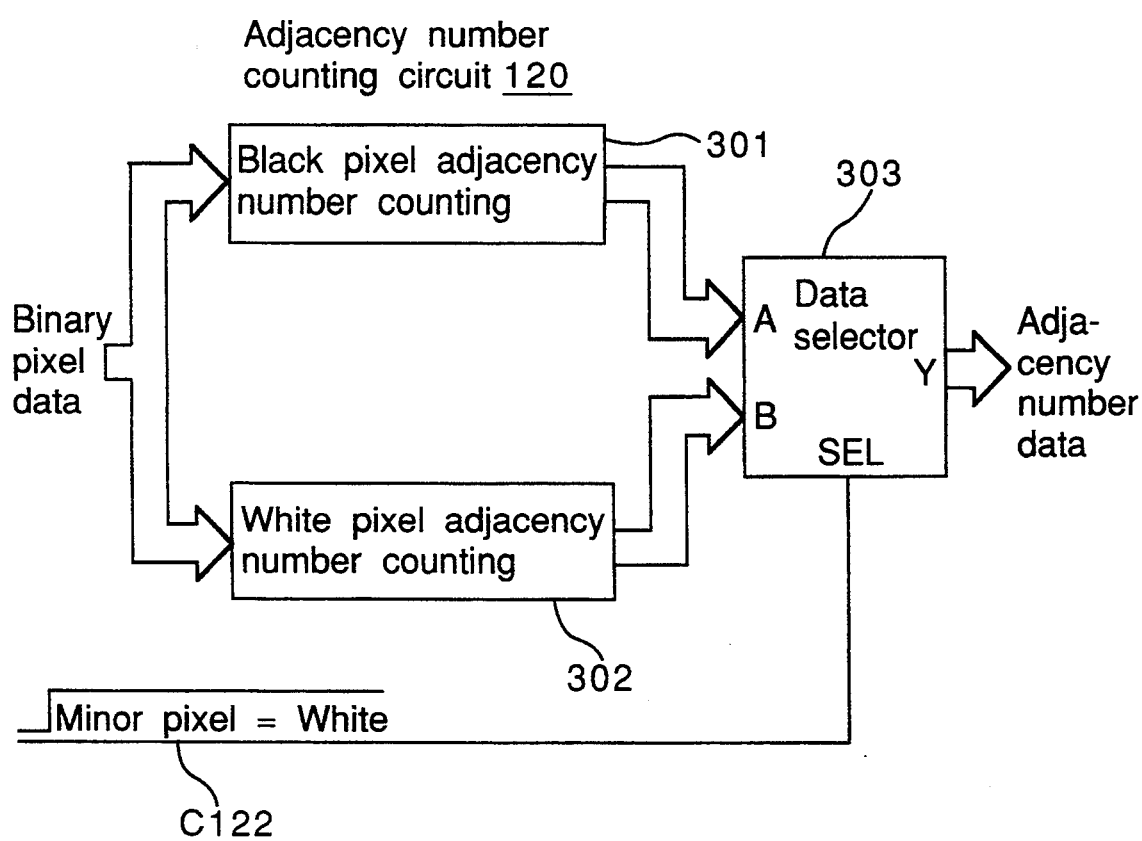
FIG. 10 is a schematic block diagram showing an adjacency number counting circuit shown in FIG. 9.

Referring to FIG. 10, the adjacency number counting circuit 120 comprises not only black and white pixel adjacency number counting circuits 301 and 302 but also data selector 303. The black pixel adjacency counting circuit 301 counts a number of adjacency points in the four directions of the main scan and subscan directions shown in FIGS. 23 and 24 of the black pixels, while the white pixel adjacency counting circuit 302 counts that of the white pixels. Further, the data selector 303 selects data of the adjacency number in the four directions of the minor pixels based on the judgment signal C122 representing the kind of the minor pixels, among those outputted from the black and white pixel adjacency number counting circuits 301 and 302, and then, outputs the selected data to an input terminal A of the comparator 127.

Referring back to FIG. 9, the comparator 127 compares the adjacency number with the threshold value inputted to the input terminal B thereof. If A>B, then the comparator 127 outputs not only a non-Bayer type half-tone detection signal J-A of the high level but also a Bayer type half-tone detection signal J-B of the low level to the 9×17 matrix memory 107. On the other hand, if A<B, then the comparator 127 outputs not only the non-Bayer type half-tone detection signal J-A of the low level but also the Bayer type half-tone detection signal J-B of the high level to the 9×17 matrix memory 107. Further, if A=B, then the comparator 127 outputs not only the non-Bayer type half-tone detection signal J-A of the low level but also the Bayer type half-tone detection signal J-B of the low level to the 9×17 matrix memory 107.

If the Fattening type half-tone signal FHS is set at the high level, i.e., if the received binary image data are image data binarized by the Fattening type ordered dither method in the case of a facsimile receiving in the above-mentioned unique mode, then the threshold value is cleared to zero by the clear circuit 126, and the Bayer type half-tone detection signal J-B is thereby set at the low level.

On the other hand, the comparator 128 compares the counted data of the total number of black pixels with a constant of zero, and generates and outputs a high level signal to a first input terminal of an OR gate 130 if they are equal to each other. The comparator 129 compares the counted value data of the number of black pixels with a constant of 49, and generates and outputs a high level signal to a second input terminal of the OR gate 130 if they are equal to each other. The OR gate 130 generates and outputs an all-black or all-white detection signal J-C of the high level to the 9×17 matrix memory 107 if at least one of the inputted signals is at the high level.

(5-3) Ordered dither type half-tone judgment section

Figure 11:
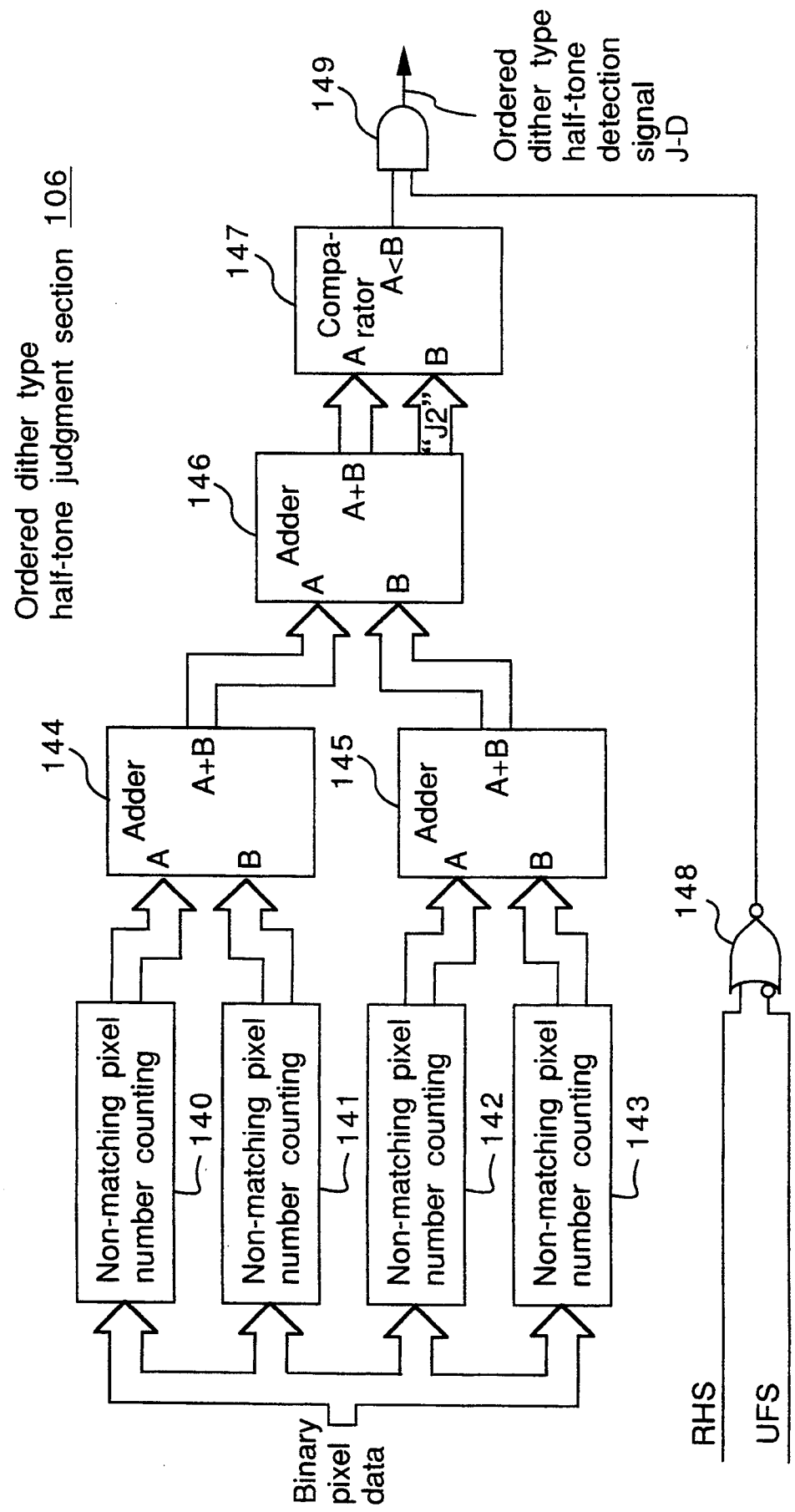
FIG. 11 is a schematic block diagram showing an ordered dither type half-tone judgment section shown in FIG. 7.

FIG. 11 shows the ordered dither type half-tone judgment section 106 shown in FIG. 7.

Referring to FIG. 11, a non-matching pixel number counting circuit 140 counts a number of non-matching pixels between the windows W4a and W4b shown in FIG. 27. A non-matching pixel number counting circuit 141 counts a number of non-matching pixels between the windows W4a and W4c shown in FIG. 27. A non-matching pixel number counting circuit 142 counts a number of non-matching pixels between the windows W4a and W4d shown in FIG. 27. A non-matching pixel number counting circuit 143 counts a number of non-matching pixels between the windows W4a and W4e in FIG. 27. The counted value data counted by the counting circuits 140 through 143 are added up by adders 144 through 146, and then, data of the addition result thereof are inputted to an input terminal A of a comparator 147. The comparator 147 compares the inputted total number with a predetermined threshold value J2 inputted to an input terminal B thereof. If A<B in the comparator 147, then the comparator 147 generates and outputs a high level signal to a first input terminal of an AND gate 149. Otherwise, the comparator 147 generates and outputs a low level signal thereto. In the present preferred embodiment, the threshold value J2 to be inputted to the comparator 147 is preferably 15.

On the other hand, the random type half-tone signal RHS is inputted to a first input terminal of a NOR gate 148, and the ultra fine signal UFS is inputted to a second inverted input terminal of the NOR gate 148. The output signal from the NOR gate 148 is inputted to a second input terminal of the AND gate 149, which generates and outputs an ordered dither type half-tone detection signal J-D.

In the ordered dither type half-tone judgment section 106 constructed as describe above, if the non-matching total pixel number obtained by the counting circuits 140 through 143 and the adders 144 through 147 is smaller than the above-mentioned threshold value J2, the ordered dither type half-tone judgment section 105 judges the image of the inputted image data as the ordered dither type half-tone image, and generates and outputs the ordered dither type half-tone detection signal J-D of the high level. However, if the image data received in the above-mentioned unique mode are binary image data binarized using the random dither method, then the ordered dither type half-tone detection signal J-D is set at the low level by the NOR gate 148 and the AND gate 149 because of the following reasons. The method of discriminating the ordered dither type half-tone image using the method of pattern matching assumes that in the ordered dither type half-tone images, there is not much change in density between two adjacent windows to be matched. However, this assumption does not hold, if the resolution upon reading the image decreases. In this case, the method of pattern matching increases the possibility of erroneously judging the ordered dither type half-tone image to be a non-ordered dither type half-tone image.

(5-4) 9×17 matrix memory

Figure 12:
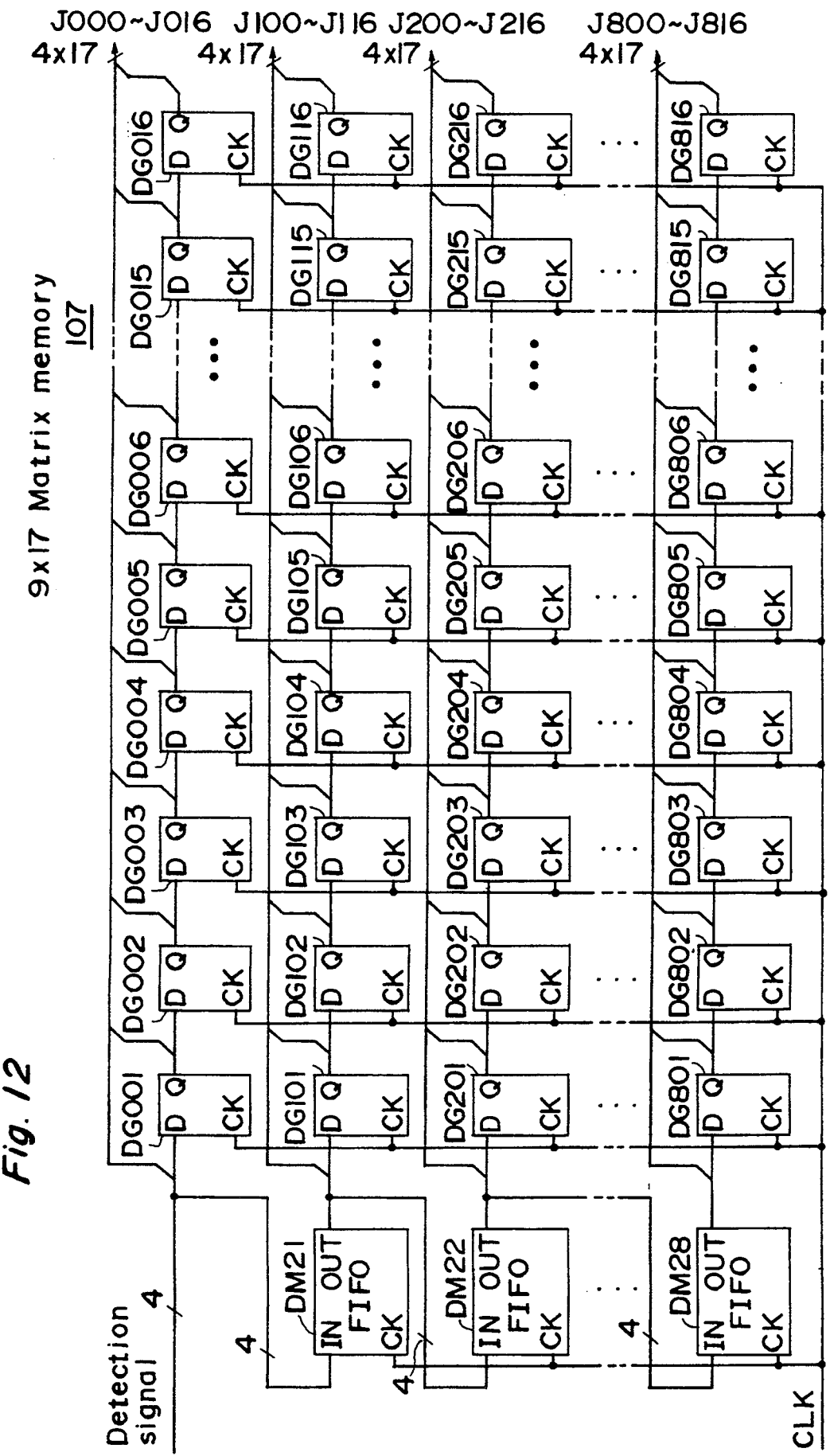
FIG. 12 is a schematic block diagram showing a 9×17 matrix memory shown in FIG. 7.

FIG. 12 shows the 9×17 matrix memory 107 shown in FIG. 7.

Referring to FIG. 12, the 9×17 matrix memory comprises:

(a) 8 FIFO memories DM21 through DM28, each of which delays 4-bit judgment data composed of four detection signals inputted in synchronous with the clock CLK having the same period as that of the transfer clock of binary image data inputted from the page memory 61 or a period of one dot of the image data, by one horizontal scanning interval which is one scanning time in the main scan direction; and (b) 9×16 delay type flip-flops DG001 through DG016, DG101 through DG116, DG201 through DG216, ..., DG801 through DG816, each of which delays and outputs image data in synchronous with the above clock CLK by one period of the clock CLK.

The four detection signals processed in parallel in the 9×17 matrix memory 107 are as follows:

(a) the non-Bayer type half-tone detection signal J-A (referred to as judgment data J-A hereinafter) outputted from the adjacent state judgment section 105;

(b) the Bayer type half-tone detection signal J-B (referred to as judgment data J-B hereinafter) outputted from the adjacent state judgment section 105;

(c) the all-black or all-white image detection signal J-C (referred to as judgment data J-C hereinafter) outputted from the adjacent state judgment section 105; and (d) the ordered dither type half-tone detection signal J-D (referred to as judgment data J-D hereinafter) outputted from the ordered dither type half-tone judgment section 106.

In the 9×17 matrix memory 107, the flip-flops DG001 to DG016 are connected in serial, the FIFO memories DM21 to DM28 are connected in serial, and the FIFO memory DM2i and the flip-flops DGi01 through DGi16 are connected in serial for every i=1, 2, 3, ..., 8.

The 4-bit judgment data outputted from the judgment sections 105 and 106 in serial in an order of the first to last pixels of the image of each page are inputted to the FIFO memory DM21 as well as inputted to the flip-flop DG001, and they are outputted directly. The judgment data outputted from the FIFO memory DM21 are inputted to the FIFO memory DM22 as well as inputted to the flip-flop DG101, and they are outputted directly. Similarly, the judgment data outputted from the FIFO memories DM22 through DM27 are inputted to the FIFO memories DM23 through DM28 respectively as well as inputted to the flip-flops DG201 through DG701 respectively, and they are outputted directly, and further, the judgment data outputted from the FIFO memory DM28 are inputted into the flip-flop DG801, and they are outputted directly. The judgment data outputted from the flip-flop DGi01 are inputted to the flip-flop DGi02, and they are outputted directly for every i=0, 1, 2, ..., 8. Similarly, the judgment data outputted from the flip-flops DGi02 through DGi15 are inputted to the flip-flops DGi03 through DGi16 respectively, and they are outputted directly for every i=0, 1, 2, ..., 8.

In the 9×17 matrix memory 107 configured as described above, when the 4-bit judgment data for one dot of pixel data first inputted thereto are outputted from the flip-flop DG816, the judgment data inputted at the same time to the matrix memory 107 are outputted as judgment data J000, and the judgment data J001 through J016 on the main scan line n=0 located within the 9×17 window are outputted from respective flip-flops DG001 through DG016. Similarly, at the same time, the judgment data Ji00 and Ji01 through Ji16 on the main scan line n=i located within the 9×17 window are outputted from the respective FIFO memories DMi and respective flip-flops DGi01 through DGi16 for i=1, 2, ..., 8.

Figure 13:
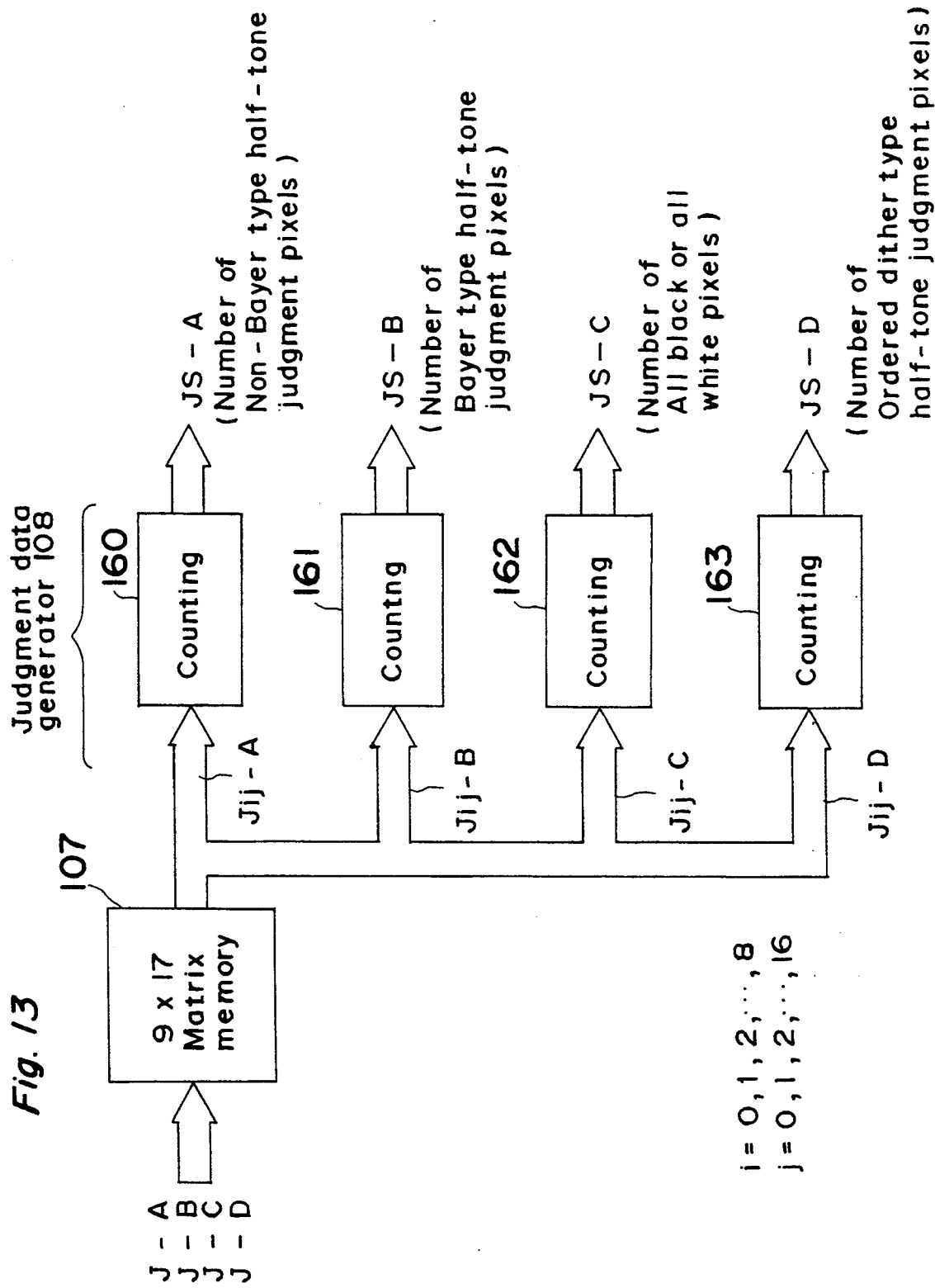
FIG. 13 is a schematic block diagram showing a judgment data generator shown in FIG. 7.

Therefore, as shown in FIG. 13, the judgment data composed of 4 bits per pixel for each pixel located within the 9×17 window, Jij-A through Jij-D for i=0, 1, 2, 8; j=0, 1, 2, ..., 16 are simultaneously outputted from the matrix memory 107 to the judgment data generator 108.

(5-5) Judgment data generator

FIG. 13 shows the judgment data generator 108 shown in FIG. 7.

Referring to FIG. 13, the judgment data Jij-A through Jij-D outputted from the matrix memory 107 are inputted to counting circuits 160 through 163, respectively. Each of the counting circuits 160 through 163 counts a number of high level data of the inputted data located within a 9×17 window, and generates and outputs the following enumeration data corresponding to the judgment data J-A through J-D, to the judgment data signal generator 114:

(a) enumeration data JS-A of judgment data J-A: the number of non-Bayer type half-tone judgment pixels;
(b) enumeration data JS-B of judgment data J-B: the number of Bayer type half-tone judgment pixels;
(c) The enumeration data JS-C of judgment data J-C: the number of all-black or all-white pixels; and
(d) The enumeration data JS-D of judgment data J-D: the number of ordered dither type half-tone judgment pixels.

(5-6) Judgment data signal generator

Figure 14:
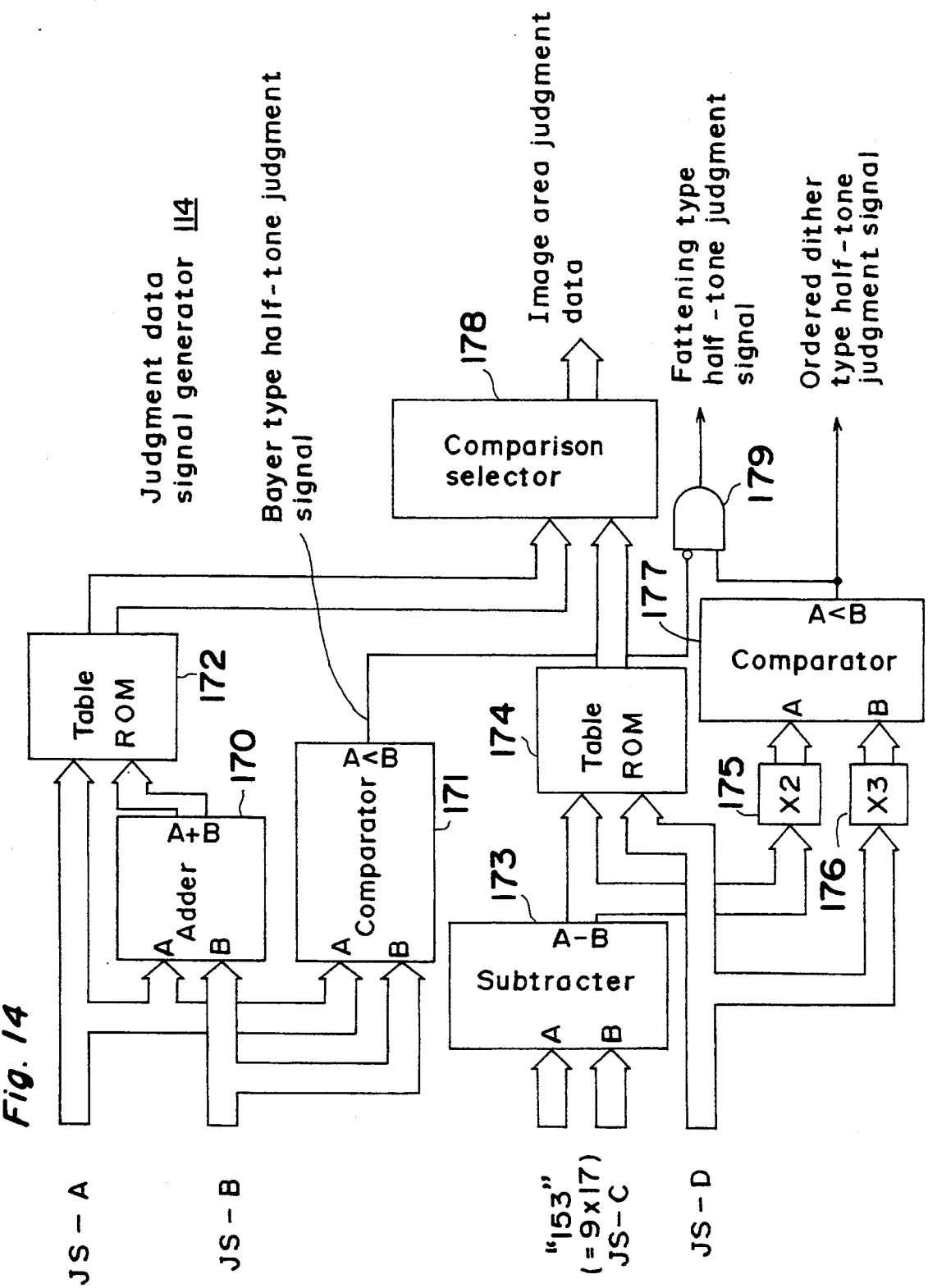
FIG. 14 is a schematic block diagram showing a judgment data signal generator shown in FIG. 7.

FIG. 14 shows the judgment data signal generator 114 shown in FIG. 3.

Referring to FIG. 14, data of the number of non-Bayer type half-tone judgment pixels JS-A are inputted to a first address terminal of a table ROM 172 for outputting a non-half-tone index representing a degree of non-half-tone for the Bayer type half-tone image, an input terminal A of an adder 170, and an input terminal A of a comparator 171. Data of the number of Bayer type half-tone judgment pixels JS-B are inputted to respective input terminals B of the adder 170 and the comparator 171. The adder 170 adds the two inputted data, and then, outputs data of the addition result thereof to a second address terminal of the table ROM 172. The comparator 171 outputs a Bayer type half-tone judgment signal of the high level to a first inverted input terminal of an AND gate 179 if A<B, otherwise the comparator 171 outputs the same of the low level.

Data of the total number "153" of pixels located within the 9×17 window are inputted to an input terminal A of a subtracter 173, and data of the number of all-black or all-white pixels JS-C are inputted to an input terminal B of the subtracter 173. Data of the number of ordered dither type half-tone judgment pixels JS-D are inputted to a second address terminal of a table ROM 174 for outputting a non-half-tone index representing a degree of non-half-tone for the ordered dither type half-tone image, and also are inputted to an input terminal B of a comparator 177 through a multiplier 176 having a multiplier constant of three. The subtracter 173 subtracts the number of all-black or all-white pixels JS-C from a constant data of "153", and then, outputs the subtraction result thereof to a first address terminal of the table ROM 174 and outputs the same to an input terminal A of the comparator 177 through a multiplier 175 having a multiplier constant of two. The comparator 177 outputs, if A<B, an ordered dither type half-tone judgment signal of the high level to a second input terminal of the AND gate 179, and also outputs the same to the recovered data calculation section 112. Otherwise, the comparator 177 outputs the same of th low level thereto.

If the ordered dither type half-tone judgment signal is at the high level and the Bayer type half-tone judgment signal is at the low level, then the AND gate 179 outputs a Fattening type half-tone judgment signal of the high level to the recovered data calculation section 112. Otherwise the AND gate 179 outputs the same of the low level thereto.

Figure 31:
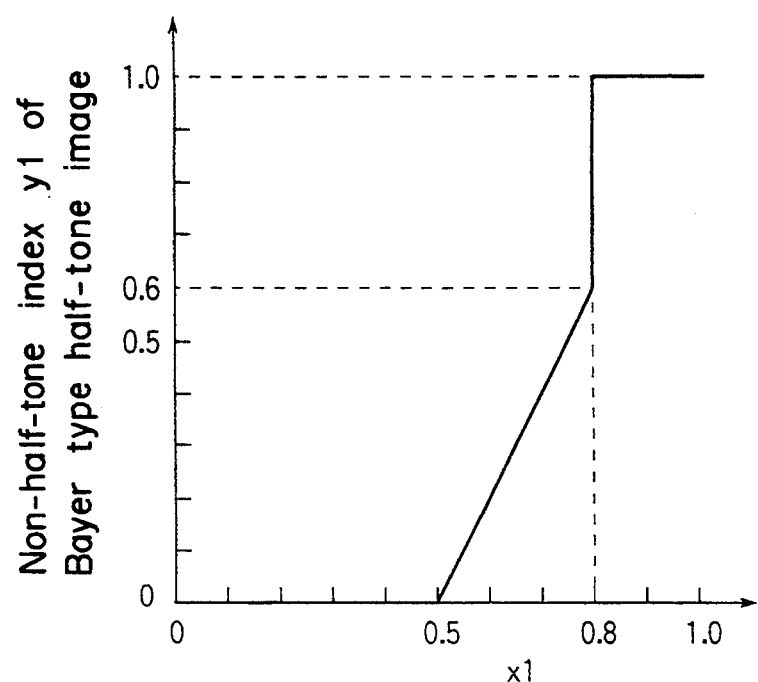
FIG. 31 is a graph of a characteristic of a non-half-tone index for a Bayer type half-tone image which is stored in a table ROM of the judgment data signal generator shown in FIG. 7.
Figure 32:
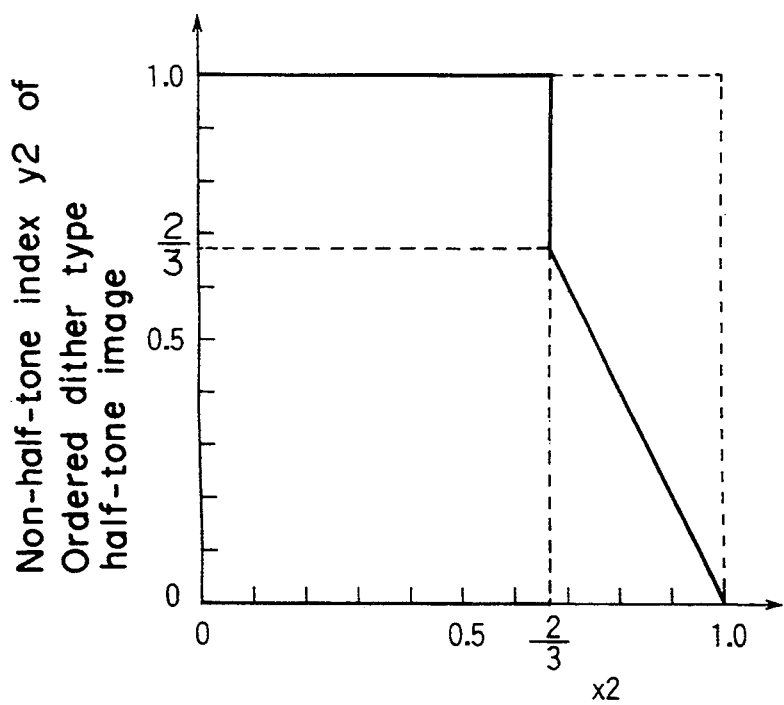
FIG. 32 is a graph of a characteristic of a non-half-tone index for an ordered dither type half-tone image which is stored in a table ROM of the judgment data signal generator shown in FIG. 7.

FIG. 31 shows a graph of non-half-tone index y1 for the Bayer type half-tone image which is stored in the table ROM 172, and FIG. 32 shows a graph of non-half-tone index y2 for the ordered dither type half-tone image which is stored in the table ROM 174. In the respective graphs shown in FIGS. 31 and 32, data x1 and x2 of the axis of abscissa represent the following formulas (2) and (3), respectively.

$$x1 = (JS\text{-}A)/\{(JS\text{-}A) + (JS\text{-}B)\} \quad (2)$$

$$x2 = (JS\text{-}D)/\{153 - (JS\text{-}C)\} \quad (3)$$

Here, 153 denotes the total number of pixels located within the 9×17 window, the denominator of (2) is calculated by the adder 170, and the denominator of (3) is calculated by the subtracter 173.

As shown in FIG. 31, the non-half-tone index y1 representing the degree of the non-half-tone for the Bayer type half-tone image is determined as follows:

$y1=0$, if $0 \leq x1 \leq 0.5$;      (a)

$y1=2 \times x1-1$, if $0.5 \leq x1 \leq 0.8$;      (b)

and $y1=1$, if $x1>0.8$.      (c)

As shown in FIG. 32, the non-half-tone index y2 representing the degree of the non-half-tone for the ordered dither type half-tone image is determined as follows:

$y2=1$, if $0 \leq x2 \leq \frac{2}{3}$;      (a)

and $y2=2 \times (1-x2)$, if $x2 > \frac{2}{3}$      (b)

In practice, the values of y1 and y2, which are fallen into an interval [0, 1], are expressed by 4 bits in the judgment data signal generator 114 shown in FIG. 14.

The table ROM 172 obtains the non-half-tone index for Bayer type half-tone image from its storage table based on the data JS-A and the output data from the adder 170 which are inputted to the address terminal thereof, and then, outputs the same to a first input terminal of a comparison selector 178. The table ROM 174 obtains the non-half-tone index for the ordered dither type half-tone image from its storage table based on the data JS-D and the output data of the subtracter 173 which are inputted to the address terminal thereof, and outputs the same to a second input terminal of the comparison selector 178. The comparison selector 178 selects data of the larger value among the inputted two non-half-tone indices, and outputs the selected data to the data mixing section 104 as image area judgment data.

The judgment data signal generator 114 constructed as described above sets the Bayer type half-tone judgment signal at the high level using the comparator 171, if JS-A<JS-B, i.e., if x1<0.5. The judgment data signal generator 114 also sets the ordered dither type half-tone judgment signal at the high level using the multipliers 175 and 176 and the comparator 177, if 3(JS-D)>2{153−(JS-C)}, i.e., if $x2 > \frac{2}{3}$. Further, since the Fattening type half-tone image is the ordered dither type half-tone image that are not the Bayer type half-tone image, the Fattening type half-tone judgment signal is set by the AND gate 179.

(6) Half-tone image recovery section (6-1) Structure and Operation of Each section.

The half-tone image recovery section 101 shown in FIG. 7 comprises the smoothed amount calculation section 109, the edge emphasis amount calculation section 110, the edge judgment amount calculation section 111 and the recovered data calculation section 112. Each of these calculation sections 109 through 112 will be described below.

The half-tone image recovery section 101 recovers multi-value image data close to an original photographic image from binary image data binarized using the pseudo half-tones binarizing method. First of all, the recovery process for the Bayer type half-tone image into multi-value image data will be described.

Figure 33:
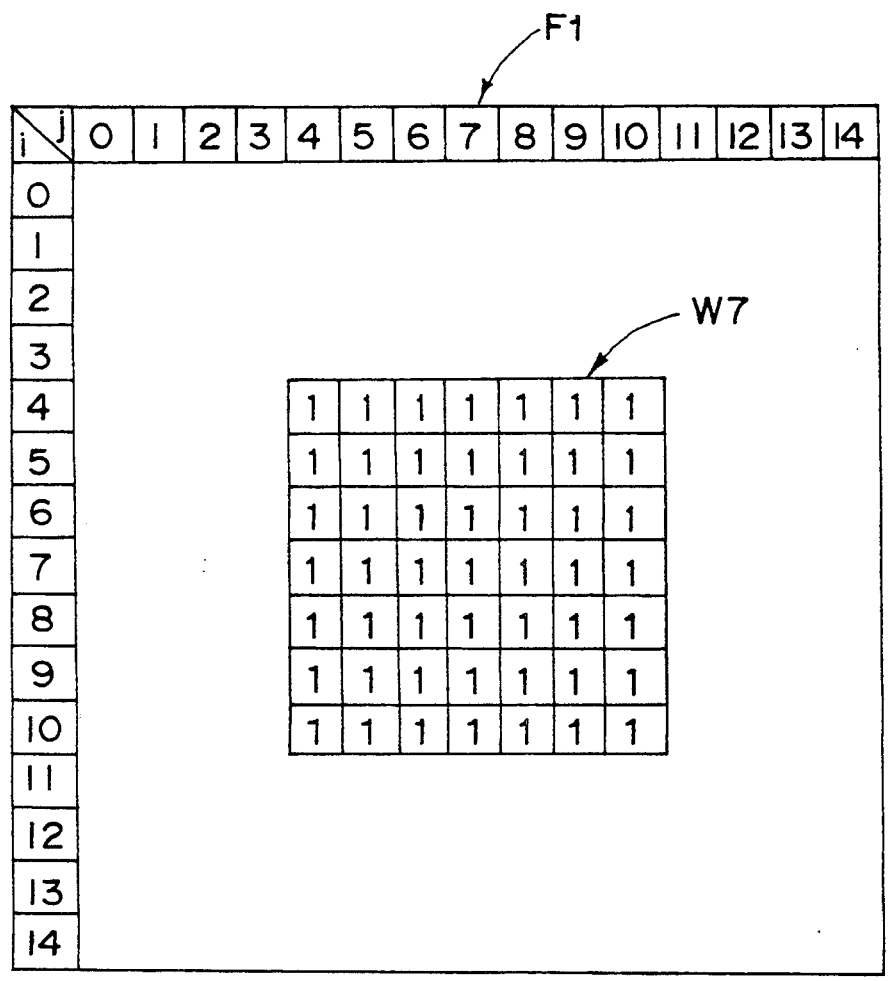
FIG. 33 is a front view showing a smoothing spatial filter F1 for counting a number of black pixels located within a 7×7 window, which is used in the smoothed amount calculation section shown in FIG. 15.
Figure 34:
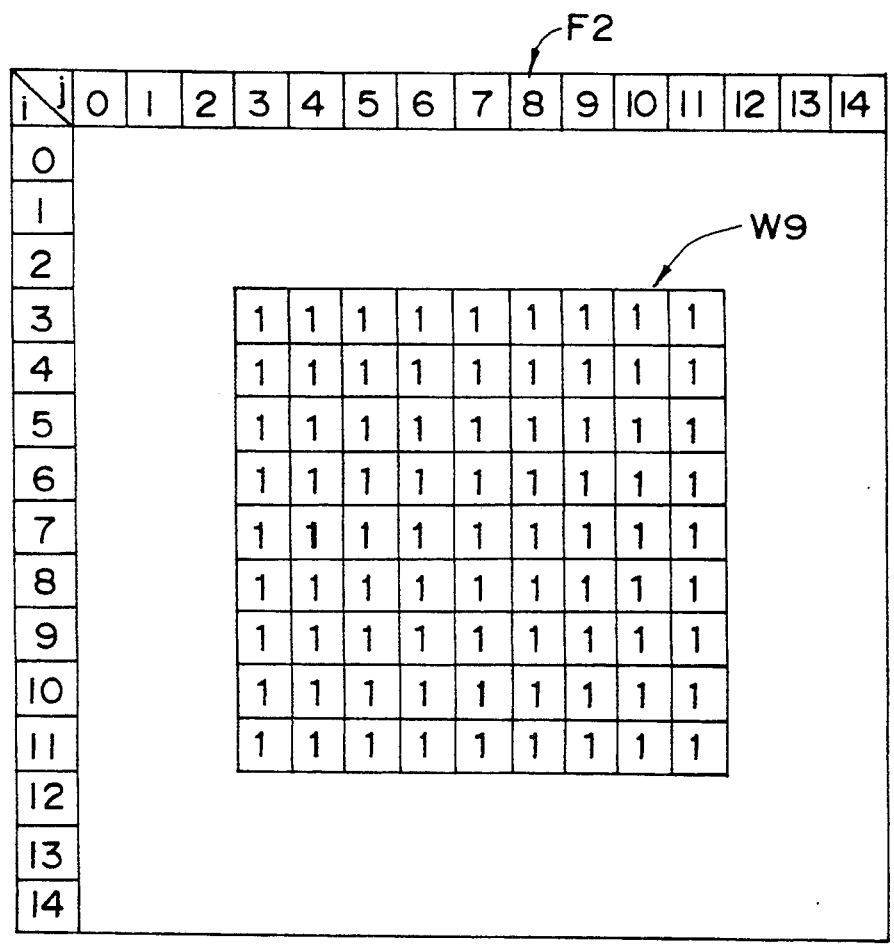
FIG. 34 is a front view showing a smoothing spatial filter F2 for counting a number of black pixels located within a 9×9 window, which is used in the smoothed amount calculation section shown in FIG. 15.

In order to recover multi-value image data, it is necessary to refer to pixel values located in the peripheral positions of the specified pixel. Taking into consideration the fact that almost all the pseudo half-tone binarizing methods are area gradation binarizing methods, the smoothed data calculation section 109 can recover multi-value image data from binary image data using smoothing spatial filters F1 through F3 shown in FIG. 33 through FIG. 35, respectively.

However, if an image recovery process is conducted using only the above smoothing spatial filters F1 through F3, then high-frequency spatial components are often lost in the process. Therefore, the present preferred embodiment detects lost high-frequency spatial frequency components in the edge emphasis calculation section 110 to include them in recovered multi-value image data using edge amount detection spatial filters of quadratic differential filters F11 through F14, F21 through F24, and F31 through F34 respectively shown in FIG. 36 through FIG. 47.

However, each of these quadratic differential filters sometimes detect a texture of a pseudo half-tone as an edge amount. In fact, a texture of a pseudo half-tone is absorbed into an edge in a so-called edge area whose density steeply changes, however, in an area whose density gradually changes, the texture of the pseudo half-tone possibly appears to have an edge amount larger than the edge amount of the original edge. In order to solve this problem, the edge judgment calculation section 111 judges whether or not a predetermined area having the specified in the center thereof is an edge area, using edge amount detection spatial filters of first-order differential filters F41 through F44 and F51 through F54 shown in FIG. 48 through FIG. 55. Further, the recovered data calculation section 112 performs the edge emphasis only for an pixel included a predetermined area judged as an edge area, using above-mentioned edge amount detection spatial filters of the quadratic differential filters, based on the edge judgment amount calculated by the edge judgment amount calculation section 111.

The reason why there are provided edge amount detection spatial filters in not only the four directions of the main scan and subscan directions but also the above-mentioned diagonal directions is to detect the maximum edge amount among them. Moreover, the reason why the edge amount detection spatial filters detects calculate edge amounts using windows having a plurality of kinds of sizes is to detect the maximum edge amount among them. However, the sizes of the respective windows used for the smoothing spatial filters and edge amount detection spatial filters depend on the resolution of the transmitting facsimile apparatus upon reading a document image. In fact, upon reading a document image, as the resolution becomes higher, the edge amounts of low frequency components increase. On the other hand, as the resolution becomes lower, the edge amounts of high frequency components increase. Therefore, the present preferred embodiment uses the following two sets of spatial filters depending on the mode of the resolution:

(a) for the fine mode: the spatial filters F1, F11 through F14, F21 through F24, and F41 through F44; and (b) for the ultra fine mode: the spatial filters F2, F11 through F14, F21 through F24, F31 through F34, F41 through F44, and F51 through F54.

Figure 35:
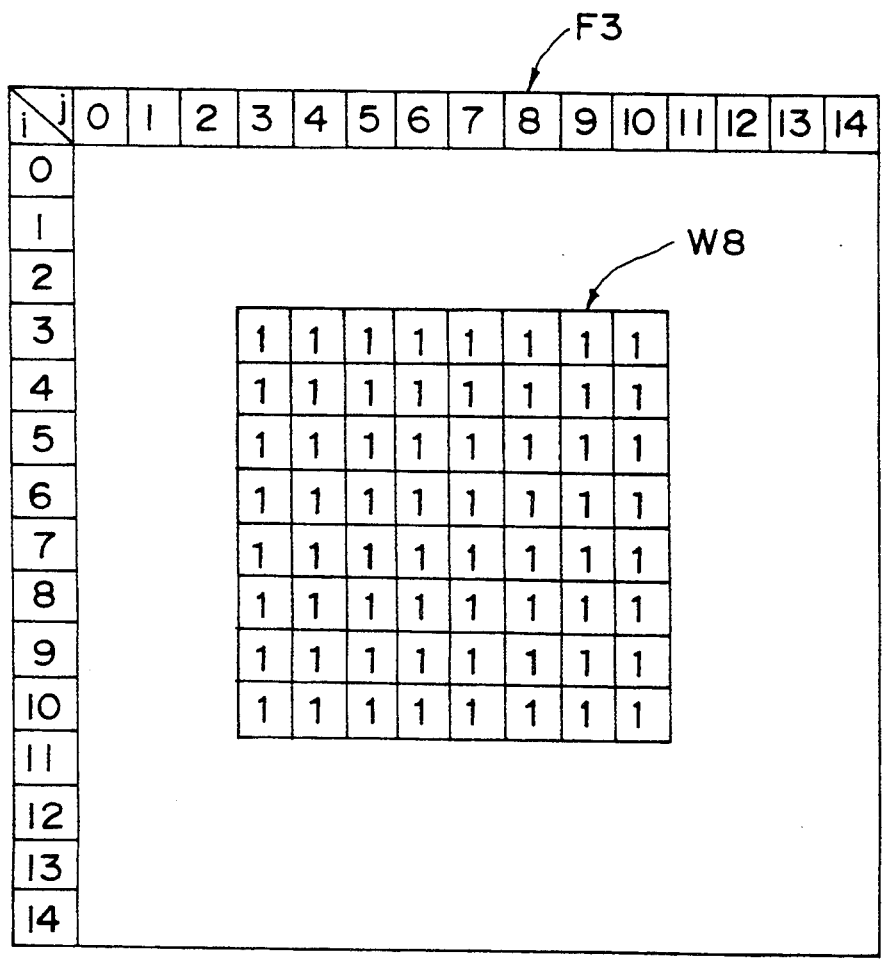
FIG. 35 is a front view showing a smoothing spatial filter F3 for counting a number of black pixels located within a 8×8 window, which is used in the smoothed amount calculation section shown in FIG. 15.
Figure 50:
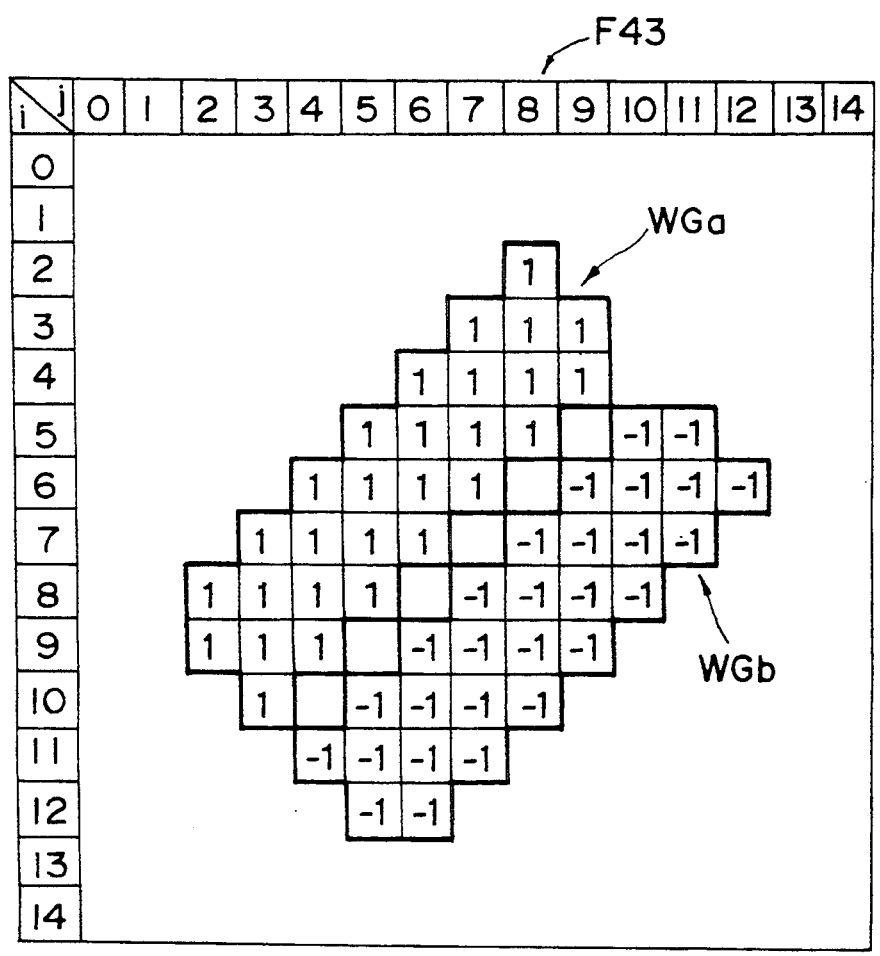
FIG. 50 is a front view showing an edge amount detection spatial filter F43 for calculating an edge judgment amount, which is used in the edge judgment amount calculation section shown in FIG. 17.
Figure 51:
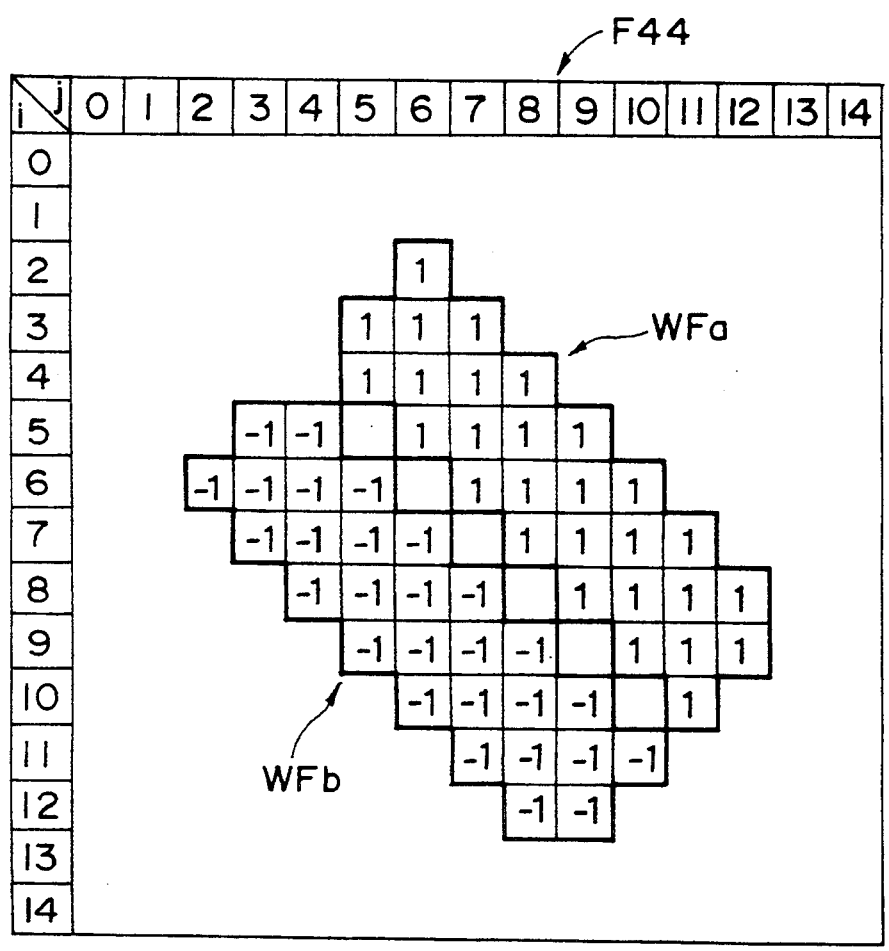
FIG. 51 is a front view showing an edge amount detection spatial filter F44 for calculating an edge judgment amount, which is used in the edge judgment amount calculation section shown in FIG. 17.
Figure 54:
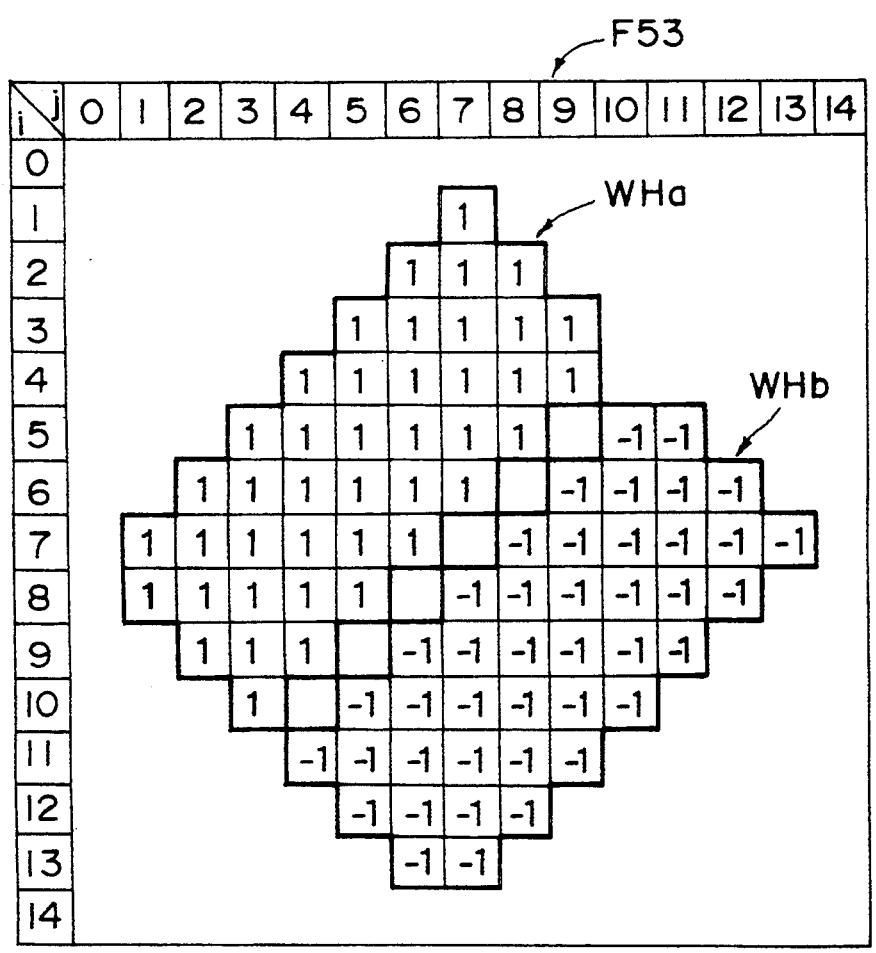
FIG. 54 is a front view showing an edge amount detection spatial filter F53 for calculating an edge judgment amount, which is used in the edge judgment amount calculation section shown in FIG. 17.

Next, the image recovery process for the ordered dither type half-tone image will be described below. The length of the side of the window of each of the smoothing spatial filters F1 through F3 used in the smoothed amount calculation section 109 should be determined as a multiple of one side of the dither threshold matrix. Since the present preferred embodiment uses the 4×4 or 8×8 dither threshold matrices, the 8×8 smoothing spatial filter F3 in FIG. 35 is used in addition to the spatial filters F1 and F2. Also, in the edge emphasis process of the ordered dither type half-tone image, different methods should be used between the Bayer type half-tone image and the Fattening type half-tone image. Since the spatial frequency of the texture of the Fattening type half-tone image is relatively low, the size of the window appropriate for the edge emphasis become too large. Therefore, the present preferred embodiment does not execute any edge emphasis process for the Fattening type half-tone image, and executes the edge emphasis process for the Bayer type half-tone image of one of the ordered dither type half-tone image, in a manner similar to that of the Bayer type half-tone image.

(6-2) Smoothed amount calculation section

Figure 15:
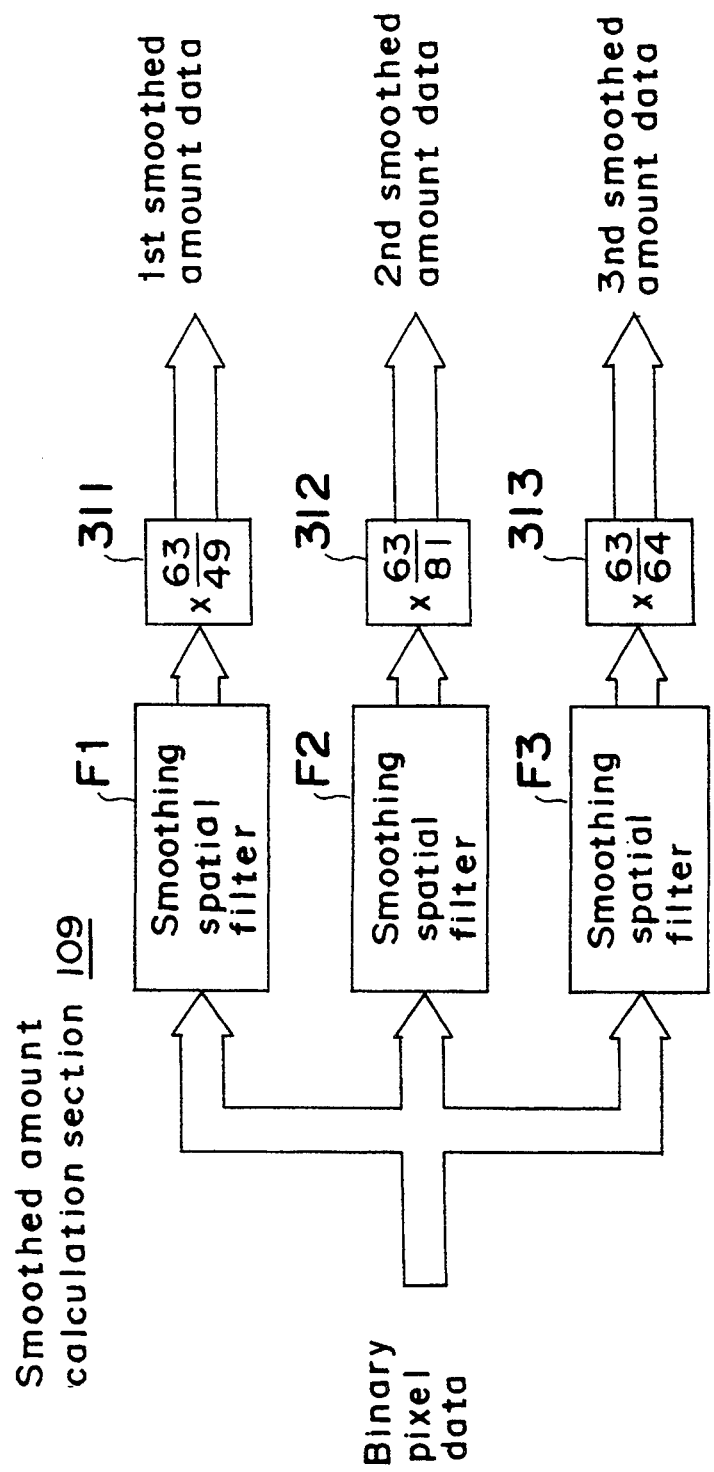
FIG. 15 is a schematic block diagram showing a smoothed amount calculation section shown in FIG. 7.

FIG. 15 shows the smoothed amount calculation section 109 shown in FIG. 7.

Referring to FIG. 15, the smoothing spatial filter F1 calculates a smoothed amount based on the binary pixel data outputted from the matrix memory 100, and then, outputs the calculated smoothed amount as the first smoothed data to the recovered data calculation section 112 through a multiplier 311 having a multiplier constant of 63/49. The smoothing spatial filter F2 calculates a smoothed amount based on the binary pixel data outputted from the matrix memory 100, and then, outputs the calculated smoothed amount as the second smoothed data to the recovered data calculation section 112 through a multiplier 312 having a multiplier constant of 63/81. The smoothing spatial filter F3 calculates a smoothed amount based on the binary pixel data outputted from the matrix memory 100, and then, outputs the calculated smoothed amount as the third smoothed data to the recovered data calculation section 112 through a multiplier 313 having a multiplier constant of 63/64. It is to be noted that the multipliers 311 through 313 are provided to correct differences among the smoothed amounts caused due to differences among the sizes of the windows of the smoothing spatial filters F1 through F3.

(6-3) Edge emphasis amount calculation section

Figure 16:
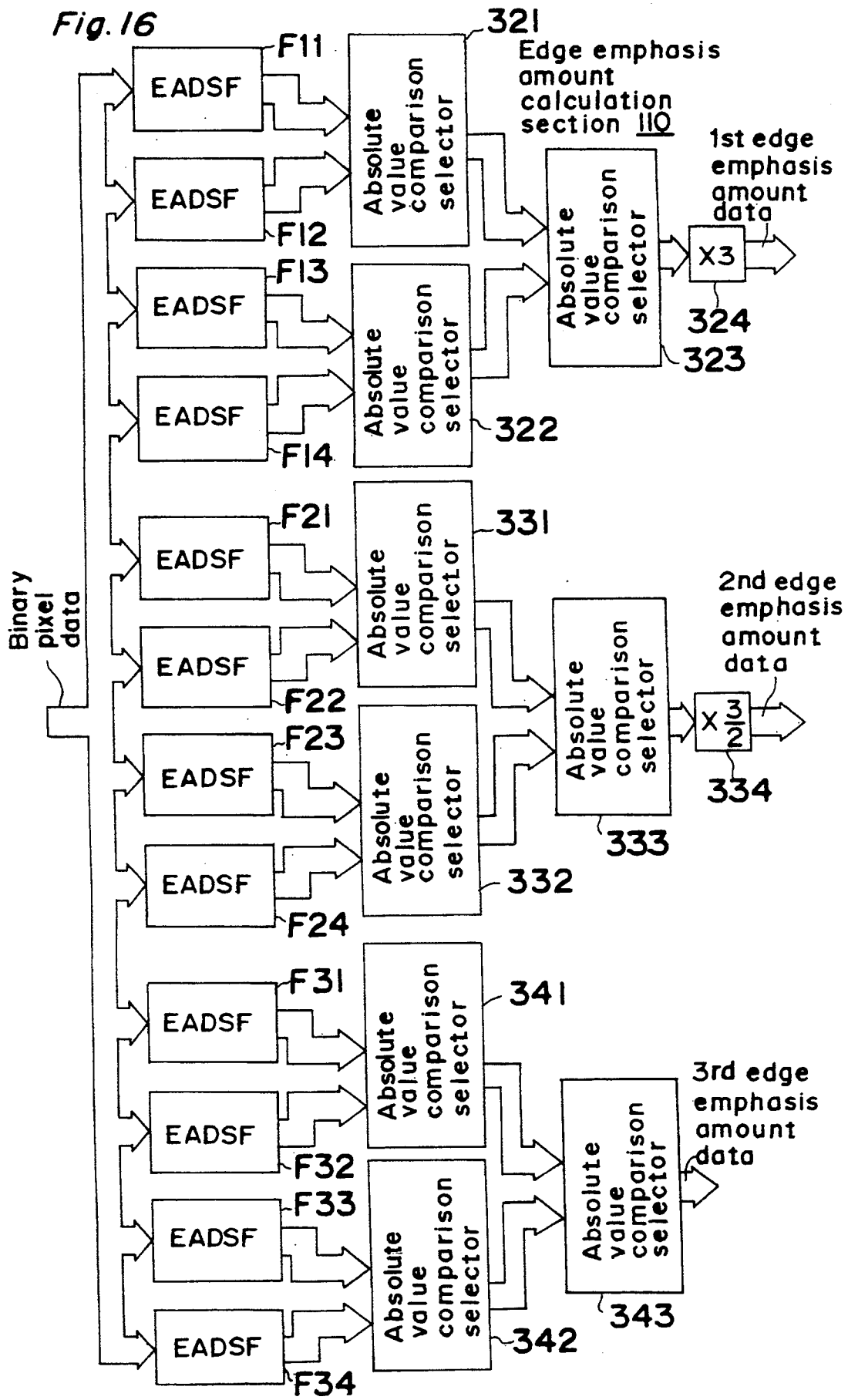
FIG. 16 is a schematic diagram showing an edge emphasis amount calculation section shown in FIG. 7.

FIG. 16 shows the edge emphasis amount calculation section 110 shown in FIG. 7.

Referring to FIG. 16, the edge amount detection spatial filters (EADSF) F11 and F12 calculate edge emphasis amounts based on the binary pixel data outputted from the matrix memory 100, and output the same to an absolute value comparison selector 321. The absolute value comparison selector 321 compares the absolute values of the two edge emphasis amounts with each other, selects the maximum edge amount among them, and outputs the selected data to an absolute value comparison selector 323. The edge amount detection spatial filters F13 and F14 calculate edge emphasis amounts based on the binary pixel data outputted from the matrix memory 100, and then, output the same to an absolute value comparison selector 322. The absolute value comparison selector 322 compares the absolute values of the two edge emphasis amounts with each other, selects the maximum edge amount among them, and outputs the selected data to the absolute value comparison selector 323. The absolute value comparison selector 323 compares the absolute values of the two inputted edge emphasis amounts, selects the maximum edge amount among them, and outputs the selected data as a first edge emphasis amount data to the recovered data calculation section 112 through a multiplier 324 having a multiplier constant of three.

The edge amount detection spatial filters (EADSF) F21 and F22 calculate edge emphasis amounts based on the binary pixel data outputted from the matrix memory 100, and output the same to an absolute value comparison selector 331. The absolute value comparison selector 331 compares the absolute values of the two edge emphasis amounts with each other, selects the maximum edge amount among them, and outputs the selected data to an absolute value comparison selector 333. The edge amount detection spatial filters F23 and F24 calculate edge emphasis amounts based on the binary pixel data outputted from the matrix memory 100, and output the same to an absolute value comparison selector 332. The absolute value comparison selector 332 compares the absolute values of the two edge emphasis amounts with each other, selects the maximum edge amount among them, and outputs the selected data to the absolute value comparison selector 333. The absolute value comparison selector 333 compares the absolute values of the two inputted edge emphasis amounts with each other, selects the maximum edge amount among them, and outputs the selected data as a second edge emphasis amount data to the recovered data calculation section 112 through a multiplier 334 having a multiplier constant of 3/2.

The edge amount detection spatial filters (EADSF) F31 and F32 calculate edge emphasis amounts based on the binary pixel data outputted from the matrix memory 100, and output the same to an absolute value comparison selector 341. The absolute value comparison selector 341 compares the absolute values of the two edge emphasis amounts with each other, selects the maximum edge amount among them, and outputs the selected data to an absolute value comparison selector 343. The edge amount detection spatial filters F33 and F34 calculate edge emphasis amounts based on the binary pixel data outputted from the matrix memory 100, and output the same to an absolute value comparison selector 342. The absolute value comparison selector 342 compares the absolute values of the two edge emphasis amounts with each other, selects the maximum edge amount among them, and outputs the selected data to the absolute value comparison selector 343. The absolute value comparison selector 343 compares the absolute values of the two inputted edge emphasis amounts with each other, selects the maximum edge amount among them, and outputs the selected data as a third edge emphasis amount data to the recovered data calculation section 112.

The multipliers 324 and 334 are provided in order to correct differences among the edge emphasis amounts caused due to differences among the sizes of the windows of three groups of the edge amount detection spatial filters windows F11 through F14, F21 through F24, and F31 through F34.

(6-4) Edge judgment amount calculation section

Figure 17:
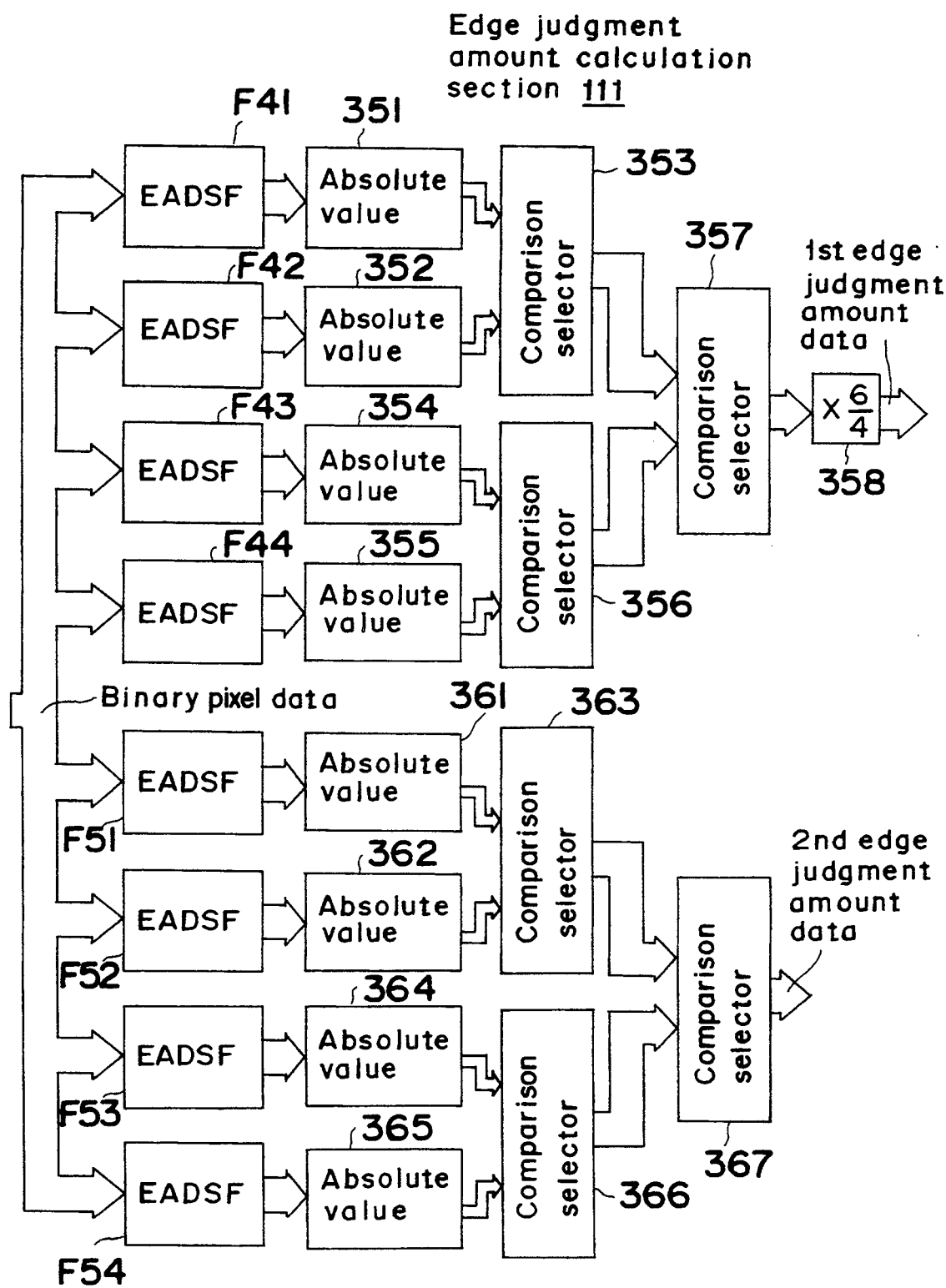
FIG. 17 is a schematic block diagram showing an edge judgment amount calculation section shown in FIG. 7.

FIG. 17 shows the edge judgment amount calculation section 111 shown in FIG. 7.

Referring to FIG. 17, the edge amount detection spatial filters (EADSF) F41 and F42 calculate edge judgment amounts based on the binary image data outputted from the matrix memory 100, and output the calculated edge judgement amounts to a comparison selector 353 through absolute value circuits 351 and 352, respectively, each of which calculates and outputs the absolute value of the inputted data. The comparison selector 353 compares the absolute values of the two edge judgment amounts with each other, selects the maximum edge judgment amount among them, and outputs the selected data to a comparison selector 357. Further, the edge amount detection spatial filters F43 and F44 calculate edge judgment amounts based on the binary image data outputted from the matrix memory 100, and then, output the calculated edge judgment amounts to a comparison selector 356 through absolute value circuits 354 and 355, respectively, each of which calculates and outputs the absolute value of the inputted data. The comparison selector 356 compares the absolute values of the two edge judgment amounts with each other, selects the maximum edge judgment amount among them, and outputs the selected data to a comparison selector 357. The comparison selector 357 compares the two inputted values with each other, selects the maximum edge judgment amount among them, and outputs the selected data through a multiplier 358 having a multiplier constant of 6/4 to the recovered data calculation section 112 as a first edge judgment amount data.

The edge amount detection spatial filters (EADSF) F51 and F52 calculate edge judgment amounts based on the binary image data outputted from the matrix memory 100, and output the same to a comparison selector 363 through absolute value circuits 361 and 362, respectively, each of which calculates and outputs the absolute value of the inputted data. The comparison selector 363 compares the absolute values of the two edge judgment amounts with each other, selects the maximum edge judgment amount among them, and outputs the selected data to a comparison selector 367. The edge amount detection spatial filters F53 and F54 calculate edge amounts based on the binary image data outputted from the matrix memory 100, and output the same to a comparison selector 366 through absolute value circuits 364 and 365, respectively, each of which calculates and outputs the absolute value of the inputted data. The comparison selector 366 compares the absolute values of the two edge judgment amounts with each other, selects the maximum edge judgment amount among them, and outputs the selected data to a comparison selector 367. The comparison selector 367 compares the two inputted values with each other, selects the maximum edge judgment amount among them, and outputs the selected data to the recovered data calculation section 112 as a second edge judgment amount data.

The multiplier 358 is provided in order to correct differences among edge judgment amounts caused due to differences among the sizes of the windows of the two groups of the edge amount detection spatial filters F41 through F44, and F51 through F54.

(6-5) Recovered data calculation section

Figure 18:
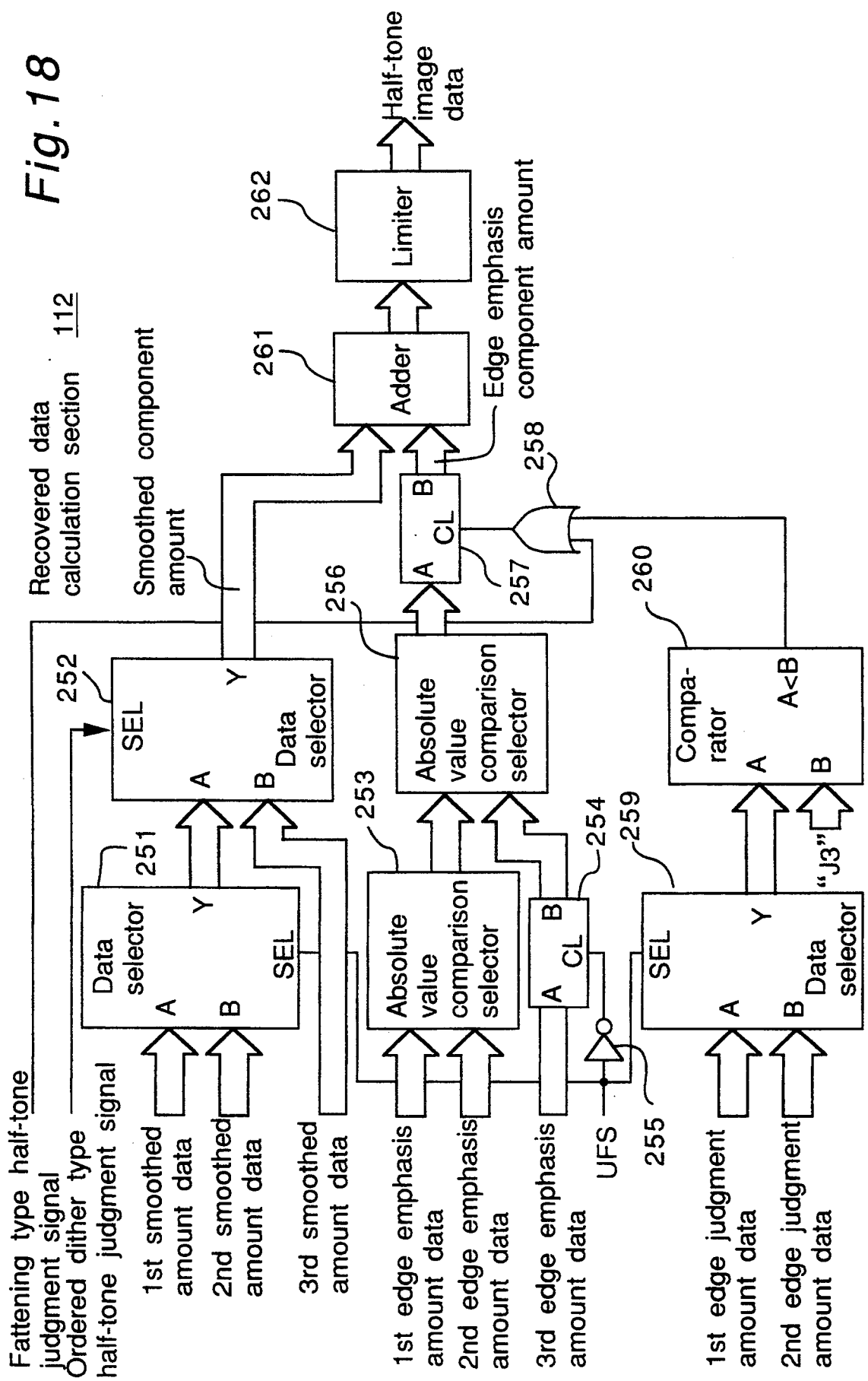
FIG. 18 is a schematic block diagram showing a recovered data calculation section shown in FIG. 7.

FIG. 18 shows the recovered data calculation section 112 shown in FIG. 7.

Referring to FIG. 18, the first and second smoothed amount data are inputted to a data selector 251. If the ultra fine signal UFS is at the low level, the data selector 251 selects the first smoothed amount data, and outputs the same to an input terminal A of a data selector 252. On the other hand, if the ultra fine signal UFS is at the high level, the data selector 251 selects the second smoothed amount data, and outputs the same to the input terminal A of the data selector 252. If the ordered dither type half-tone judgment signal is at the low level, the data selector 252 selects the first or second smoothed amount data inputted to the input terminal A thereof, and outputs the same as a smoothed component amount to an adder 261. On the other hand, if the ordered dither type half-tone judgment signal is at the high level, the data selector 252 selects the third smoothed amount data inputted to the input terminal B thereof, and outputs the same as a smoothed component amount to the adder 261.

The first and second edge emphasis amount data are inputted to an absolute value selector 253, which selects the edge emphasis amount data having the larger absolute value among the two data inputted thereto, and outputs the selected data to an absolute value comparison selector 256. The ultra fine signal UFS is inputted to a clear circuit 254 through an invertor 255. If the inverted signal of the ultra fine signal UFS is at the low level, the clear circuit 254 outputs the third edge emphasis amount inputted thereto to the absolute value comparison selector 256, as it is. On the other hand, if the inverted signal of the ultra fine signal UFS is at the high level, the clear circuit 254 clears the third edge emphasis amount inputted thereto to zero, and outputs zero data to the absolute value comparison selector 256. The absolute value comparison selector 256 selects the edge emphasis amount data having the larger absolute value among the inputted two edge emphasis amount data, and outputs the selected data through a clear circuit 257 to the adder 261.

The first and second edge judgment amount data are inputted to a data selector 259. If the ultra fine signal UFS is at the low level, the data selector 259 selects the first edge judgment data, and outputs the selected data to an input terminal A of a comparator 260. On the other hand, if the ultra fine signal UFS is at the high level, the data selector 259 selects the second edge judgment data, and outputs the selected data to the input terminal A of the comparator 260. Data of a predetermined threshold value J3 are inputted to an input terminal B of the comparator 260. In the present preferred embodiment, the predetermined threshold value J3 is preferably set to four.

If A<B, the comparator 260 outputs a comparison result signal of the high level through a first input terminal of an OR gate 258 to a clear control terminal CL of the clear circuit 257. On the other hand, the Fattening type half-tone judgment signal is inputted through a second input terminal of the OR gate 258 to the clear control terminal CL of the clear circuit 257. If the signal inputted from the OR gate 258 is at the low level, the clear circuit 257 outputs the data inputted from the absolute value comparison selector 256 to the adder 261 as an edge emphasis component amount as they are. On the other hand, if the signal inputted from the OR gate 258 is at the high level, the clear circuit 257 clears the data inputted from the absolute value comparison selector 256 to zero, and outputs zero data to the adder 261 as the edge emphasis component amount. Finally, the adder 261 adds the smoothed component amount and the edge emphasis component amount inputted thereto, and then, outputs data of the addition result to a limiter 262. The limiter 262 rounds off the data inputted thereto to a value ranging within an interval [0, 63], and outputs the rounded-off data as half-tone image data to the data mixing section 104, wherein if the data inputted to limiter 262 are smaller than zero, then it is converted to zero, or if the data are larger than 63, then it is converted to 63.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

TABLE 1

| Image Pattern | Matched Windows | Number of Non-matching pixels Between Windows | Total |
|---|---|---|---|
| Image Pattern PAT1 shown in FIG. 28 | W4a with W4b | 12 | 36 |
| | W4a with W4c | 9 | |
| | W4a with W4d | 7 | |
| | W4a with W4e | 8 | |
| Image Pattern PAT2 shown in FIG. 29 | W4a with W4b | 2 | 9 |
| | W4a with W4c | 1 | |
| | W4a with W4d | 3 | |
| | W4a with W4e | 3 | |
| Image Pattern PAT3 shown in FIG. 30 | W4a with W4b | 3 | 9 |
| | W4a with W4c | 1 | |
| | W4a with W4d | 2 | |
| | W4a with W4e | 3 | |

What is claimed is:

1. A facsimile apparatus comprising:

image data receiving means for receiving image data transmitted from a transmission apparatus apart from said facsimile apparatus;

converting means for converting binary image data representing an image density of each pixel in binary representation of black pixel or white pixel, into multi-value image data representing an image density of each pixel in multi-gradation stages representation including half-tone density;

printing means for printing an image corresponding to image data on a paper;

discrimination signal receiving means for receiving a discrimination signal transmitted from said transmission apparatus;

judging means for judging whether said image data received by said image data receiving means are either simple binary image data binarized using one threshold value or pseudo half-tone image data including half-tone information binarized using a plurality of threshold values, based on said discrimination signal received by said discrimination signal receiving means; and controlling means for controlling said converting means and said printing means to convert image data judged as said pseudo half-tone image data by said judging means into multi-value image data, and print an image corresponding to said converted multi-value image data, and for controlling said printing means to print an image corresponding to image data judged as said simple binary image data by said judging means without converting said simple image data into multi-value image data.

2. The apparatus as claimed in claim 1, wherein said judging means judges whether said pseudo half-tone image data are either first pseudo half-tone image data binarized using a first pseudo half-tone binarizing method or second pseudo half-tone image data binarized using a second pseudo half-tone binarizing method, and said controlling means controls said converting means to convert said received pseudo half-tone image data into multi-value image data using a converting method corresponding to said first or second pseudo half-tone binarizing method judged by said judging means.

3. A facsimile apparatus comprising:

image data receiving means for receiving binary image data transmitted from a transmission apparatus apart from said facsimile apparatus;

converting means for converting binary image data into multi-value image data;

discrimination signal receiving means for receiving a predetermined discrimination signal transmitted from said transmission apparatus; and controlling means for prohibiting said converting means from converting when said discrimination signal receiving means receives said predetermined discrimination signal.

4. A facsimile apparatus comprising:

image data receiving means for receiving image data transmitted from a transmission apparatus apart from said facsimile apparatus;

discrimination signal receiving means for receiving a discrimination signal transmitted from said transmission apparatus; and judging means for judging whether said image data received by said image data receiving means are either simple binary image data binarized using one threshold value or pseudo half-tone image data including half-tone information binarized using a plurality of threshold values, based on said discrimination signal received by said discrimination signal receiving means.

5. The apparatus as claimed in claim 4, further comprising:

recovery means for recovering multi-value image data corresponding to said received pseudo half-tone data based on said pseudo half-tone image data received by said image data receiving means; and controlling means controlling said recovery means based on said judgment result of said judging means.

6. A facsimile apparatus comprising:

image data receiving means for receiving image data transmitted from a transmission apparatus apart from said facsimile apparatus;

converting means for converting binary image data representing an image density of each pixel in binary representation of black pixel or white pixel, into multi-value image data representing an image density of each pixel in multi-gradation stages representation including half-tone density;

printing means for printing an image corresponding to image data on a paper;

discrimination signal receiving means for receiving a discrimination signal transmitted from said transmission apparatus;

judging means for judging whether said image data received by said image data receiving means are either simple binary image data binarized using one threshold value or pseudo half-tone image data including half-tone information binarized using a plurality of threshold values, said judging means including:

first judging means for judging whether said image data received by said image data receiving means are either said simple binary image data or said pseudo half-tone image data based on said discrimination signal received by said discrimination signal receiving means, and second judging means for judging whether said image data received by said image data receiving means are either said simple binary image data or said pseudo half-tone image data based on said image data received by said image data receiving means; and controlling means for controlling said converting means and said printing means to convert image data judged as said pseudo half-tone image data by said judging means into multi-value image data, and print an image corresponding to said converted multi-value image data, and for controlling said printing means to print an image corresponding to image data judged as said simple binary image data by said judging means without converting said simple image data into multi-value image data.

7. An image communication system including a transmission apparatus and a receiving apparatus, said transmission apparatus comprising:

image reading means for optically reading a density of a document image by respective fine pixels and outputting image data corresponding to said read document image;

simple binarizing means for binarizing image data outputted from said image reading means using one threshold value and outputting simple binary image data;

pseudo half-tone binarizing means for binarizing image data outputted from said image reading means using a plurality of threshold values and outputting pseudo half-tone image data including half-tone information;

selecting means for selecting one of said simple binary image data outputted from said simple binarizing means and said pseudo half-tone image data outputted from said pseudo half-tone binarizing means and outputting said selected image data; and transmitting means for transmitting said image data selected by said selecting means and transmitting a predetermined discrimination signal corresponding to said image data selected by said selecting means, said receiving means comprising:

receiving means for receiving said image data and said predetermined discrimination signal transmitted from said transmitting means of said transmission apparatus;

judging means for judging whether said image data received by said receiving means are either said simple binary image data or said pseudo half-tone image data based on said predetermined discrimination signal received by said receiving means;

converting means for converting said image data received by said receiving means into multi-value image data representing an image density of each pixel in multi-gradation stages representation including half-tone density when said judging means judges that said image data received by said receiving means are said pseudo half-tone image data; and printing means for printing an image corresponding to said multi-value image data converted by said converting means on a paper when said judging means judges that said image data received by said receiving means are said pseudo half-tone image data, and for printing an image corresponding to said image data received by said receiving means on a paper when said judging means judges that said image data received by said receiving means are said simple binary image data.

8. A facsimile apparatus comprising:

receiving means for receiving binary image data and a recovery control signal transmitted from a further facsimile apparatus of the other party;

first recovery means for performing a first recovery process for recovering multi-value image data from said binary image data binarized using a first pseudo half-tone binarizing method;

second recovery means for performing a second recovery process for recovering multi-value image data from said binary image data binarized using a second pseudo half-tone binarizing method different from said first pseudo half-tone binarizing method; and controlling means for controlling said first and second recovery means to selectively perform one of said first and second recovery processes for said binary image data received by said receiving means, based on said recovery control signal received by said receiving means.

9. A facsimile apparatus comprising:

receiving means for receiving binary image data transmitted from a transmission apparatus apart from said facsimile apparatus;

first detecting means for detecting whether or not said binary image data received by said receiving means are image data binarized using a first pseudo half-tone binarizing method based on said binary image data received by said receiving means and outputting a detection result thereof;

second detecting means for detecting whether or not said binary image data received by said receiving means are image data binarized using a second pseudo half-tone binarizing method based on said binary image data received by said receiving means and outputting a detection result;

recovery means for recovering multi-value image data from said binary image data received by said receiving means based on said detection results outputted from said first and second detecting means;

further receiving means for receiving a discrimination signal representing a kind of binarizing method of said binary image data received by said receiving means; and controlling means for invalidating at least one of said detection results outputted from said first and second detecting means based on said discrimination signal received by said further receiving means.

10. A facsimile apparatus comprising:

image reading means for reading an image to be transmitted and converting said read image into image data;

judging means for judging whether said image data converted by said image reading means are either image data of half-tone image having a half-tone density or image data of non-half-tone image having no half-tone density and outputting a judgment signal representing a judgment result thereof;

binarizing means for binarizing said image data converted by said image reading means and outputting binary image data;

transmitting means for transmitting said binary image data outputted from said binarizing means and said judgment signal outputted from said judging means to a further facsimile apparatus of the other party;

receiving means for receiving binary image data and said judgment signal transmitted from said further facsimile apparatus of the other party; and recovery means for recovering multi-value image data from said binary image data received by said receiving means when said judgment signal received by said receiving means includes the detection result that said binary image data received by said receiving means are said image data of half-tone image, and for outputting said binary image data received by said receiving means without recovering of said received binary image data when said judgment signal received by said receiving means includes the detection result that said binary image data received by said receiving means are said image data of non-half-tone image.

11. A facsimile apparatus comprising:
receiving means for receiving for receiving binary image data transmitted from a further facsimile apparatus of the other party;

judging means for judging that said binary image data received by said receiving means are binary image data binarized using a pseudo half-tone binarizing method when said binary image data received by said receiving means per one page are larger than a predetermined threshold data value, and for judging that said binary image data received by said receiving means are binary image data binarized using a non-half-tone binarizing method with one binarizing threshold value when said binary image data received by said receiving means per one page are equal to or smaller than said predetermined threshold data value; and recovery means for recovering multi-value image data from said binary image data received by said receiving means when said judging means judges that said binary image data received by said receiving means are said binary image data binarized using said pseudo half-tone binarizing method, and for outputting said binary image data outputted from said receiving means without recovering multi-value image data therefrom when said judging means judges that said binary image data received by said receiving means are said binary image data binarized using said non-half-tone binarizing method with one binarizing threshold value.

12. A facsimile apparatus comprising:
receiving binary image data and a resolution signal representing a resolution of said binary image data transmitted from a further facsimile apparatus of the other party; and recovery means for recovering multi-value image data from said binary image data received by said receiving means when said resolution represented by said resolution signal received by said receiving means is equal to or higher than a predetermined resolution threshold value, and for outputting said binary image data received by said receiving means without recovering of said received binary image data when said resolution represented by said resolution signal received by said receiving means is lower than said predetermined resolution threshold value.

13. An image processing apparatus comprising:
counting means for counting a number of adjacent points, in each of which the same kinds of two pixels are adjacent to each other, within a block area composed of a plurality of pixels having a specified pixel to be processed, based on inputted binary image data including first binary image data binarized using a pseudo half-tone binarizing method with a plurality of predetermined binarizing threshold values and second binary image data binarized using a non-half-tone binarizing method with a predetermined binarizing threshold value;

judging means for judging whether said inputted binary image data are either first or second binary image data by comparing said the number of adjacent points counted by said counting means with a predetermined judgment threshold value, and outputting a judgment result thereof; and controlling means for altering said predetermined judgment threshold value based on a resolution of said inputted binary image data.

14. The apparatus as claimed in claim 13, further comprising recovery means for recovering multi-value image data from said inputted binary image data based on said judgment result outputted from said judging means.

15. An image processing apparatus comprising:
recovery means for recovering multi-value image data from inputted binary image data using spatial filters each spatial filter having a predetermined window;

wherein said recovery means recovers multi-value image data from said inputted binary image data using a first spatial filter having a window of a predetermined first size when a resolution of said inputted binary image data is equal to or higher than a predetermined resolution threshold value, and said recovery means recovers multi-value image data from said inputted binary image data using a second spatial filter having a window of a predetermined second size smaller than said predetermined first size when said resolution of said inputted binary image data is lower than said predetermined resolution threshold value.

16. An image processing apparatus comprising:
judging means for judging whether or not inputted binary image data are binary image data binarized using a Fattening type ordered dither binarizing method based on said inputted image data, and outputting a judgment result thereof;

recovery means for recovering multi-value image data from said inputted binary image data by performing a predetermined image processing corresponding to said judgment result outputted from said judging means for said inputted binary image data; and controlling means for controlling said judging means to judge that said inputted binary image data are not binary image data binarized using any Fattening type ordered dither binarizing method when a resolution of said inputted binary image data is equal to or lower than a predetermined resolution threshold value.

* * * * *

UNITED STATES PATENT AND TRADEMARK OFFICE
CERTIFICATE OF CORRECTION

PATENT NO. : 5,387,983

DATED : February 7, 1995

INVENTOR(S) : Masamichi Sugiura, et al.

It is certified that error appears in the above-identified patent and that said Letters Patent is hereby corrected as shown below:

In col. 9, line 41, change "Is" to --is--.

In col. 20, line 52, change "Of" to --of--.

In col. 32, line 42, change "th" to --the--.

In col. 34, line 31, after "specified" insert --pixel--.

In col. 43, line 25 (Claim 11, line 2), delete "for receiving" (second occurrence).

In col. 43, line 55 (Claim 12, line 2), before "receiving" insert --receiving means for--.

Signed and Sealed this

Fourteenth Day of November, 1995

Attest:

BRUCE LEHMAN

*Attesting Officer*     *Commissioner of Patents and Trademarks*